United States Patent
Sayed et al.

(10) Patent No.: US 12,055,254 B2
(45) Date of Patent: Aug. 6, 2024

(54) SYSTEM AND METHOD FOR HEATING A CONDUIT

(71) Applicant: Amr Mohamed Sayed, Calgary (CA)

(72) Inventors: Amr Mohamed Sayed, Calgary (CA); Robert Gordon Moore, Calgary (CA); Sudarshan Mehta, Calgary (CA)

(73) Assignee: NANO HEATING TECH INC., Alberta (CA)

( * ) Notice: Subject to any disclaimer, the term of this patent is extended or adjusted under 35 U.S.C. 154(b) by 850 days.

(21) Appl. No.: 16/757,730

(22) PCT Filed: Oct. 19, 2018

(86) PCT No.: PCT/CA2018/051328
§ 371 (c)(1),
(2) Date: Apr. 20, 2020

(87) PCT Pub. No.: WO2019/079885
PCT Pub. Date: May 2, 2019

(65) Prior Publication Data
US 2021/0190249 A1    Jun. 24, 2021

Related U.S. Application Data

(60) Provisional application No. 62/575,837, filed on Oct. 23, 2017.

(51) Int. Cl.
*H05B 3/58* (2006.01)
*E21B 36/04* (2006.01)
(Continued)

(52) U.S. Cl.
CPC .............. *F16L 53/35* (2018.01); *E21B 36/04* (2013.01); *E21B 43/24* (2013.01); *F16L 9/18* (2013.01); *H05B 3/58* (2013.01); *H05B 2214/03* (2013.01)

(58) Field of Classification Search
CPC ............ F16L 53/35; F16L 9/18; E21B 36/04; E21B 43/24; H05B 3/58
See application file for complete search history.

(56) References Cited

U.S. PATENT DOCUMENTS

| | | | |
|---|---|---|---|
| 2,792,895 A | | 5/1957 | Carpenter |
| 3,938,385 A | * | 2/1976 | Horwath ................ G01K 1/026 |
| | | | 374/E7.038 |
| 4,487,057 A | * | 12/1984 | Lutz ........................ G01K 3/00 |
| | | | 324/519 |

(Continued)

FOREIGN PATENT DOCUMENTS

| | | |
|---|---|---|
| EP | 312204 A1 | 4/1989 |
| FR | 2871983 A1 | 12/2005 |

OTHER PUBLICATIONS

K. H. Afkhampour—IEEE conference in 1985 where flow assurance using electric heating was first introduced.

(Continued)

*Primary Examiner* — Kevin R Barss
(74) *Attorney, Agent, or Firm* — D'Ambrosio & Menon, PLLC; Usha Menon

(57) ABSTRACT

There is described a system comprising an outer conduit; an inner conduit positioned within the outer conduit such that an annular space is defined between the outer conduit and the inner conduit; and a resistive heating material occupying at least a portion of an annular volume within the annular space and having a positive temperature coefficient of resistance.

33 Claims, 49 Drawing Sheets

(51) Int. Cl.
*E21B 43/24* (2006.01)
*F16L 9/18* (2006.01)
*F16L 53/35* (2018.01)

(56) References Cited

U.S. PATENT DOCUMENTS

| | | | | |
|---|---|---|---|---|
| 6,147,931 | A * | 11/2000 | Seaman | G01S 7/52006 374/E11.015 |
| 6,980,722 | B1 * | 12/2005 | Ruffa | G01K 11/32 374/E11.015 |
| 9,133,965 | B2 | 9/2015 | Goering et al. | |
| 9,151,418 | B2 | 10/2015 | Goering et al. | |
| 10,316,644 | B2 * | 6/2019 | Harris | E21B 47/07 |
| 2004/0028396 | A1 | 2/2004 | Russegger | |
| 2012/0175149 | A1 | 7/2012 | Ihle et al. | |
| 2014/0301426 | A1 * | 10/2014 | Harris | E21B 36/04 374/136 |
| 2014/0326504 | A1 | 11/2014 | Hay et al. | |
| 2016/0312924 | A1 | 10/2016 | Kolarski et al. | |

OTHER PUBLICATIONS

Sloan, E. D. (1991). Natural Gas Hydrates. Journal of Petroleum Technology, 43(12), 1414-1417.

Oakes, J. A., & Sandberg, C. L. (1973). Some Aspects of a Self-Limiting Resistive Electric Heating Element. IEEE Transactions on Industry Applications, IA-9(4), 462-466.

Rudnev, V., Loveless, D., Cook, R., & Black, M. (2003), Handbook of Induction Heating, New York: Marcel Dekker, Chapter 3, pp. 99-183.

Yi, W., Wang, Y., Wang, G., & Tao, X. (2012), Investigation of carbon black/silicone elastomer/dimethylsilicone oil composites for flexible strain sensors, Polymer Testing, 31(5), 677-684.

Sandberg, et al. History of Application of Resistance Electrical Heaters in Downhole Oil Field Applications, SPE 165323, 2013.

International Search Report & Written Opinion dated Jan. 17, 2019.

* cited by examiner

| Physical State | Liquid | Appearance | Black grease |
|---|---|---|---|
| Odor | None | Odor Threshold | Not applicable |
| pH | Not available | Specific Gravity | 1.1 |
| Solubility in Water @ 25 °C | Insoluble | Melting/ Freezing Point | Not available |
| Boiling Point | >200 °C | Evaporation Rate | <1 (BurAc = 1) |
| Flash Point [a] | >300 °C | Vapor pressure @25 °C | 0.14 kPa [1 mmHg] |
| Lower Flammability Limit | Not available | Upper Flammability Limit | Not available |
| Auto-ignition Temperature | Not available | Decomposition Temperature | Not available |
| Viscosity @25 °C | 570 000 cSt | Vapor Density | >1 (Air =1) |
| Partition Coefficient | Not available | | | a) Cleveland open cup

Figure 36

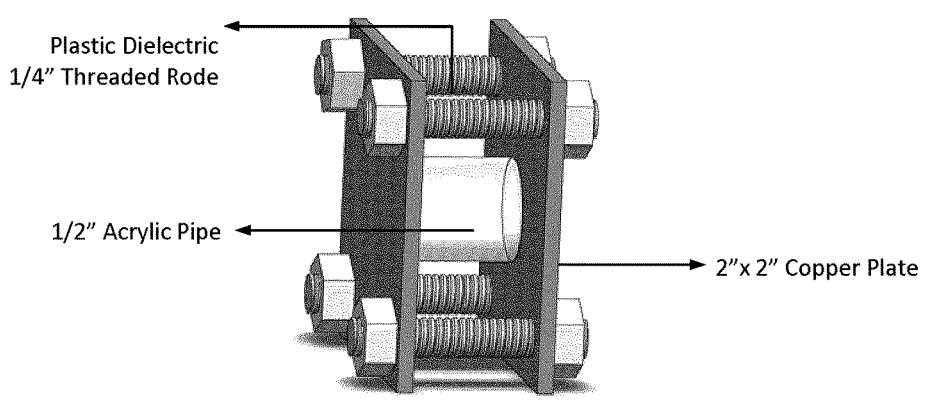

Figure 37

Figure 40: Case-1 cross-sectional schematic of prototype's tubes.

SYSTEM AND METHOD FOR HEATING A CONDUIT

FIELD OF THE DISCLOSURE

The present disclosure relates to systems and methods for heating a conduit, for example a conduit used in an oil and gas operation.

BACKGROUND TO THE DISCLOSURE

The oil and gas industry has placed a tremendous effort in developing and improving techniques to heat fluids in the reservoir, as well as fluids flowing through producing wells and pipelines. Introducing such heat is mainly implemented to improve productivity and/or solve problems associated with temperature drop. There are numerous heating techniques and processes used for different subsurface heating applications. FIG. 1 reviews the most popular electrical-based ones in the industry.

Increasing oil temperature can lead to a significant enhancement in the inflow and outflow performance of the well. This is possible because temperature elevation is affiliated with a considerable reduction in oil's viscosity, which makes it easier to flow. Heating production tubing might be necessary to avoid problems associated with paraffin and hydrates formation. Further, applying heat downhole is sometimes essential to treat formation damage or ignite the oil in-place for air injection projects. Heating can be even used to convert shale oil in the reservoir to high-quality products.

Wax disposition and hydrate formation are the two main threats to hydrocarbon flow. Chemical inhibitors can be used to clear pipes from wax and hydrates deposits. These methods, however, are expensive and require comprehensive operative procedures. Flow assurance using electric heating was first introduced by K. H. Afkhampour in an IEEE conference in 1985. The concept presented was to heat the production tube to a temperature higher than the wax appearance temperature and thus eliminate the need for chemical injection to mitigate paraffin deposition. This is especially beneficial for oil with low wax appearance temperature, and oil flowing through cold overburden. The same technique is also valid, and has been used, to prevent hydrate formation in oil/gas and gas carrying systems.

The crystallization and deposition of paraffin waxes costs the oil industry billions of dollars annually. Wax deposition in production tube can cause reduction in production, equipment failures and well shut in. Extensive research work has been conducted to understand and deal with this issue. It is known that n-paraffins in the crudes are primarily responsible for wax related issues, on the other hand compounds such as asphaltenes and resins have profound effects on the solubility of n-paraffins.

Paraffin wax molecules are straight-chain alkanes that contain more than 15 carbon atoms and have very little branching. Paraffin compounds with more than 20 carbon atoms have high potential of crystallization issues. At reservoir conditions paraffin molecules are fully dissolved in the oil, as temperature drops across production tubes, paraffins precipitate out due to solubility limits. Wax's solubility changes as temperature changes. Certain food grade waxes may have carbon numbers ranging from C23 to C38 and may dissolve in an oil solvent such as an oil solvent consisting of a 3:1 mixture of mineral oil and kerosene.

Precipitation conditions are necessary to form deposition, but are not solely sufficient to start it. Precipitation is a simple thermodynamic process that occurs when oil temperature drops below its wax appearance temperature. On the other hand, wax deposition in oil pipelines is a more complex process in which many mechanisms have been proposed to describe the phenomena.

The deposition of paraffins depends on many factors including flow rate, temperature difference between the oil and pipe surface and pipe's surface properties. Crudes with as low as 2% precipitated wax tend to form complex wax-oil gel deposit on the wall of the pipes, where a large amount of oil is trapped in a 3D network structure. The gel forms a porous medium in which flowing wax molecules in the stream continue to diffuse, thus the wax content in the gel increases with time. For wax diffusion to occur, oil temperature must be higher than wax appearance temperature of the oil (thus less wax in solid state), and higher than the pipe's surface temperature. Experiments have been conducted in situations where the pipe wall temperatures were equal to or higher than the oil temperature, and no wax deposition were recorded.

Oil flow rate also has a role on the rate of deposition. Laboratory experiments were conducted to measure the effect of various flow rates on the thickness of wax deposition in pipes. It was noted that, generally, as the flow rate increases, wax deposit thickness decreases.

The classes of compounds that may exist in the deposit includes: aliphatic hydrocarbons, aromatic hydrocarbons, naphthenes and asphaltenes and resins. In favorable flow conditions, the n-paraffins forms orthorhombic crystals, while in the presence of impurities and other unfavorable conditions n-paraffins tend to undergo hexagonal and amorphous crystallization. The branched chain paraffin molecules are responsible for most of the microcrystalline waxes, long straight chains of naphthenic and aromatic paraffin molecules also contribute to microcrystalline waxes and play a major role in the development and growth of the structure to form macrocrystalline waxes. Macrocrystalline waxes are the major cause of paraffin issues in production and transportation lines, while microcrystalline waxes are the main contributor to sludges in the bottom of oil tanks.

In wax-free crudes, flow can always be initiated and preserved at low flow rates without excessive pressure drop across the production tube. This is true even when the temperature drops, because even though the viscosity increases with the temperature reduction, the oil will remain a Newtonian fluid. This behavior is also valid for waxy-crudes, but only at high temperatures. At temperatures close to its pour point, waxy-crudes tend to exhibit non-Newtonian flow behavior.

Gas hydrates are crystalline compounds that occur when water forms a cage-like structure around smaller guest molecules. In natural gas production, changes in temperature or pressure may lead to hydrates formation composed of water and eight molecules in the stream: methane, ethane, propane, butane, isobutene, hydrogen sulfide and carbon dioxide. If not handed probably, hydrate formation can cause full blockage in pipelines, collapse of well's tubing and casing, and many other problems.

A phase diagram, such as that in Sloan, E. D. (1991). Natural Gas Hydrates. Journal of Petroleum Technology, 43(12), 1414-1417, available at http://doi.org/10.2118/23562-PA, presents hydrate stability of different methane/propane mixtures. For conditions at the right side to any given composition line, gas will exist in equilibrium with water. However, as temperature decreases or pressure increases (moving to the left side), hydrates will form and three phases will exist in equilibrium (gas, water and hydrates).

Gas composition plays a major role in hydrate stability. In the methane/propane phase diagram referenced above, it can be seen that as the mol percent of propane in the mixture increases, the pressure required for hydrate formation decreases.

Hydrate formation can also be an issue in oil systems. When oil, gas, water with dissolved salts and inhibitors flow together through a low temperature-high pressure environment, there is a potential of forming gas hydrates in the pipes. Hydrate formation in oil systems poses lower risks to the industry; this is partially due to the formation of water in oil emulsion and the presence of natural inhibitors, such as asphaltenes, which helps in transporting the hydrates as slurry in production tubes and pipelines.

Oil viscosity decreases as temperature increases and viscosity reduction by definition increases oil flowability, as it has an inversely proportional relationship with flow rate in Darcy equations. This phenomenon has been used extensively by the oil industry to increase recovery from heavy-viscous oil reservoirs through the implementation of thermal recovery methods, where heat is injected or generated in the reservoir to deceases the viscosity of the oil. Although it relies primarily on reducing the viscous retaining force, many thermal recovery methods also enhance the driving force, as high volumes of hot water, steam or air is injected into the reservoir.

The effect of temperature on oil's viscosity is also used to enhance and optimize oil inflow performance, especially for situations where production tubing passes through cold formations or permafrost. Heated oil in production wells was also recorded to increases the life of electrical submersible pumps, as the head required is reduced due to viscosity drop.

The importance of having accurate viscosity predications at different temperatures is being able to study the increase in recovery and wells' productivity compared to the additional operational costs and power input for a given thermal recovery method. Even though all crude oils follow the same trend in response to the application of heat, the significance of this phenomenon differs depending on the oil's chemical components. Heavy crudes tend to have more significant viscosity reduction compared to light crudes, if exposed to the same incremental change in temperature.

Fluid viscosity is a temperature-dependent property. Gas viscosity is very well explained by kinetic theory. This theory relates the effect of temperature on the movement of gas molecules to gas viscosity in an inversely proportional relationship. In essence, as the temperature increases, the movement of gas molecules also increases, and this raises the frequency of intermolecular collisions between the gas's molecules, which increases the viscosity of the gas.

In contrast to gas viscosity, liquid viscosity decreases as the temperature increases. Also unlike gas viscosity, liquid viscosity theories are not fully developed. However, the effect of temperature on liquid viscosity can be simplified on a molecular level by linking temperature to intermolecular interaction of liquid particles. When the temperature increases, the average velocity of the liquid's individual molecules also increases. This decreases the interaction between them, and reduces the intermolecular force, which consequently makes the liquid less viscous.

The actual process of liquid viscosity is more complicated and not quite understood. Many formulated theories for liquid viscosity are based on gas-like and/or solid-like molecular structure, but none of these theories yields an acceptable fit with experimental data.

TABLE 1 development of liquid's viscosity-temperature equations

| Year | Formation | Author |
|---|---|---|
| 1886 | $\mu = Re^{-\alpha T}$ | Reynolds |
| 1921 | $\mu_t = \mu_\infty \frac{\mu - \mu_1}{\mu - \mu_\infty}$ | Vogel |
| 1925 | $\log(\mu) = -A + \frac{B*10^3}{T_R - T_{R,0}}$ | Fulcher |
| 1928 | $\log(\log(v)) = -M * T + P$ | Walther |
| 1931 | $\log(\log(v + 0.95)) = -m * \log\left(\frac{T_R}{T_{R,0}}\right) + \log(\log(vo + 0.95))$ | Walther |
| 1932 | $\log(\log(v + 0.8)) = a - b * \log(T_R)$ | Geniesse & Delbridge ASTM 341 |
| 1937 | $\mu = Ke^{\wedge}\left(\frac{b'}{T + \theta}\right)$ | "Vogel" equation given by Barr |
| 1937 | $[\log 10(v + a)]^{0.3} = A + \frac{b}{T_R}$ | Barr |
| 1961 | $v + y = \beta D^{T_R^{-c}}$ | Crouch and Cameron |
| 1966 | $\log(\log(\mu_O + 4.2)) = -S_O \log\left(1 + \frac{T_R}{135}\right) + \log(G_O)$ | Roelands |
| 1969 | $\log(\log(v + \gamma + f(v))) = A - B * \log(T_R)$<br>$\gamma + f(v) = 0.7 + C - D + E - F + G - H$<br>$C = \exp(-1.14883 - 2.65868v)$<br>$D = \exp(-0.00381308 - 12.5645v)$<br>$E = \exp(5.46491 - 37.6289v)$<br>$F = \exp(13.0458 - 746851v)$<br>$G = \exp(37.4619 - 192.643v)$<br>$H = \exp(80.4945 - 400.468v)$ | Wright ASTM 341-93 |
| 1974 | $\log(\log(v + \gamma + f(v))) = b_0 - b_1 * \log(T_R)$<br>$\gamma + f(v) = 0.7 + e^{(-1.47 - 1.84v - 0..51v^2)}$ | Manning |

R, $\alpha$, $t_1$, $t_\infty$, $\eta_\infty$, M, P, m, $v_o$, $T_o$, a, b, $b_o$, $b_1$, b', c, K, $\theta$, $\beta$, $\gamma$, A, B, $S_o$, $G_o$ are empirical constants Empirical and simplified mathematical models have been used to describe the change of liquid viscosity with respect to changing temperature. The historical development of these equations is shown above in Table 1. Although many of these equations yield good approximation of viscosity, they lack generalization and are only valid for specific ranges of temperature.

Understanding and accurately modeling liquid viscosity is of great importance to the oil industry in order to study and predict the performance of thermal recovery methods in oil reservoirs. It is also important to study the influence of the surrounding environment on the flow behavior of oil-carrying pipelines and production tubes.

Laboratory experiments are the ideal approach to study a crude oil's viscosity at different temperatures. However, obtaining oil samples and conducting these experiments might not always be feasible and usually very expensive;

this is especially true for very heavy and viscous crudes. Thus, correlations are again depended upon to provide a relationship between oil viscosity and temperature.

Oil viscosity depends on many factors including its chemical composition—particularly polar components—its origin, and its type. These factors affect the intermolecular interaction and this is why it is very challenging to obtain empirical correlations that are applicable for the whole spectrum of different oil compositions at an appropriate range of temperatures.

Current oil viscosity correlations predict oil viscosity using known available oil properties at a given temperature. There are two types of these correlations; the first type relates viscosity to oil field data such as reservoir pressure, saturation pressure, gas oil ratio and API gravity. The second type includes empirical or semi-empirical correlations that relate viscosity to reservoir fluid's characteristics such as pour point, chemical composition, boiling point, molar mass and critical temperature.

A review of dead oil viscosity correlations is presented in Table 2, below. As they are for dead crudes (no dissolved gas), they depend mainly on API gravity and temperature. These equations are formulated differently when oil samples are saturated or undersaturated to include variables such as solution gas oil ratio. The limitations of the available oil viscosity correlations are presented in Table 3, below. The reliability of these equations is also an issue, as the mean absolute percentage error reported for these equations were many times challenged by other researchers and didn't always predict the viscosity with the accuracy claimed by the original authors.

TABLE 2

Available dead oil viscosity correlations.

| Author | Year | Equation | Empirical constants |
|---|---|---|---|
| Alomair et al. | 2012 | $p = a + b(API_{at\ 60°\ F.}) + c(T)$ | *From 20 to 100° C. (a = 10.76097, b = 275.3066, c = 107.8845) |
|  |  | $\ln(\mu) = a + \dfrac{b}{T^2} + c(\rho^2)\ln(\rho)$ | *Above 100° C. (a = 7.931926, b = 309.6578, c = 61.51975) |
| Naseri, Nikazar, & Mousavi Dehghani | 2005 | $\mu = \log^{-1}(\alpha - b\log(API) - c\log(T_F))$ | a = 11.2699, b = 4.2699, c = 2.052 |
| Labedi | 1992 | $\mu = \dfrac{10^a}{API^b \times T_F^c}$ | a = 9.224, b = 4.7013, c = 0.6739 |
| Elsharkawy & Alikhan | 1999 | $\mu = \text{antilog}(X) - 1$<br>$X = \text{antlog}(Y)$<br>$Y = a - b \times API - c \times \log(T_R)$ | a = 2.16924, b = 0.02525, c = 0.68875 |
| Beggs & Robinson | 1975 | $\mu = 10^X - 1$<br>$X = Y \times T_F^{-a}$<br>$Y = 10^Z$<br>$Z = a - b \times API$ | a = 1.163, b = 3.0324, c = 0.02023 |
| Beal | 1946 | $\mu = \left(a + \dfrac{b}{API^c}\right)\left(\dfrac{d}{T_F - h}\right) \times X$<br><br>$x = 10\left(j + \dfrac{k}{API}\right)$ | a = 0.32, b = 1.8 * 10^7, c = 4.53, d = 360, h = 260, j = 0.43, k = 8.33 |
| Glaso | 1980 | $\mu = a(TF - b)^c[\log(API)]^X$<br>$X = d \times \log(TF - h) - j$ | a = 3.141*10^10, b = 460, c = 3.444, d = 10.313, h = 460, j = 36.447 |
| Kartoatmodjo & Schmidt | 1994 | $\mu = a \times T_F^b[\log(API)]^X$<br>$X = c \times \log(TF) - d$ | a = 16 * 10^8, b = 2.8177, c = 5.7526, d = 26.9718 |
| Petrosky & Farshad | 1995 | $\mu = a \times T_F^{-b}[\log(API)]^X$<br>$X = c \times \log(TF) - d$ | a = 2.3511 * 10^7, b = 2.10255, c = 4.59388, d = 22.82792 |
| Hossain, Sarica, Zhang, Rhyne, & Greenhill | 2005 | $\mu = 10^{-a \times API + b} T_f^{c \times API - d}$ | a = 0.71523, b = 22.13766, c = 0.69024, d = 8.268047 |

TABLE 3

Limitations of oil's viscosity correlations in literature

|  |  | API | | Temperature [F] | | Viscosity [cP] | |
|---|---|---|---|---|---|---|---|
| Author | Year | Low | High | Low | High | Low | High |
| Alomair et al. | 2012 | 11.77 | 18.81 | 20 | 160 | 1.78 | 11,322 |
| Naseri, Nikazar, & Mousavi Dehghani | 2005 | 17 | 44 | 40.6 | 146.1 | 0.75 | 54 |
| Labedi | 1992 | 32 | 48 | 37.8 | 152.2 | 0.6 | 4.8 |
| Elsharkawy & Alikhan | 1999 | 20 | 48 | 37.8 | 148.9 | 0.6 | 33.7 |
| Beggs & Robinson | 1975 | 16 | 58 | 21.1 | 146.1 | — | — |
| Beal | 1946 | 10 | 52 | 37.8 | 104.4 | 0.8 | 188 |
| Glaso | 1980 | 20 | 48 | 10 | 148.9 | 0.6 | 39 |
| Kartoatmodjo & Schmidt | 1994 | 14 | 59 | 26.7 | 160 | 0.5 | 586 |

TABLE 3-continued

Limitations of oil's viscosity correlations in literature

| | | API | | Temperature [F] | | Viscosity [cP] | |
|---|---|---|---|---|---|---|---|
| Author | Year | Low | High | Low | High | Low | High |
| Petrosky & Farshad | 1995 | 25.4 | 46.1 | 45.6 | 142.2 | 0.725 | 10.249 |
| Hossain, Sarica, Zhang, Rhyne, & Greenhill | 2005 | 15.8 | 22.3 | 51.1 | 93.3 | 22 | 415 |

The in-situ conversion process is the most power intensive application for downhole heaters.

The process can be looked upon as a virtual downhole refinery that converts oil shale to high quality products such as diesel and jet fuel. The same method is implemented on heavy oil reservoirs and is referred to as the in-situ upgrading process.

The in-situ conversion's mechanism involves using compactly spaced electric heaters that uniformly heat the oil shale to the conversion temperature of 343° C. The idea is to reach pyrolysis conditions at which the long chain kerogen molecules in the oil shale is broken down by thermal decomposition to small oil, gas and water molecules. Heating and vapor phase transport allow for high liquid recovery of around 60% FA (FA stands for Fisher Assay and is a method used to report the liquid oil yield from shale resources). Around two thirds of the energy produced from the process is in the liquid oil phase and one third is in the gas phase. The efficiency of the process is claimed to be as high as 90-100% FA, if the gas phase was accounted for in the calculation by converting it to equivalent liquid barrels. The liquid oil produced can be as light as 400 API and is refined using conventional refining processes with some modifications.

Formation heat treatment is a process where near wellbore formation is exposed to elevated temperature in order to mitigate water blockage and clay-related formation damages.

Sandstone reservoirs usually contain different types of clay materials which swell when in contact with foreign fluids. Near wellbore damage occurs in these water sensitive reservoirs due to exposing the formation to incompatible liquids during operations such as drilling, completion and workovers. The main mechanisms allowing for these damages involves: pore throat shrinking, as a result of clay migration and/or clay swelling, water blocking, drilling mud plugging and reservoir loading with completion or drilling fluids. Heat is dependent upon to treat formation damage by vaporizing blocked water, dehydrating clay structures, partially destructing clay minerals and micro-fracturing the formations by thermal stress.

Laboratory core tests were conducted for different oil and gas bearing formations to study the effect of elevated temperatures on cores' permeability. Cores went through a sequence of conditions starting with exposure to formation brine, mud filtrate, high temperatures and finally to brine again. Air or oil permeability was measured after every sequence and the results are presented in Table 4.

It was noted that exposing the Boyer Bluesky formation core to temperatures lower than 600° C. yielded a temporary enhancement in the permeability that reversed once the core was re-exposed to brine. This indicated that for temperatures lower than 600° C. the improvement in the permeability is affiliated to de-watering only, thus other cores were subjected to a temperature of 800° C. only, as seen in Table 4. Not all formations showed a positive effect after being exposed to high temperatures; however, formations like Boyer Bluesky and Wayne Rosedale showed a dramatic increase in permeability even after brine was reintroduced to the cores.

TABLE 4

Effect of heat on the permeability of different formations

| Formation | Status | Initial | Brine Exposure | Mud Exposure | Heat 200 C. | Heat 400 C. | Heat 600 C. | Heat 800 C. | Brine Exposure |
|---|---|---|---|---|---|---|---|---|---|
| Boyer Bluesky | Measured Permeability [mD] | 17.85 | 5.19 | 2.86 | 7.8 | 15.73 | 26.98 | 154.3 | 129 |
| | % change from initial | — | −70 | −84 | −56 | −12 | 51 | 764.4 | 622 |
| Wayne Rosedale | Measured Permeability [mD] | 0.903 | 0.822 | 0.52 | — | — | — | 9.82 | 6.97 |
| | % change from initial | — | −8.97 | −43 | — | — | — | 988 | 672 |
| Pembina Cardium | Measured Permeability [mD] | 32.6 | 2.85 | 1.31 | — | — | — | 52.84 | 5 |
| | % change from initial | — | −91 | −96 | — | — | — | 67 | −85 |
| Taber North | Measured Permeability [mD] | 20.7 | 9.12 | 6.32 | — | — | — | 9.35 | 4.76 |
| | % change from initial | — | −56 | −69 | — | — | — | −55 | −77 |
| Enchant Nisku | Measured Permeability [mD] | 36.25 | 7.47 | 5.05 | — | — | — | 20.51 | 3.79 |
| | % change from initial | — | −79 | −86 | — | — | — | −43 | −89 |

Air injection is one of the earliest and most efficient enhanced oil recovery methods in terms of oil recovery. In air injection projects, compressed air is injected into conventional or heavy oil reservoirs for oxygen, in the injected air, to react with a small fraction of the oil in place. This reaction generates heat, water and flue gases that help in recovering the oil in place.

Air injection processes are feasible for different reservoir conditions, but different in terms of operations and downhole working mechanism. In deep, light oil reservoirs the process is called High Pressure Air Injection (HPAI) and its main driving mechanism is the resulting flue gas mixture, which is primarily $CO_2$ and nitrogen. In the case of heavy oil reservoirs, the process is called in-situ combustion, or fireflooding, and the reactive zone itself accounts for most of the sweep mechanism in terms of incremental recovery. Oil outside the thermally affected regions is swept by hot water and flue gases produced from the combustion.

Successfully igniting the formation is a very critical aspect in air injection processes. It can be done either spontaneously or using artificial techniques. In high pressure-high temperature reservoirs (higher than 80° C.) the process is initiated by simply injecting air, as it will spontaneously ignite due to heat accumulation generated from oil's oxidation reactions.

There are many cases where spontaneous ignition is not feasible, due to insufficient oil reactivity or high heat losses to reservoir, or is not recommended, such as in the case of heavy oil and bitumen reservoirs. In these cases, artificial means such as downhole electric heaters, gas burners, steam injection or chemicals are used to ignite the formation and initiate the process.

Based on field operational data, heat requirement for ignition was found to be between 0.3-3.3 MMBtu per foot, depending on the heating rate and ignition temperature of the crude (which ranges from 150° C. to 315° C.). Downhole electric heaters are the most used artificial ignition method, mainly for its relatively low cost and simplicity. However, these types of heaters together with gas burners are not generally recommended for igniting deep, high-pressure reservoirs.

The following section reviews the different types of electrical based-heating systems used in oil producing wells and around their wellbore. Electrical-based heaters generate heat by Ohmic resistivity, but the configuration, working mechanism and the resultant heating density differs for different systems; thus each system's feasibility for different oil applications also differs.

Mineral Insulated electrical resistance heating cables, or MI heating cables, provide the highest heating density and operating temperatures of all other heating tracers. MI cables comprise one or more conductors, surrounded longitudinally with mineral powder electric insulation and enclosed in a metal sheath. The resistance of the heating cable ranges from 0.0021 ohm/m to as high as 56 ohm/m and its resistivity generally increases with temperature, depending on the alloy used in the conductor. It is common to use 180 Alloy (consisting of 22% nickel and 78% copper) as the conductor solid, which has a temperature coefficient of resistance of around 0.00018 ohm/° C.

The metal sheath used in the cable depends on the environment in which it will operate and the expected operational temperature. The MI cable's round geometry dictates a tangential contact with the pipes being heated, which minimize the heat transfer by conduction and leads to high sheath temperatures. Copper sheaths are the most flexible, have the lowest cost and can withstand continuous temperature of 204° C. or less. For temperatures as high as 560° C., Alloy 825 and 300 series stainless steel are used. Stainless steel and nickel content alloys are usually preferred in petrochemical applications for their high corrosive resistance.

Magnesium Oxide (MgO) powder is usually chosen as the electric insulation over other ceramic powders and insulation types because of its availability, low cost, good dielectric strength and excellent thermal conductivity. The superiority of MgO powder in terms of thermal conductivity is in particular what makes MgO more appealing, as high thermal conductivity helps in transferring the heat out of the heating cable. Operating under the same conditions, this makes the solid conductors cooler than that in other constant wattage cables. The thermal conductivity of compressed MgO and other insulating types are shown in Table 5, below. The dielectric strength and the electric resistance of compressed MgO decreases as the temperature increases.

TABLE 5

Thermal conductivity of common heating cable insulation

| Material | W/m · K | W/m$^2$ · K |
|---|---|---|
| Mgo | 28.34 | 93.1 |
| HDPE | 5.36 | 17.6 |
| FEP Teflon | 2.93 | 9.7 |
| PVC | 1.71 | 5.6 |

MI heating cables are power source heaters and their main weakness is that they burn out. They are factory fabricated and it is difficult to modify their length in the field. A failure in the outer sheath can cause failure to the whole system due to moisture absorption by MgO. MI cables also have a limitation on the maximum circuit length for a given power output; this is a consequence of their rated maximum operating voltage and the power lost in the cold lead that could be tolerated. For a long time MI cables were limited to 600 V, and this restricted their length to no more than 500 feet with 50 Watt/foot. Recently a 4160 Volt cable was developed, allowing for longer circuits and lower heat losses in the cold zone. A 0.75" outer diameter cable of this type is able to supply 140 Watt/foot for 2,000 ft of heated length.

Polymer insulating heating cables are also power source heaters but they generate a much lower heating density compared to MI cables (maximum of 12.5 Watt/foot for a 3,608 ft long system) and operate at a maximum continuous temperature of 50° C.

Three-phase polymer insulated cables usually provide the most thermally and cost efficient configuration of this type. These cables may consist of three conductors running in parallel. The conductors are insulated and enclosed with a metal braid, polymer outer jacket and final armor. Heat is generated by applying voltage across the conductors causing current flow and consequently resistance heating.

Polymer insulated cables' flat form give them better contact with the tubes and thus better heat transfer characteristics. They are easy to install and their length can be predetermined or field cut. Similar to MI cables, a failure in one part of the cable affects the whole circuit. These cables have been successfully implemented in hundreds of oil wells mainly for applications related to flow assurance—their use is limited by their low output heating density.

Skin effect heating tracers consists of a small diameter "heat tube" made of ferromagnetic material, usually carbon steel. An insulated conductor is longitudinally placed inside the heat tube and both of them are connected at one end of the tracer. At the other end, the power supply is connected to both the heat tube and the power cable, so that current flows in the conductor and returns in the heat tube. The heat tube is welded or mechanically attached to the tubes to be heated and the power source is either connected at the end or the middle of the system.

This type of heating systems forces the current to flow though thin inner skin in the heat tube as a way to increase the resistivity of the system and generate more electric resistive heating. This phenomenon occurs due to the proximity effect between the two AC currents flowing in opposite directions, in the insulated conductor and the heat tube, and their corresponding magnetic field. The skin depth dictates the increase in the resistivity and is related to the resistivity of heat tube's material and inversely proportional to its relative permeability and the frequency of the current supplied.

Skin effect tracers' most important advantage is the ability to be applied in applications requiring very long heating circuit (several miles of heated length). It can supply a heating density of up to 50 Watt/foot and maintain temperatures as high as 150° C., which makes it a very good solution for mitigating wax-related issues in deep oil production wells.

Self-regulating, or self-limiting, heating cables are temperature source heaters in a parallel circuit configuration that adopts its power output depending on the surrounding ambient temperature. A typical self-regulating heating tracer consists of two parallel copper bus wires connected to each other through the conductive core between them. The assembly is then enclosed in two layers of polymer jackets separated by metal braid for protection. The conductive core is responsible for the self-regulating behavior of the cable and is made of a blend of cross-linked long chain polymers, electrically conductive filler (usually carbon black) and stabilizers.

As the temperature around the polymer-conductive filler blend increases, the thermal expansion of the polymer causes a stress on the conductive filler's molecules to separate. Consequently, fewer conductive paths form between the two copper wires and a rapid increase in the electric resistivity by multiple orders of magnitude is produced. When the core is cooled, it contracts forming more conductive paths and reducing the resistance again. This series of consequences is what gives the self-regulating cables its immunity from developing hot spots and overheating problems. The thermal expansion's effect on the resistance occurs on a microscopic level, making the molecules of the core its own heater-thermostats.

An example of the rapid increase in resistivity with temperature for self-regulating elements can be clearly seen in Oakes, J. A., & Sandberg, C. L. (1973). Some Aspects of a Self-Limiting Resistive Electric Heating Element. IEEE Transactions on Industry Applications, IA-9(4), 462-466 available at http://doi.org/10.1109/TIA.1973.349975. This increase is referred to as the percolation threshold of the composite (the blend in the conductive core). The percolation threshold can be different for different blends and is affected by the molecular weight of the polymer and the particle size of the conductive filler.

The self-regulating cables were the first type of heating cables to be used in downhole applications. In addition to their unique immunity to overheating, they are also easy to design and install, and can be field cut to the desired length. However, their low heating density restricts their applications in the oil industry to freeze protection and flow assurance.

This method uses eddy currents and hysteresis losses to generate high heating density. The downhole implementation of these systems consists of several inductors attached to the production tubing facing the pay zone. Power is supplied to the inductors and eddy current is induced into the production casing, making it an inductively heated element. Heat is then transferred from the heated casing to the formation around it. Induction heating can supply a considerable amount of heating density, which makes it attractive for downhole applications involving around wellbore heating such as oil viscosity reduction, formation treatment and preheating of the reservoir prior other EOR process.

Low-frequency heating uses the resistance of around wellbore formation water to generate Ohmic heating. In such systems, power is transferred from the surface to a downhole electrode assembly through production tubing, electric cables or a combination of both. The electrode consists of bare casing pipe(s) facing, and in contact with, the desired zone. The electrode casing has fiberglass joints at their ends, for electrical insulation. The casing string above the electrode's top insulation joint can be used as the ground or current return.

The low frequency AC current delivered to the electrode is forced to flow through the adjacent formation water and then back to the power supply through the casing string. When the current flows though the electrolytic paths of the formation water, heat is generated by electric losses to the water and transferred to the rock matrix and other reservoir fluids by thermal conduction. The heated radius around the wellbore can be around 3 to 7 meters.

The length of the electrode and its position in the reservoir differs and has to be designed for each case. The amount of power for heating is strongly dependent on the production rate, thus reservoir simulation is critical to identify the operating power; too much power into the system can cause extensive temperatures and damage the casing.

The feasibility of applying low frequency heating systems is dictated by reservoir characteristics, as formation resistivity has to be at least 30 ohm-meter and pay thickness of at least 2 meters holding oil as heavy as 10-20 API with viscosity of at least 100 cP.

Self-Regulating Heating Cables have been used in the oil & gas industry, as outlined above. However, self-regulating heating cables are rated to transfer a maximum of 30 Watts per meter at 10 C (and decreases as temperature goes up), while an application like steam active insulation requires substantially more power: around 250 W/m at 200 C. Applications of Self-Regulating Heating Cables are generally limited to freeze protection. One of the main reasons why self-regulating cables cannot transfer higher power is that they have a small "heat transfer surface area" with the object being heated (i.e. small contact area between the cable and, for example, the pipe that is attached to). Because surface area (A) is directly proportional to heat transfer (Q). In the technology proposed, the heating element surrounds the pipe and thus employs lite, a smaller surface area leads to less heat transfer.

MI heating cables are another type of cable used in the oil & gas industry, however they are series type circuits, not parallel or self-regulating circuits. Therefore, these MI cables develop hotspots, burnout and cannot be used in active-insulation applications. Furthermore, they are not recommended for applications that require extensive power. In this regard, the amount of power that these MI cables can support is dictated by the dimensions of the cable. Being made of two concentric tubes carrying electric current separated by a small distance (annular space) filled with magnesium oxide; it is this distance that dictates how much voltage (power) can be transmitted via the cables before an electric breakdown occurs.

In view of the above deficiencies in the state of the art, there remains a need in the art for improved systems and methods for heating a conduit.

Table 6 includes the nomenclature utilized in the understanding herein

TABLE 6

| T | Temperature | °C. |
|---|---|---|
| $T_F$ | Temperature | °F. |
| $T_R$ | Absolute Temperature | °R |
| μ | Absolute viscosity | cP |
| v | Kinematic viscosity | cSt |
| ρ | Density | g/cm³ |
| API | API gravity | API |

SUMMARY OF THE DISCLOSURE

In a first aspect of the disclosure, there is provided a system comprising: an outer conduit; an inner conduit positioned within the outer conduit such that an annular space is defined between the outer conduit and the inner conduit; and a resistive heating material occupying at least a portion of an annular volume within the annular space and having a positive temperature coefficient of resistance.

By occupying, with the resistive heating material, a portion or all of the annular space defined between the outer and inner conduits, heat transfer from the resistive heating material to the interior of the inner conduit may be improved. A system according the present disclosure therefore makes efficient use of the annular space defined between the inner and outer conduits. The portion of the annular volume occupied by the resistive heating material may consist of an annular volume (e.g. a 360° annulus), or a sector or segment of an annular volume (e.g. a portion of 360° annulus). For example, the portion of the annular volume may consist of an annular volume that extends less than 360° (see FIG. 81 for an example of such a volume). The inner conduit may be positioned concentric to the outer conduit.

The resistive heating material may extend from the inner conduit to the outer conduit. Alternatively, the resistive heating material may extend partway from the inner conduit to the outer conduit, in which case one or more conductors may be provided to create an electrical flow path between the inner and outer conduits, via the resistive heating material.

The system may further comprise an electrical power source configured to apply a voltage between at least two of the outer conduit, the inner conduit, and the resistive heating material so as to increase a temperature of the resistive heating material. In particular, the electrical power source may be configured to apply a voltage between the outer conduit and the inner conduit. The electrical power source may be configured to output a DC signal or an AC signal with a frequency up to 200 kHz. The maximum frequency that may be used may depend on the material of the inner and outer conduits, and in particular the skin depth of the inner and outer conduits, for a given frequency.

The system may further comprise an annular dielectric element provided within the annular space. The dielectric element may comprise a ceramic. The ceramic may comprise one or more of aluminium oxide, boron nitride, and beryllium oxide. The dielectric element may comprise an air gap. The dielectric element may comprise a centralizer configured to space the inner conduit concentrically relative to the outer conduit.

The system may further comprise a downhole casing within which is positioned the outer conduit.

The resistive heating material may be a solid.

The resistive heating material may be a liquid having a viscosity of greater than 1,000 Pa·s.

The resistive heating material may comprise a conductive polymer composite. The conductive polymer composite may comprise a dielectric polymer and a conductive filler. The conductive filler may comprise one or more of carbon black, carbon nanotubes, carbon black nanoparticles, and carbon fibers. The conductive filler may comprise one or more of a metallic powder, metal flakes, metal-coated fibers, and metal nanowires. The conductive filler may comprise one or more of silver, copper, aluminum, and nickel. The conductive polymer composite may comprise one or more of: a stabilizing agent; a curing agent; and an oxidizer. For example, a conductive polymer composite comprising of FKM rubber (as defined by the ASTM D1418 standard) may include a stabilizing agent to be mixed with an oxidizer in order to allow the chemical curing process to occur. Alternatively, some conductive polymer composites do not need a stabilizing agent, a curing agent, or an oxidizer, such as ultra-high molecular weight polyethylene and PTFE. For applications that do not require high temperatures, low molecular weight polymers may be used.

Generally, the conductive polymer composite may comprise nanoparticles.

The outer conduit may comprise insulation for reducing heat loss.

The outer conduit and the inner conduit may be positioned within a wellbore.

The resistive heating material may prevent fluid flow from a first end of the inner conduit and the outer conduit to a second end of the inner conduit and the outer conduit. For example, the resistive heating material may prevent fluid flow from a first end of the annular volume to a second end of the annular volume.

The resistive heating material may be self-regulating.

The inner conduit and the outer conduit may comprise threaded ends, and the resistive heating material may extend a length of the inner and outer conduits, from one threaded end of the inner and outer conduits to the other threaded end of the inner and outer conduits.

The system may further comprise first and second annular dielectric elements provided at respective ends of the annular space, and the resistive heating material may extend along the inner and outer conduits, from the first annular dielectric element to the second annular dielectric element.

A thickness of the annular space may be from: about 1.2 cm to about 10.2 cm; less than 1.2 cm; or up to about 50.8 cm.

In a further aspect of the disclosure, there is provided a method of heating a conduit, comprising: positioning an inner conduit within an outer conduit such that an annular space is defined between the inner conduit and the outer conduit; providing a resistive heating material within the annular space such that the resistive heating material occupies at least a portion of an annular volume within the annular space, wherein the resistive heating material has a positive temperature coefficient of resistance; and applying a voltage between at least two of the outer conduit, the inner conduit, and the resistive heating material so as to increase a temperature of the resistive heating material.

Providing the resistive heating material may comprise injecting the resistive heating material within the annular space and allowing the injected resistive heating material to cure.

Prior to positioning the inner conduit within the outer conduit, the method may further comprise molding the resistive heating material to one of the inner conduit and the outer conduit.

The method may further comprise flowing a fluid within the inner conduit. The fluid may comprise one or more of oil, brine, natural gas, and water. The fluid may comprise water, and the temperature of the resistive heating material may be increased so as to convert the injected water to steam.

The method may further comprise controlling the applied voltage so as to control a temperature of a fluid within the inner conduit.

The present disclosure provides new and innovative methods for heating fluids using a heating element filling or partially filling an annular space between two tubes. An annular heater may comprise an outer pipe, an inner pipe concentrically positioned within the outer pipe, a dielectric centralizer separating the inner pipe and the outer pipe and a heating element located between the inner pipe and the outer pipe.

The present disclosure provides new and innovative layouts, designs and uses of materials in the system, which allow a much higher heat transfer and power input while having the self-regulating behavior, in contrast to existing heating techniques such as Self-Regulating Heating Cables and Mineral Insulated heating cables.

In an example embodiment, an annular heater comprises an outer pipe; an inner pipe concentrically positioned within the outer pipe; a dielectric centralizer separating the inner pipe and the outer pipe; and a heating element at least partially filling the annular space between the inner pipe and the outer pipe.

In an example embodiment the dielectric centralizer comprises a ceramic. In an example embodiment, the dielectric centralizer comprises teflon. In an example embodiment, the ceramic comprises aluminum oxide.

In an example embodiment, the dielectric centralizer is configured to provide an equal distance between the inner pipe and the outer pipe along the length of the inner pipe.

In an example embodiment, the heating element is a viscus fluid conductive polymer composite. In another example embodiment, the heating element is a solid conductive polymer composite. In an example embodiment, the conductive polymer composite comprises a dielectric polymer and a conductive filler. In an example embodiment, the conductive polymer composite further comprises a stabilizing agent. In an example embodiment, the conductive polymer composite further comprises colloidal fillers.

In an example embodiment, the conductive filler is selected from the group consisting of carbon black, carbon nanotubes, carbon fibers and combinations thereof.

In an example embodiment, the conductive polymer composite comprises a polymer selected from the group consisting of high and ultra-high molecular weight particles.

In an example embodiment, the conductive filler is selected from the group consisting of metallic powders, metal flakes, metal-coated fibers, and metal nanowires and combinations thereof. In an example embodiment, the conductive filler comprises silver, copper, aluminum and/or nickel. In an example embodiment, the ceramic comprises boron nitride, beryllium oxide, or combinations thereof.

An example method for producing an annular heater comprises positioning an inner pipe within an outer pipe; injecting an electrically conductive polymer composite into an annular space between the inner pipe and the outer pipe; positioning a dielectric centralizer between the inner pipe and the outer pipe at a first position.

An example method of heating comprises applying an electrical current to an inner pipe and an outer pipe to create a voltage gap between the inner pipe and the outer pipe, wherein the voltage gap is bridged by a heating element extending from a dielectric centralizer to a dielectric insulation terminator; increasing a temperature of the heating element from a first temperature to a second temperature, wherein the heating element comprises an electrically conductive polymer composite; phase shifting the electrically conductive polymer composite from a first phase to a second phase, wherein the resistivity of the first phase is lower than the resistivity of the second phase, the first phase corresponding to the first temperature and the second phase corresponding to the second temperature.

In an example method, the electrical current is a low frequency alternating current. Direct current can also be used in applications where there is a lower risk of corrosion. The alternating current can either be high frequency or low frequency. Low frequency may induce lower skin and proximity effects.

The method may further comprise heating or maintaining the temperature of an injecting fluid located within the inner pipe. The method may further comprise heating or maintaining the temperature of oil flowing through the inner pipe. The method may further comprise extracting oil from within the earth through the inner pipe. The method may further comprise heating a formation around the wellbore using the electrical current.

BRIEF DESCRIPTION OF THE FIGURES

FIG. 36 depicts chemical and physical properties of Carbon Conductive Grease

FIG. 37 depicts a resistivity apparatus

DETAILED DESCRIPTION

Numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context.

Figure 1:
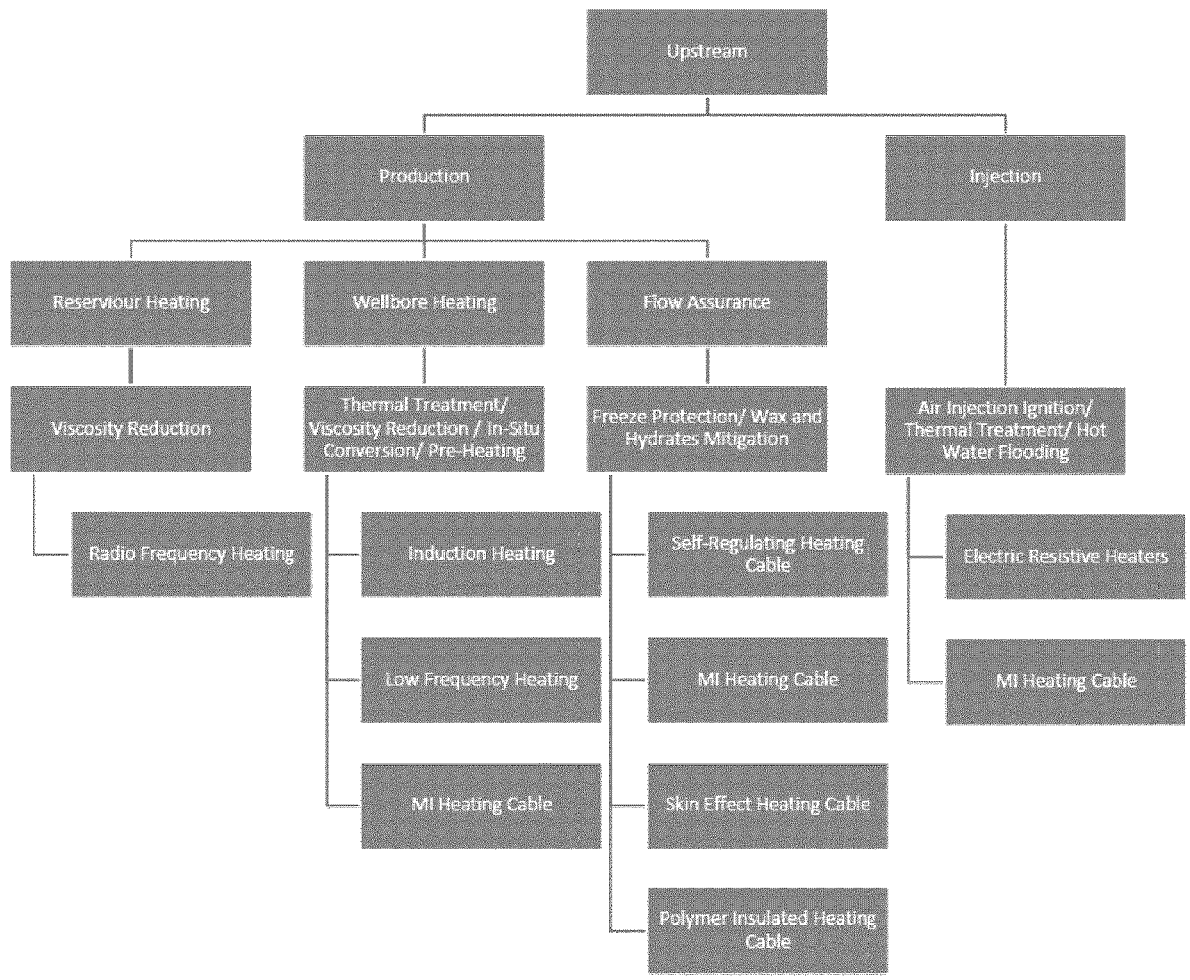
FIG. 1 is an organizational chart depicting upstream and midstream heating techniques.
Figure 2:
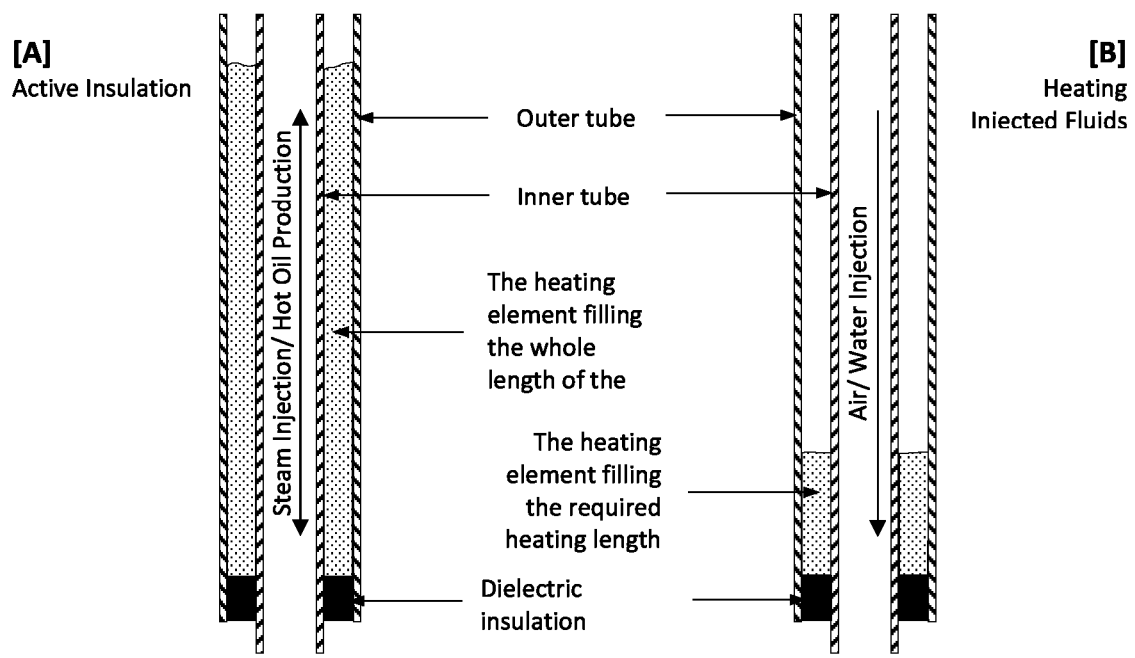
FIG. 2 depicts example schematics of Downhole Annular Heating (DAH) for [A] active insulation and [B] heating injected fluids.
Figure 3:
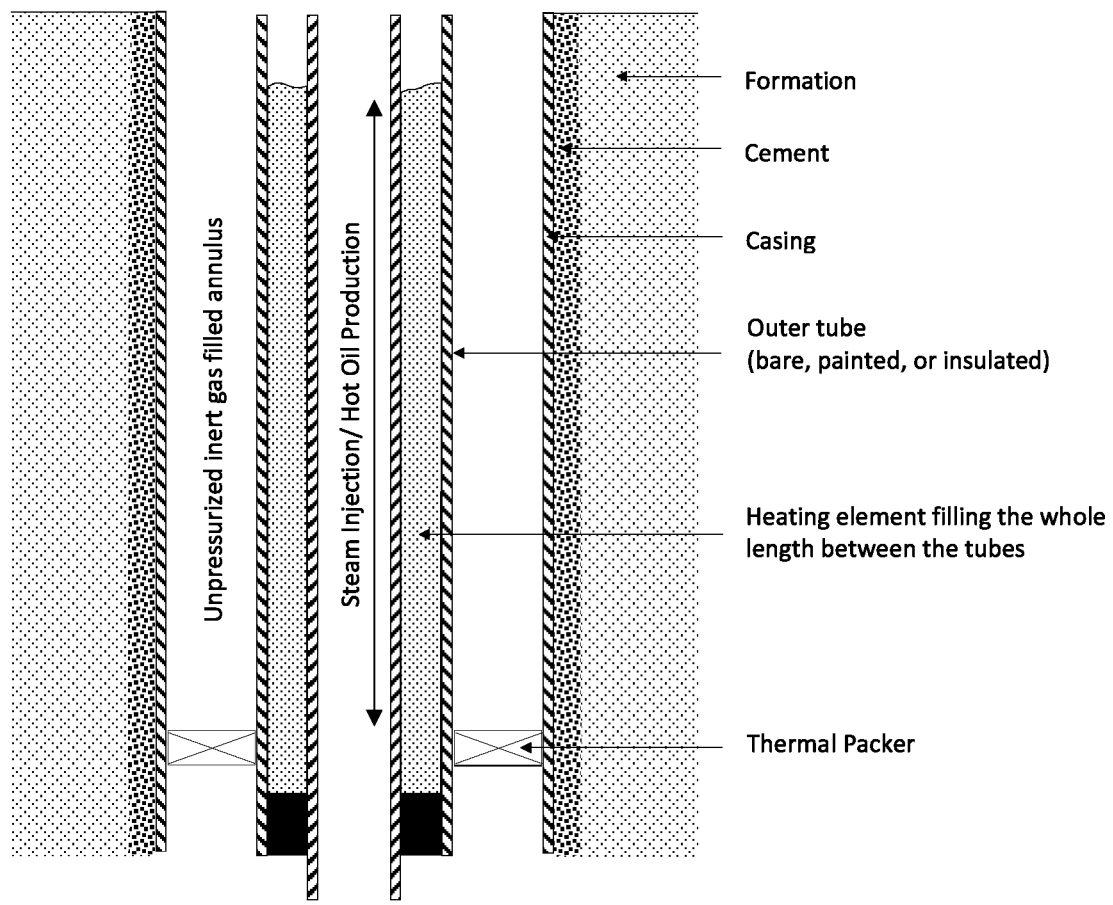
FIG. 3 depicts an example schematic of DAH for active insulation.

Downhole Annular Heating (DAH) is proposed to heat injected fluids downhole, such as heating air for formation ignition and water for hot waterflooding projects. It can also be used as active insulation to maintain the temperature of the injected fluids (steam, hot water, etc.), or the hot crudes produced from deep formations or thermal EOR (Enhanced Oil Recovery) projects. A schematic of DAH's layout for different applications is shown in FIG. 2.

DAH was a name used in the development of the present disclosure, but as the same concept can be used in other non-subsurface applications, another way to describe DAH includes Self-regulating Annular Heating. In this regard, there is a need for this solution in the midstream industry (oil and gas pipelines). The disclosure is not limited to downhole annular heating and the applications of the disclosure can include upstream oil and gas, midstream oil and gas, downstream oil and gas, district cooling and heating, industrial manufacturing and other applications where the benefits of the presently described Self-regulating Annular Heating methods and products provide benefit. It is to be understood that, unless otherwise noted, Self-regulating Annular Heating and DAH are interchangeable as used herein.

The main working mechanism for steam-based enhanced oil recovery projects is to heat the oil in place in order to reduce its viscosity and thus improve its mobility ratio. Injected steam quality is a vital parameter for the performance of the process, as it affects the quantity of latent heat carried by steam. This is especially true for SAGD (Steam Assisted Gravity Drainage) where high fraction of vaporize steam is essential for the process to operate as intended.

Heat losses from the injected steam to the wellbore negatively affect steam quality and thus reduce the process's efficiency. Injecting steam at high rates helps reduce this effect; however, the associated elevation in frictional pressure may limit the injection depth. Injecting steam at higher pressure consequently means injection at higher temperatures, and thus more heat transfer/loss to the wellbore at a given formation temperature gradient.

The size of the inner tube may affect the change in pressure of the injected steam and thus its temperature. For a given set of conditions, injecting steam through a 2" tubing causes the steam's temperature to be very close to its surface temperature throughout the length of the tubing (3,500 ft); because static pressure balances out the pressure drop due to friction. For the same set of conditions, injecting through a 3" tubing leads the static pressure to cause an elevation in pressure that is higher than the pressure drop due to friction; consequently steam temperature increases slightly with depth. It should be noted here that steam could transfer all of its latent heat (thus have steam quality of 0) and still maintain its temperature.

Passive insulation of injection tubing is currently the industry's best solution to reduce wellbore heat losses in steam operations. Different insulation techniques have been proposed and field-proven to reduce steam quality losses; this includes pressurized and unpressurized inert gas filled tubing-casing annulus, painting the injection tube, vacuum insulated tubing (VIT), and fluid filled annulus using silicate foam or gelled oil. Each of these techniques has a limitation either on its working mechanism or its efficiency. As a rule of thumb, steam projects are not recommended for reservoirs deeper than 1,000 m (3,281 ft), mainly due to the high heat losses to the wellbore that are expected in deeper formations even with insulation in place. Methods such as SAGD have a lower depth limitation, as they require steam quality to be exceptionally high for it to function.

In this application, DAH acts as an active insulation for the injection tubing. This is done by placing the heating element substantially the whole length of the double-tube annulus and operating at the same temperature of the injected steam. Unlike passive insulation, DAH eliminates heat transfer from injected steam to its surroundings and thus maintains its surface quality until it reaches the formation. This allows steam-based projects to be implemented for much deeper reservoirs, as well as significantly improved process efficiencies.

No heat transfer will occur between steam and the inner pipe; as they will have the same temperature. However, heat transfer will still take place between DAH's outer tube and the wellbore. The rate of heat transfer will be the same as when steam is injected without the system through an injection tube of the same size as the outer tube of the DAH. This heat loss may dictate the power requirement of the system and may depend on the operating temperature, depth, outer tube size, outer tube-casing annular space size, thermal properties of the wellbore and casing cement, and of course whether or not the outer tube is insulated by any means.

Heat requirements of this implementation were investigated by calculating the heat losses to the wellbore under different conditions. The well configuration adopted for this study assumes an unpressurized inert gas-filled annulus between DAH's outer tube and the casing. The outer tube was either bare tubing, painted with aluminum paint, or insulated with a 0.5" thick calcium silicate insulation. The layout and parameters are presented in Table 7. The calculations conducted assume a negligible heat transfer in the annulus by convection and a uniform fixed temperature across the length of the outer tubing.

TABLE 7

Parameters used for steam active insulation's power requirement calculations.

| Steam surface quality | | | 0.8 | | |
|---|---|---|---|---|---|
| Injection pressure | kPa | | 2,000 | | |
| Steam temperature | ° C. | | 212 | | |
| Outer tube size (API) | mm | OD | 88.9 | 101.6 | 114.3 |
| | (inch) | | (3.5) | (4) | (4.5) |
| | | ID | 70.2 | 88.3 | 97.2 |
| | | | (2.764) | (3.476) | (3.826) |
| Casing size (API) | mm | OD | 177.8 (7) | | |
| | (inch) | ID | 161.7 (6.366) | | |
| Hole Size | mm | | 244.5 (9.625) | | |
| | (inch) | | | | |
| Thickness of insulation | mm | | 12.7 (0.5) | | |
| | (inch) | | | | |
| Emissivity of tubes | | | 0.9 | | |
| Emissivity of aluminum paint | | | 0.4 | | |
| Injection time | days | 10 | 100 | 1,000 | |
| Thermal conductivity of insulation (calcium silicate) | kW/ m · K | | 0.00005 | | |
| Thermal conductivity of annular fluid (inert gas) | kW/ m · K | | 0.000026 | | |
| Thermal conductivity of formation | kW/ m · K | | 0.00261 | | |

TABLE 7-continued

Parameters used for steam active insulation's power requirement calculations.

| Thermal conductivity of cement | kW/ m · K | 0.00087 |
|---|---|---|
| Thermal conductivity of tubes' metal (carbon steel) | kW/ m · K | 0.054 |
| Thermal diffusivity of formation | m²/s | $1.07 \times 10^{-6}$ |
| Surface temperature | ° C. | 15 |
| Geothermal gradient | ° C./ 100 m | 3.645 |

Figure 4:
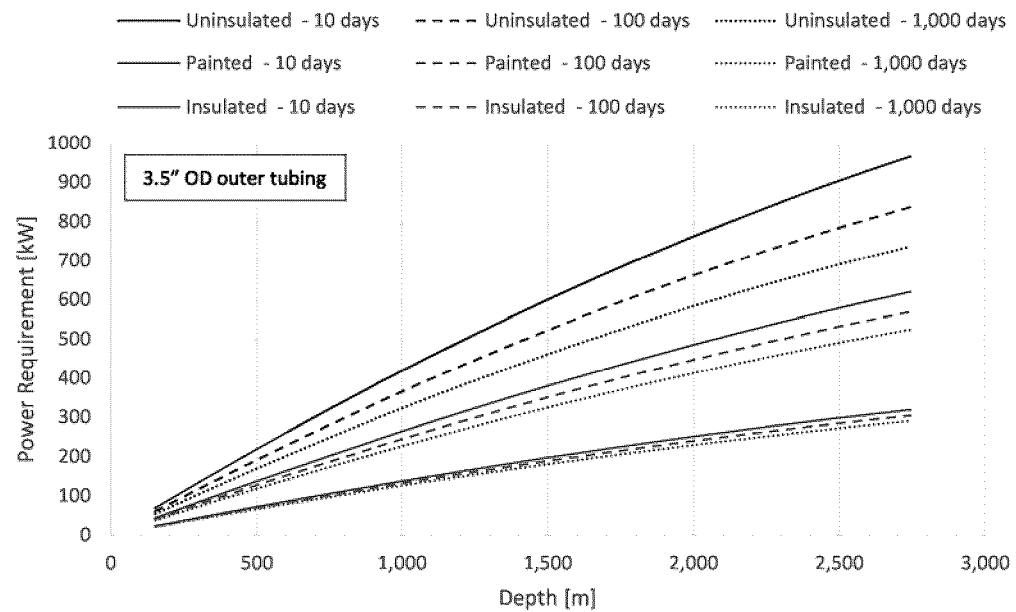
FIG. 4 depicts a graphical representation of the power requirement for steam active insulation at different layouts and injection times versus depth.

FIG. 4 presents the heat required to maintain the temperature of steam with the conditions listed in Table 7. FIG. 4 shows that bare tubing will require much more power to compensate for the heat lost to the wellbore, compared to painted tubing or tubing insulated with calcium silicate. It was noted that the significance of insulating or painting the tubing increases as the depth increases. The working principle of using calcium silicate insulation is to reduce the temperature of the surface facing the casing and thus reduce the heat transferred to the annulus and formation. On the other hand, using aluminum paint reduces the emissivity of the outer tube and thus the heat transferred by radiation, which accounts for two thirds of the heat loss. Heat transferred from the casing to the formation takes place by conduction and is a function of time. This phenomenon is responsible for the decline in the power requirement with time observed in FIG. 4, as heat propagates around the casing. The significance of this effect depends on the temperature of the casing, and thus it is noted that bare tubing will exhibit a significant reduction in the power requirement with time, compared to the other layouts presented in FIG. 4.

Figure 5:
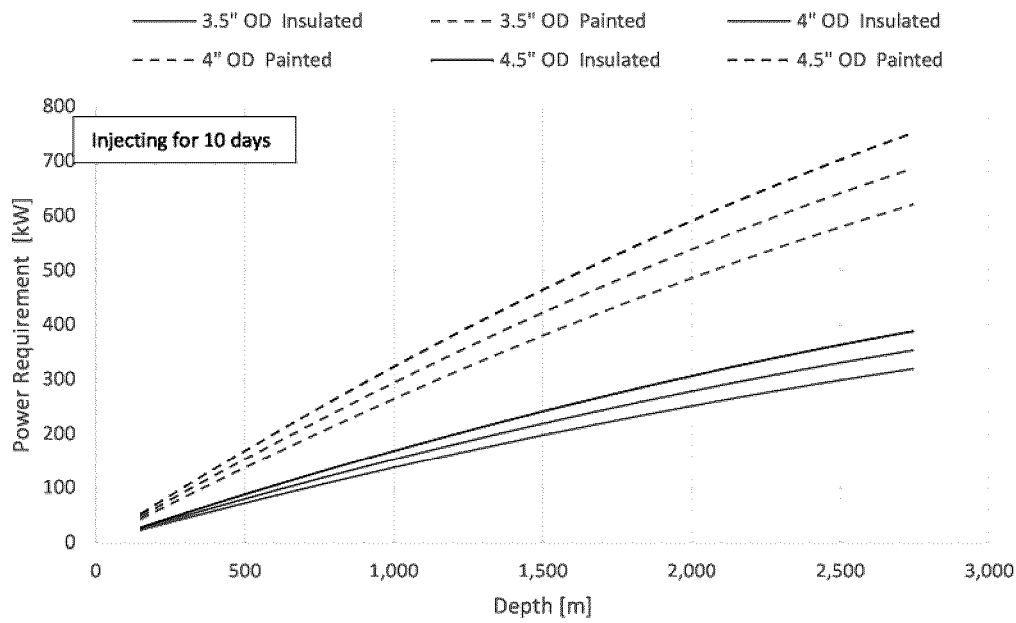
FIG. 5 depicts a graphical representation of the power requirement for steam active insulation at different tubing sizes versus depth.

FIG. 5 illustrates the effect of changing the size of the outer tubing on the power requirement of the system for the conditions presented in Table 7. It is shown that as the tubing size increases, the power requirement also increases. Without wishing to be bound by theory, it is believed that this is mainly attributed to two causes: the larger surface area for heat transfer with the casing offered by bigger tubes, and the fact that larger tubes reduce the size of the inert gas filled annulus which further increases the overall heat transfer with the casing.

Oil produced from deep formations or from thermal EOR methods tends to have high temperatures; which is quite favorable, especially for heavy crudes, as it reduces its viscosity and improves its outflow performance. However, as these hot crudes run through the production tubing, they lose some of their heat content to the colder wellbore. This temperature drop causes the viscosity of the flowing crudes to increase and consequently the productivity of the well may be affected. Other unfavorable consequence of the temperature drop include the formation and deposition of gas hydrates, paraffins and asphaltenes, which may build up and cause further reduction in production and plugging of the tubing, as discussed herein.

The significance of the phenomena described above depends on the composition of the crude, the expected temperature difference (between oil and formation temperature), bottomhole flow rate and tubing size. Production from deep water involves many of the described complications as oil flows through the offshore riser and undergoes forced convection with the surrounding cold water and air.

Similar to steam, passive insulation is the industry's most popular solution to reduce heat losses to the wellbore. As discussed above, many techniques have been considered and implemented in this regard, including the use of gelled oil and silicate foam, the use of vacuum insulated tubing, and the injection of steam and hot water in the annulus. Resistive heating cables have been used as a flow assurance technique to maintain a temperature above the wax appearance temperature.

DAH is proposed to act as active insulation for oil production tubing. Similar to steam active insulation, this is done by placing the heating element over the whole length of the double-pipe annulus and operating the system at the oil's downhole temperature. The power requirement will again be equivalent to the amount of heat lost to the surroundings, which depends on the operating temperature, well layout and the thermal properties of the formation. DAH could also be used to further elevate the temperature of the produced oil, instead of only maintaining its temperature. In this case, however, additional power may need to be supplied, depending on the flow rate and the desired raise in temperature.

Figure 6:
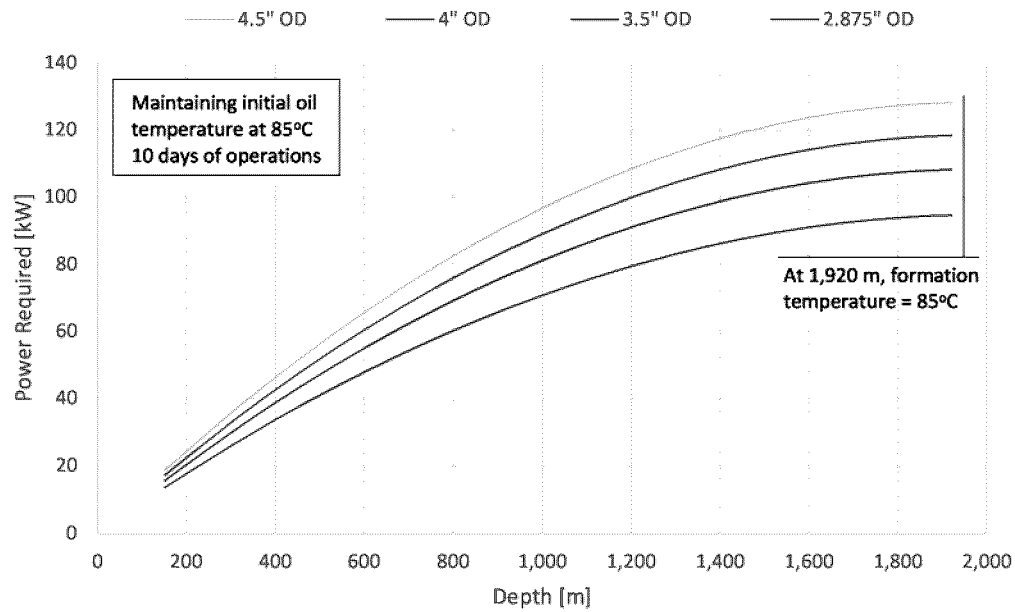
FIG. 6 depicts a graphical representation of the power requirement for oil active insulation at different tubing sizes versus depth.
Figure 7:
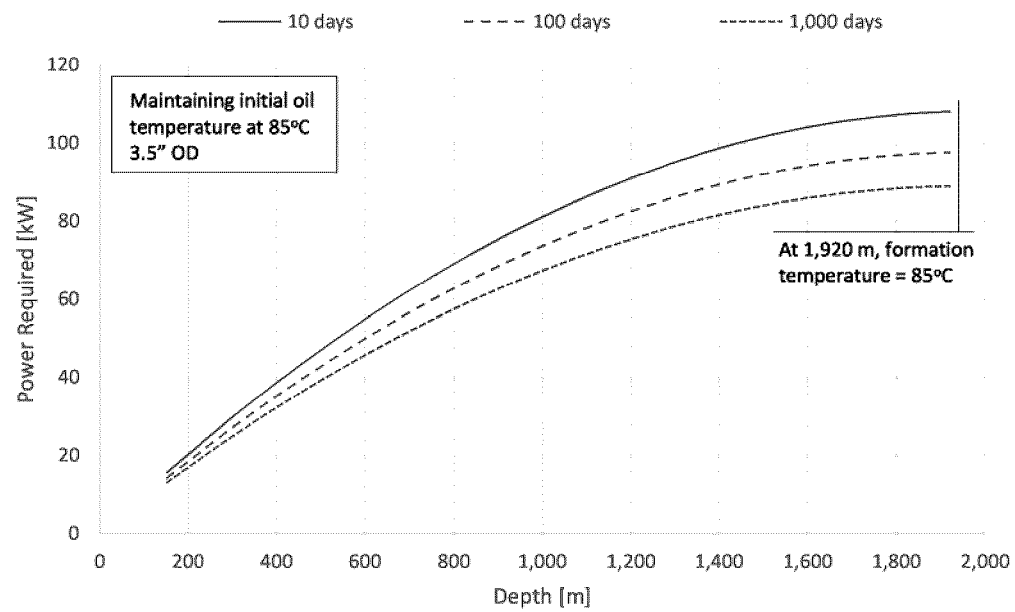
FIG. 7 depicts a graphical representation of the power requirement for oil active insulation after different operation times versus depth.
Figure 8:
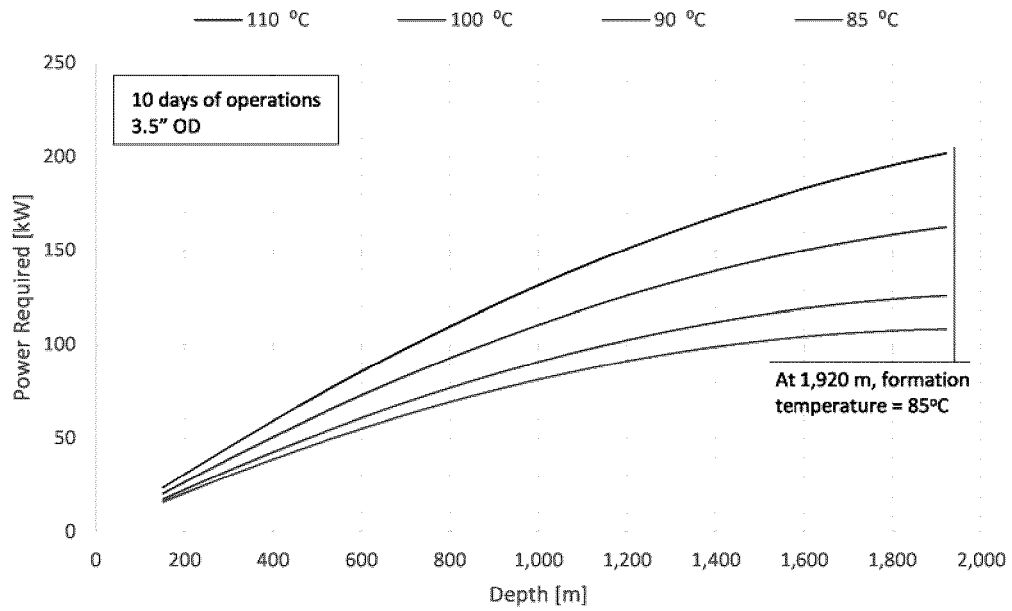
FIG. 8 depicts a graphical representation of the power requirement for oil active insulation at different operating temperatures versus depth.

The expected power requirement for oil active insulation was calculated for different tubing sizes, injection times and operating temperatures, and the results are presented in FIGS. 6 through FIG. 8. Reservoir conditions and well dimensions used are presented in Table 8.

tube-casing annular space. FIG. 7 shows that power requirement decreases with operating time, as heat propagates around the well causing heat loss to the formation to decline. FIG. 8 shows that power requirement increases with the increase in operating temperature, due to the elevation in the rate of heat transfer at higher temperature differences.

The slopes of the curves in FIG. 6 and FIG. 7 tend to decrease as they approach 1,920 m, where formation temperature equals the operating temperature assumed (85° C.). This is caused by the increase in the wellbore's average temperature with depth, which yields lower temperature differences between the system and the formation; thus a reduction in overall heat transfer per unit length. This behavior fades out as the operating temperature increases, as seen in FIG. 8.

A well's deliverability was tested using nodal analysis to study the potential effect of active insulation on a well's productivity and downhole flowing pressure (Pwf). This was done by plotting the reservoir's In-flow Performance Relationship curve (IPR) and the Vertical Performance Relationship curve (VPR) of wells with and without active insulation. As in traditional nodal analysis, the intersection between the IPR and VPR curves shows the expected production rate and bottomhole flowing pressure for the given reservoir and well conditions. Comparing production

TABLE 8

Parameters used for oil active insulation's nodal analysis and power requirement calculations.

| | | | | | | |
|---|---|---|---|---|---|---|
| Operating temperature (oil initial temperature) | ° C. | | 85 | 90 | 100 | 110 |
| Oil API gravity | API | | | 9 | | |
| Reservoir depth | m | | | 1,920 | | |
| Formation thickness | m | | | 30.5 | | |
| Wellhead flowing pressure | kPa | | | 690 | | |
| Reservoir pressure | kPa | | | 41,369 | | |
| Permeability | $m^2$ | | | $1.48 \times 10^{-12}$ | | |
| Skin factor | | | −3 −1.5 | 0 | 1.5 | 3 |
| Formation volume factor | $Rm^3/m^3$ | | | 1 | | |
| Outer tube size (API) | mm (in) | OD | 73 | 88.9 | 101.6 | 114.3 |
| | | | (2.875) | (3.5) | (4) | (4.5) |
| | | ID | 62 | 70.2 | 88.3 | 97.2 |
| | | | (2.441) | (2.764) | (3.476) | (3.826) |
| Inner tube size (API) | mm (in) | OD | 60.2 | 73 | | 88.9 |
| | | | (2.375) | (2.875) | | (3.5) |
| | | ID | 50.7 | 62 | | 70.2 |
| | | | (1.995) | (2.441) | | (2.764) |
| Casing size (API) | mm (in) | OD | | 177.8 (7) | | |
| | | ID | | 161.7 (6.366) | | |
| Hole Size | mm (in) | | | 244.5 (9.625) | | |
| Drainage radius | m | | | 609.6 | | |
| Absolute roughness of tubes | m | | | $7.0 \times 10^{-5}$ | | |
| Emissivity of tubes | | | | 0.9 | | |
| Emissivity of aluminum paint | | | | 0.4 | | |
| Injection time | days | | 10 100 | | 1,000 | |
| Thermal conductivity of annular fluid (inert gas) | kW/m · K | | | 0.000026 | | |
| Thermal conductivity of formation | kW/m · K | | | 0.00261 | | |
| Thermal conductivity of cement | kW/m · K | | | 0.00087 | | |
| Thermal conductivity of tubes' metal (carbon steel) | kW/m · K | | | 0.054 | | |
| Thermal diffusivity of formation | $m^2/s$ | | | $1.07 \times 10^{-6}$ | | |
| Surface temperature | ° C. | | | 15 | | |
| Geothermal gradient | ° C./100 m | | | 3.645 | | |

The trends of the power requirement for this application with the changing variables studied matches that found for steam active insulation. Oil active insulation, however, was found to require lower power input, mainly due to the lower operating temperatures. FIG. 6 shows that power requirement increases with the increase in DAH outer tubing's size; due to the higher surface area available for heat transfer with the casing and the formation, and the decrease in the outer rates of wells with and without active insulation showcases the expected outcomes from application of the system.

Figure 9:
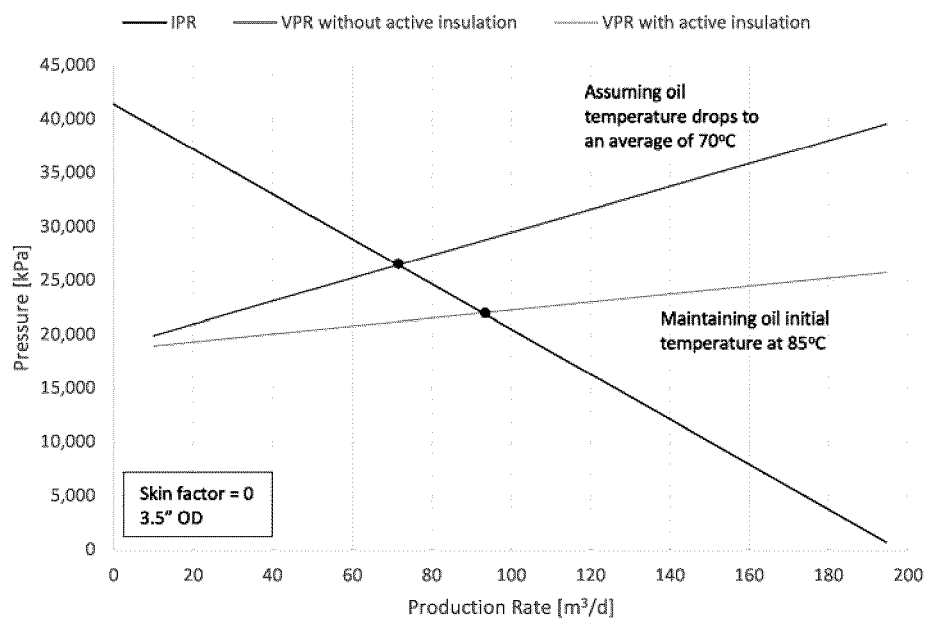
FIG. 9 depicts a graphical representation of the nodal analysis for wells with and without active insulation.

FIG. 9 shows an example of a nodal analysis conducted for a well with active insulation that maintains the temperature of oil at 85° C., and another one where the average temperature drops to 70° C. The figure shows that in this scenario, the active insulated well had 30% more production for the same reservoir conditions. To study the significance of applying the system under different reservoir and well parameters, nodal analysis plots were constructed at various production tubing sizes and skin factors, and the results of the study are presented in Table 9 and Table 10 respectively. Table 9 shows that as production tubing size increases, the expected production increases but the improvement in production for wells with active insulation decreases. Table 10 shows that as the skin factor decreases both the expected production and significance of applying active insulation increases.

The working principle of active insulation in enhancing oil wells' productivity is mainly to reduce the pressure drop due to friction in production tubing by eliminating the increase in oil viscosity as oil gets colder while being produced. This explains the performance of the system noted in Table 9 and Table 10. Parameters such as tubing size and length affect the pressure drop due to friction and consequently the increase in production as a result of maintaining the oil's temperature. Reservoir parameters such as skin factor, reservoir pressure and permeability affect the downhole flow rate and velocity of the oil at the given tubing size, and thus the frictional pressure drop.

It should be noted that the effect of asphaltenes deposition as a result of changes in temperature was not considered in this study. The effect of oil velocity on its average temperature as tubing size or reservoir parameters change was also not considered; instead, the performance of the system was analyzed at different oil average temperatures, as seen in Table 9 and Table 10.

TABLE 9

Results of nodal analysis conducted for wells with and without active insulation varying production tubing size.

| Inner tube | | Production with active insulation | | Production without active insulation | | | | | | | | | | |
|---|---|---|---|---|---|---|---|---|---|---|---|---|---|---|
| | | Maintaining 85° C. temperature | | 70° C. Average temperature | | Expected increase in production with DAH | | 65° C. Average temperature | | Expected increase in production with DAH | | 60° C. Average temperature | | Expected increase in production with DAH |
| OD | ID | Production rate | $P_{wf}$ | Production rate | $P_{wf}$ | | DAH | Production rate | $P_{wf}$ | | DAH | Production rate | $P_{wf}$ | | DAH |
| [mm] | [mm] | [m³/d] | [kPa] | [m³/d] | [kPa] | [m³/d] | [%] | [m³/d] | [kPa] | [m³/d] | [%] | [m³/d] | [kPa] | [m³/d] | [%] |
| 60.3 | 50.7 | 78.3 | 24,988 | 50.4 | 30,819 | 27.9 | 55.3% | 39.7 | 33,062 | 38.6 | 97.2% | 29.5 | 35,199 | 48.8 | 165.5% |
| 73.0 | 62.0 | 92.8 | 21,944 | 71.6 | 26,398 | 21.3 | 29.8% | 61.0 | 28,598 | 31.8 | 52.1% | 49.3 | 31,059 | 43.6 | 88.4% |
| 88.9 | 70.2 | 98.6 | 20,734 | 82.5 | 24,117 | 16.2 | 19.6% | 73.5 | 25,991 | 25.1 | 34.2% | 62.5 | 28,291 | 36.1 | 57.8% |

TABLE 10

Results of nodal analysis conducted for wells with and without active insulation varying production tubing size.

| | Production with active insulation | | Production without active insulation | | | | | | | | | | |
|---|---|---|---|---|---|---|---|---|---|---|---|---|---|
| | Maintaining 85° C. temperature | | 70° C. Average temperature | | Expected increase in production with DAH | | 65° C. Average temperature | | Expected increase in production with DAH | | 60° C. Average temperature | | Expected increase in production with DAH |
| Skin Factor | Production rate | Pwf | Production rate | $P_{wf}$ | | DAH | Production rate | $P_{wf}$ | | DAH | Production rate | $P_{wf}$ | | DAH |
| | [m³/d] | [kPa] | [m³/d] | [kPa] | [m³/d] | [%] | [m³/d] | [kPa] | [m³/d] | [%] | [m³/d] | [kPa] | [m³/d] | [%] |
| −3 | 132.5 | 23,407 | 93.3 | 28,721 | 39.2 | 42% | 76.3 | 31.033 | 56.3 | 73.8% | 58.8 | 33,402 | 73.8 | 125.5% |
| −1.5 | 109.2 | 22,547 | 81.0 | 27,460 | 38.2 | 34.8% | 67.8 | 29.680 | 41.1 | 61.0% | 53.6 | 32,127 | 55.6 | 103.7% |
| 0 | 92.8 | 21,944 | 71.6 | 26,398 | 21.3 | 29.8% | 61.0 | 58.598 | 31.8 | 52.1% | 49.3 | 31,059 | 43.6 | 88.4% |
| 1.5 | 80.7 | 21,499 | 64.1 | 25,601 | 16.7 | 26.0% | 55.5 | 27.713 | 25.3 | 45.5% | 45.6 | 30,151 | 35.2 | 77.1% |
| 3 | 71.4 | 21,156 | 58.0 | 24,954 | 13.4 | 23.1% | 50.9 | 26.975 | 20.6 | 40.4% | 42.4 | 29,370 | 29.0 | 68.5% |

Electrical ignition is a versatile artificial ignition method for in-situ combustion, mainly for its simplicity and relatively low cost. Practically, the maximum power of downhole electric heaters in air injection projects is limited to 50 kW. Although it is possible to send more power to the available heaters, it is a highly not recommended practice as it would significantly increase the risk of burning out. The use of DAH to ignite the formation would potentially eliminate the risk of burning out, as explained herein, and thus increase the allowable power that could be generated downhole.

Figure 10:
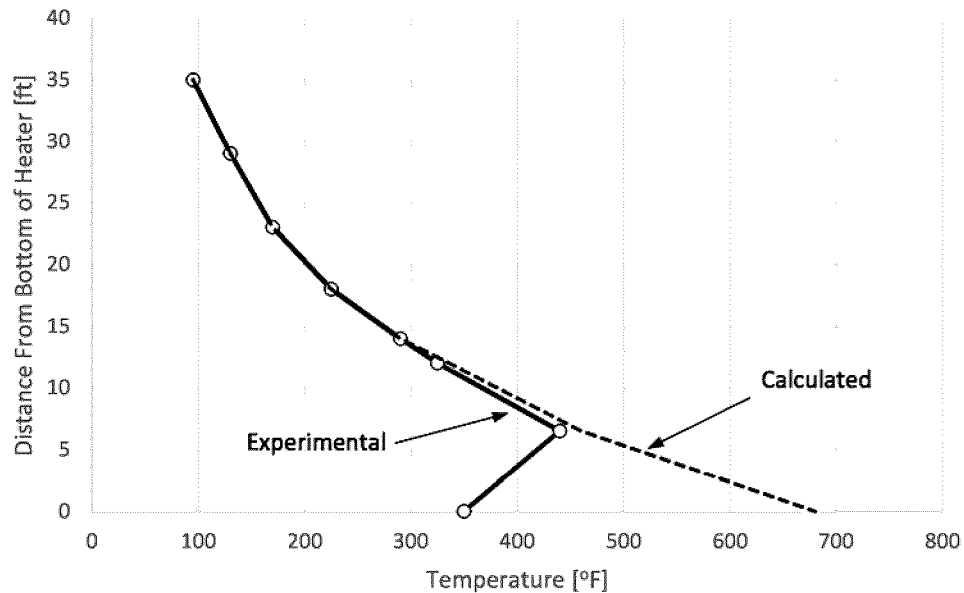
FIG. 10 depicts a graphical representation of the temperature distribution of downhole air heater placed opposite to formation of the same length.

Existing downhole air electric heaters develop an uneven temperature distribution along their length due to the cumulative reduction of air convection cooling through the heater. This causes the bottom section of the heater to have higher temperatures compared to the top section. In air injection projects, this leads to the initiation of the ignition only in the region opposite to the bottom of the heater. In order to ignite the entire sand face of the formation, the heater will have to be operated for similar periods of time at several higher locations. To illustrate this phenomenon, the temperature profile of an air heater placed adjacent to a permeable formation of the same length was studied and the results are presented in FIG. 10. The data was obtained from a lab test designed to simulate constant air injectivity of 1.8 Mscf/day-ft where the heater is operated at 8.4 kW.

Even though many of the available heaters use metal composites as their heating elements, which usually have a positive temperature coefficient of resistance, their series layout still make them vulnerable to burning out and developing an uneven temperature disruption. This is because the same electric current will flow through all connected resistors, regardless of the changes in resistivity values caused by the difference in the temperature across the heater. Using DAH with a PTC heating element would potentially allow for more uniform temperature distribution, which would consequently allow for a uniform ignition across the length of the formation. DAH is expected to behave that way because of its parallel layout, which allow for the distribution of current depending on the resistivity of the different regions.

Figure 11:
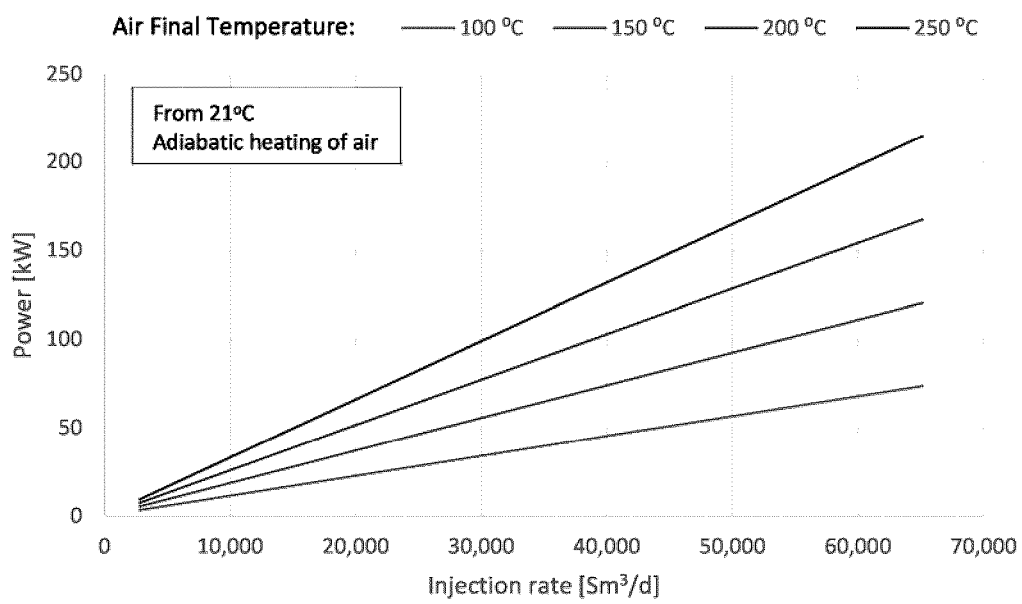
FIG. 11 depicts a graphical representation of the power requirement to heat air to different temperatures versus injection rates.

FIG. 11 presents the range of the expected power requirement needed to heat air at different injection rates and ignition temperatures. The injection rate will depend on the heat requirement and the thickness of the formation, while the ignition temperature is a property of the crude. These values are usually obtained from lab tests for every project. As expected, FIG. 11 shows that as air injection rate and required final temperature increase, the power needed to heat it also increases.

Figure 12:
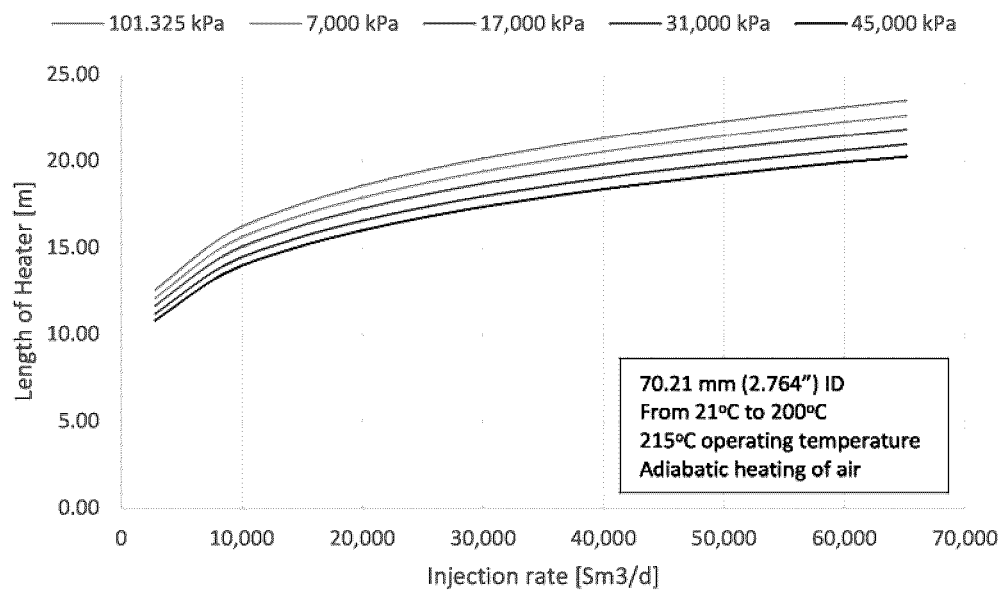
FIG. 12 depicts a graphical representation of the length of heater needed to heat air from 21° C. to 200° C. at different air injection pressures versus injection rate.

The length of the heater (length occupied by the heating element, as shown in FIG. 12) will depend on the injection rate, injection pressure, final temperature required, heater operating temperature and inner tubing's inner diameter. FIG. 12 shows the effect of injection pressures on the length of the heater. It is clear that an increase in injection pressure reduces the length needed. This is a consequence of the increase in air's density with elevation in pressure; as it, the density, affects air's thermal conductivity and the dynamic and kinematic viscosity.

Figure 13:
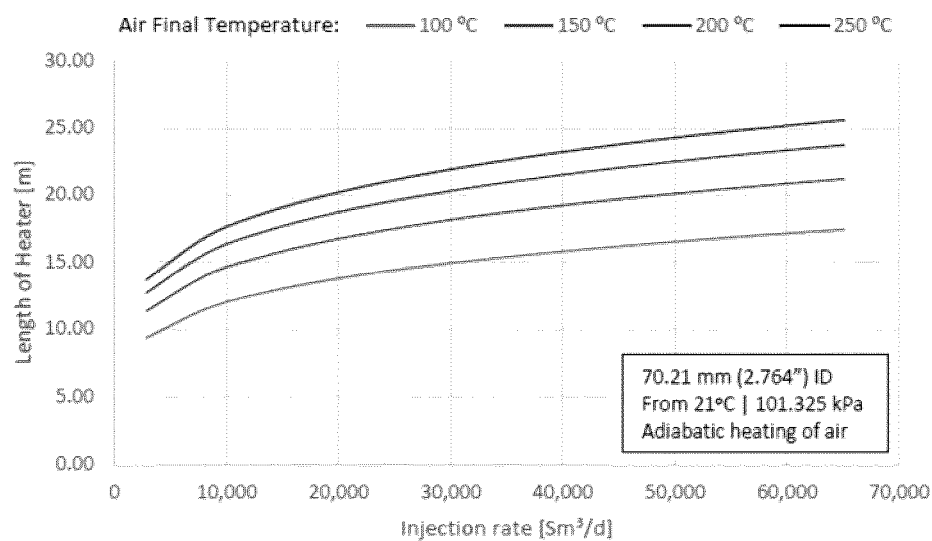
FIG. 13 depicts a graphical representation of the length of heater needed to heat air from 21° C. to different temperatures versus injection rate (operating at a temperature 15° C. higher than air final temperatures).
Figure 14:
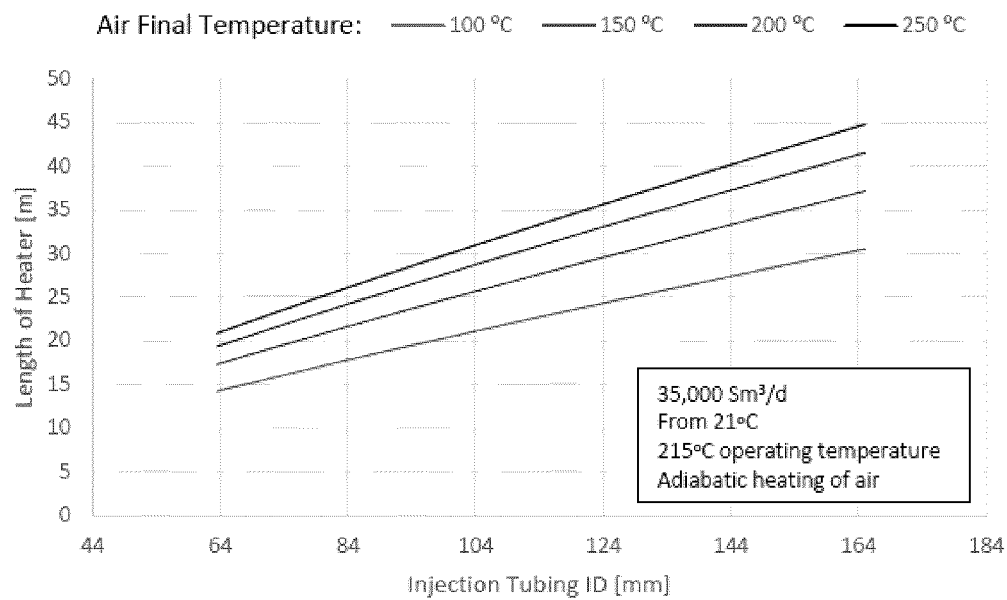
FIG. 14 depicts a graphical representation of the length of heater needed to heat air from 21° C. to different temperatures versus injection tubing size (operating at a temperature 15° C. higher than air final temperatures).
Figure 15:
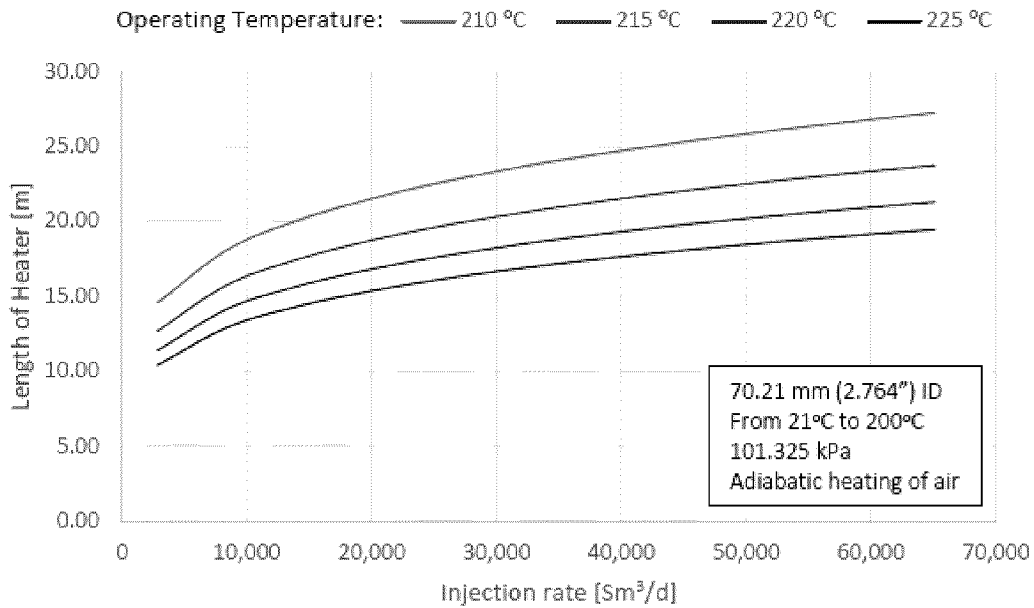
FIG. 15 depicts a graphical representation of the length of heater needed to heat air from 21° C. to 200° C. at different operating temperatures versus injection rate.

FIGS. 13 and FIG. 14 present the effect of air final temperature, injection rate and inner tubing size on the required heating length. The figures were constructed assuming operating temperatures (heater temperature) that is 15° C. higher than each of the given air final temperatures. FIG. 13 shows that the length of heater needed increases with higher injection rates; as more power needs higher surface area to be transferred. The effect of the injection tubing's size on the length of the heater is shown in FIG. 14. It can be seen that as tubing size increases, the length needed increases, as, for a given injection rate, smaller tubing will allow for higher velocities and thus more turbulence and more efficient heat transfer. FIG. 15 shows that operating at higher temperatures decreases the required length for a given air final temperature; as heat transfer occurs more rapidly at greater temperature differences.

Hot water injection is the least expensive thermal recovery method. Compared to steam-based methods it is also the simplest to implement and operate. As the name suggests, the process is similar to conventional waterflooding, the most utilized enhanced oil recovery method, except that hot water is injected from the surface instead of cold water. Heating the water has proven to be beneficial in increasing oil productivity and overall recovery when applied to reservoirs with heavy crudes. Compared to cold waterflooding, it was noted that hot waterflooding pilots have higher water injectivity and longer breakthrough times; thus higher recovery.

Water's heat capacity is lower than that of steam, thus the efficiency of the process is not expected to be as high for heating the oil. Nevertheless, hot waterflooding is generally considered as an alternative when steam is not feasible due to high reservoir pressure, deep formation (steam is not an option for formations deeper than 1,000 m), or if the formation is expected to exhibit clay swelling issues with steam. Hot waterflooding is also more efficient in maintaining reservoir pressure, compared to steam-based projects.

Hot waterflooding is rarely used for oil recovery due to the excessive heat loss in wellbore, formation and surface facilities. These losses significantly decrease the temperature of the water and thus negatively affect the performance of the process. Surface heaters are usually used to heat the water and insulated injection tubing is utilized in order to minimize the heat losses to the wellbore. Although using downhole heaters would eliminate these losses and consequently increase process's efficiency, they are currently not a viable option as heating water requires relatively high power; thus any available electric downhole heater would develop hotspots and eventually burnout. Similar to air heating, DAH could be an attractive option to heat water in hot waterflooding projects due to its potential immunity from burning out.

Figure 16:
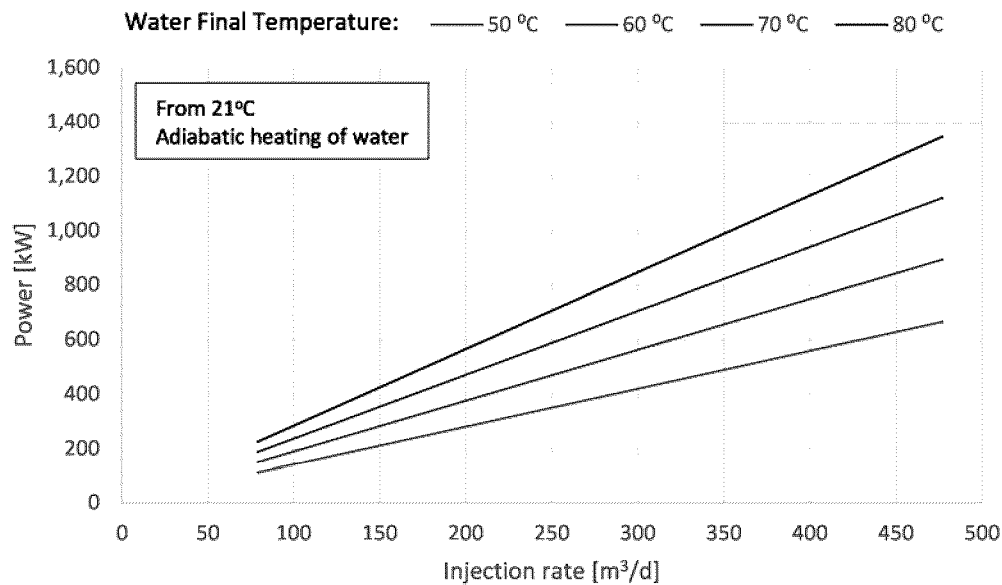
FIG. 16 depicts a graphical representation of the power requirement to heat water from 21° C. to different temperatures versus injection rates.
Figure 17:
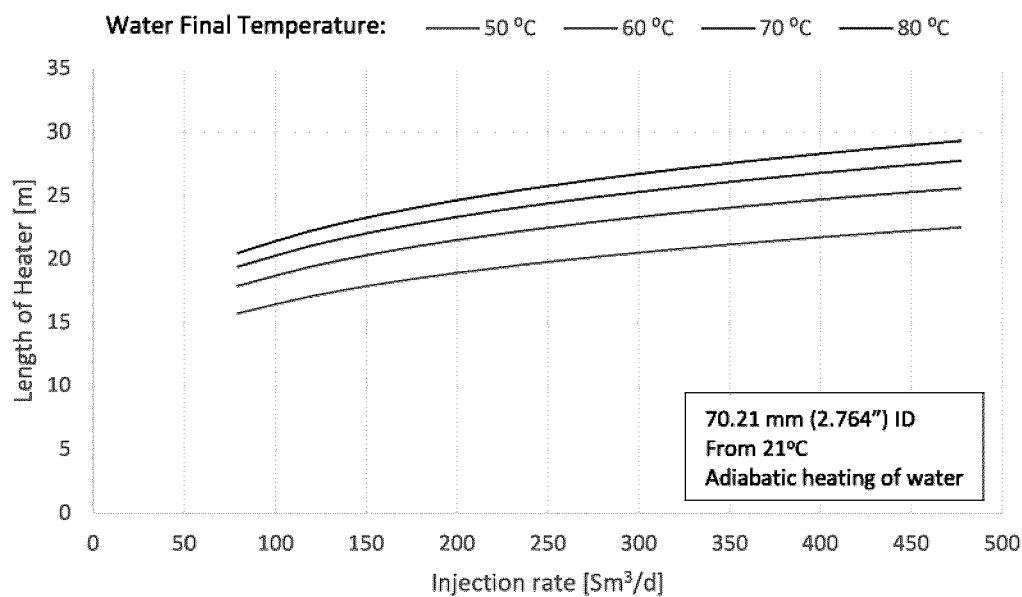
FIG. 17 depicts a graphical representation of the length of heater needed to heat water from 21° C. to different temperatures versus injection rates (operating at a temperature 15° C. higher than water final temperatures).
Figure 18:
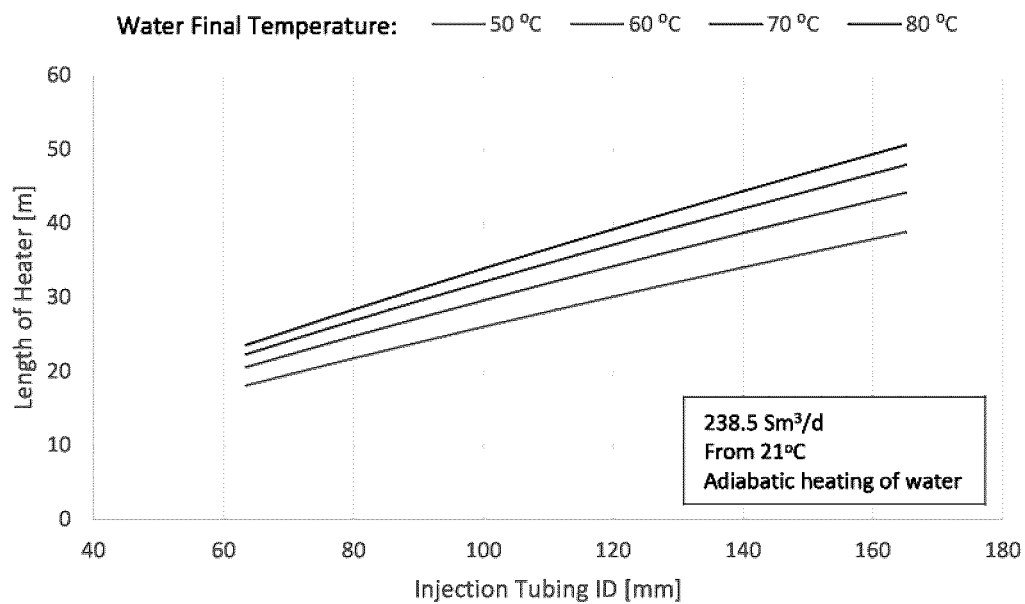
FIG. 18 depicts a graphical representation of the length of heater needed to heat water from 21° C. to different temperatures versus injection tubing size (operating at a temperature 15° C. higher than water final temperatures).
Figure 19:
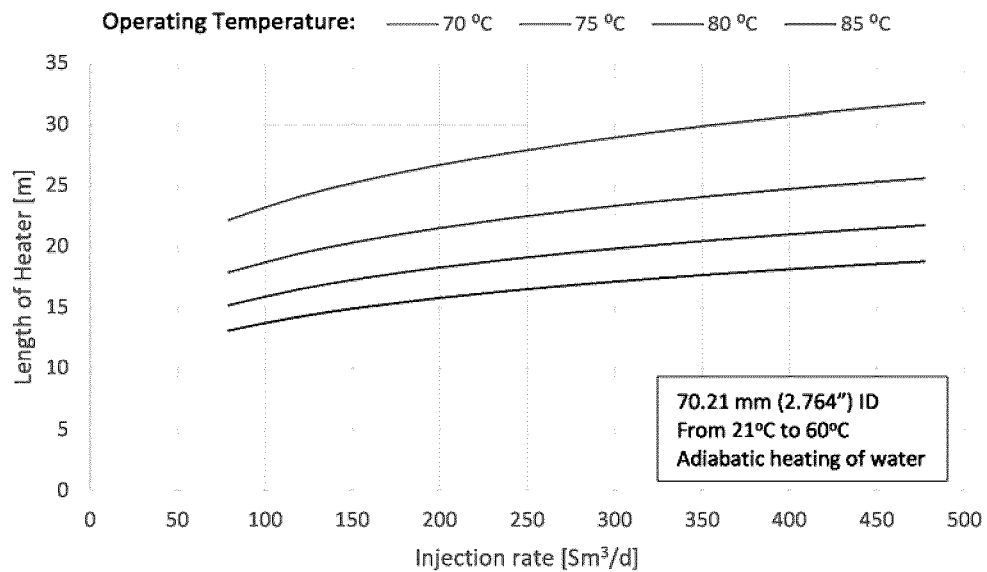
FIG. 19 depicts a graphical representation of the length of heater needed to heat water from 21° C. to 60° C. at different operating temperatures versus injection rates.

The power requirement expected for different water injection rates are presented in FIG. 16. As expected, the power requirement increases as both the designated water final temperature and injection rate increase. Water needs much higher power, compared to heating air, due to the higher mass flow rates expected in waterflooding processes and the fact that water has a higher specific heat. The length of the heater expected for this implementation is shown in FIG. 17, FIG. 18 and FIG. 19. Similar to air, the length needed increased with injection rate and decreased when operating at higher temperatures. Also, at a given flow rate, the length of the heater decreased as injection tubing size decreased; due to the increase in water velocity at smaller tubes which induces turbulence and enhances the efficiency of the heat transfer. Unlike compressible fluids, such as air, pressure is not expected to cause a vital change in water properties or in the performance of the heat transfer.

Downhole Annular Heating (DAH) is a new technique proposed to introduce a more reliable alternative to applying heat in downhole injection and production wells. The technique may increase or maintain the temperature of the flowing fluids by converting the well, or part of it, to a resistive heater capable of generating intensive heating density with superior heat transfer efficiency.

Figure 20:
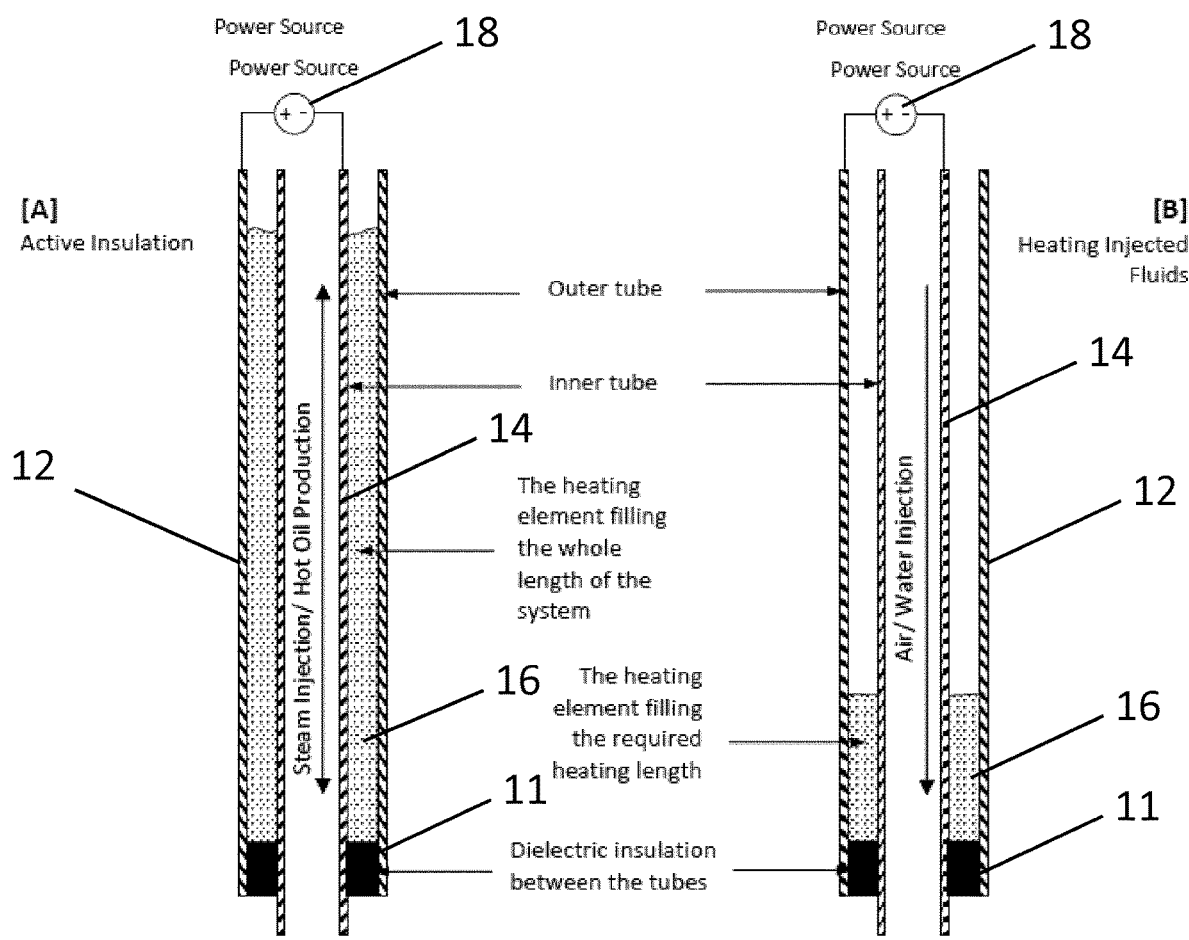
FIG. 20 depicts an example of simplified schematics of DAH for [A] active insulation and [B] heating injected fluids.
Figure 21:
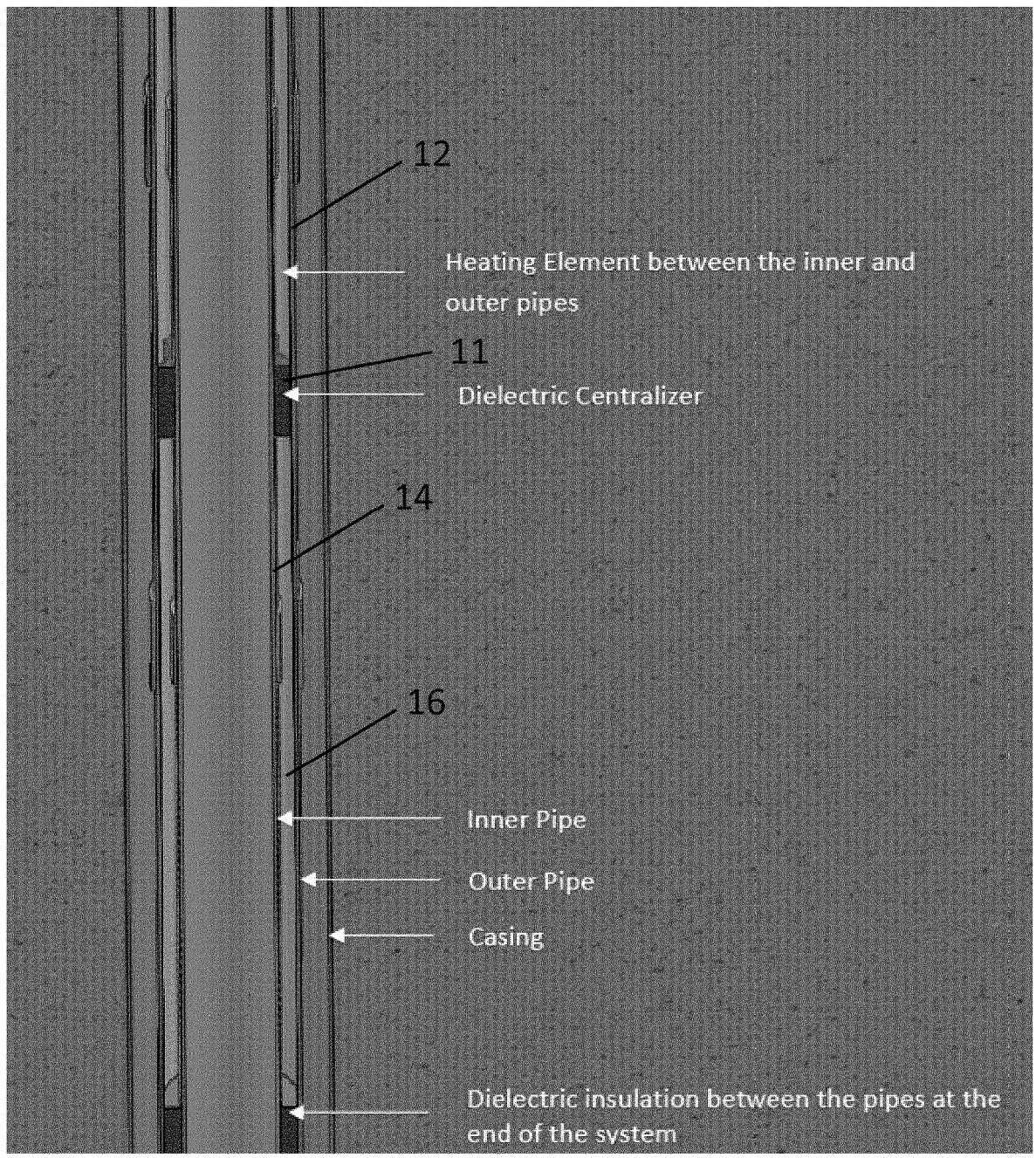
FIG. 21 depicts an example cross-sectional layout of Downhole Annular Heating proposed implementation in a well according to the present disclosure.
Figure 22:
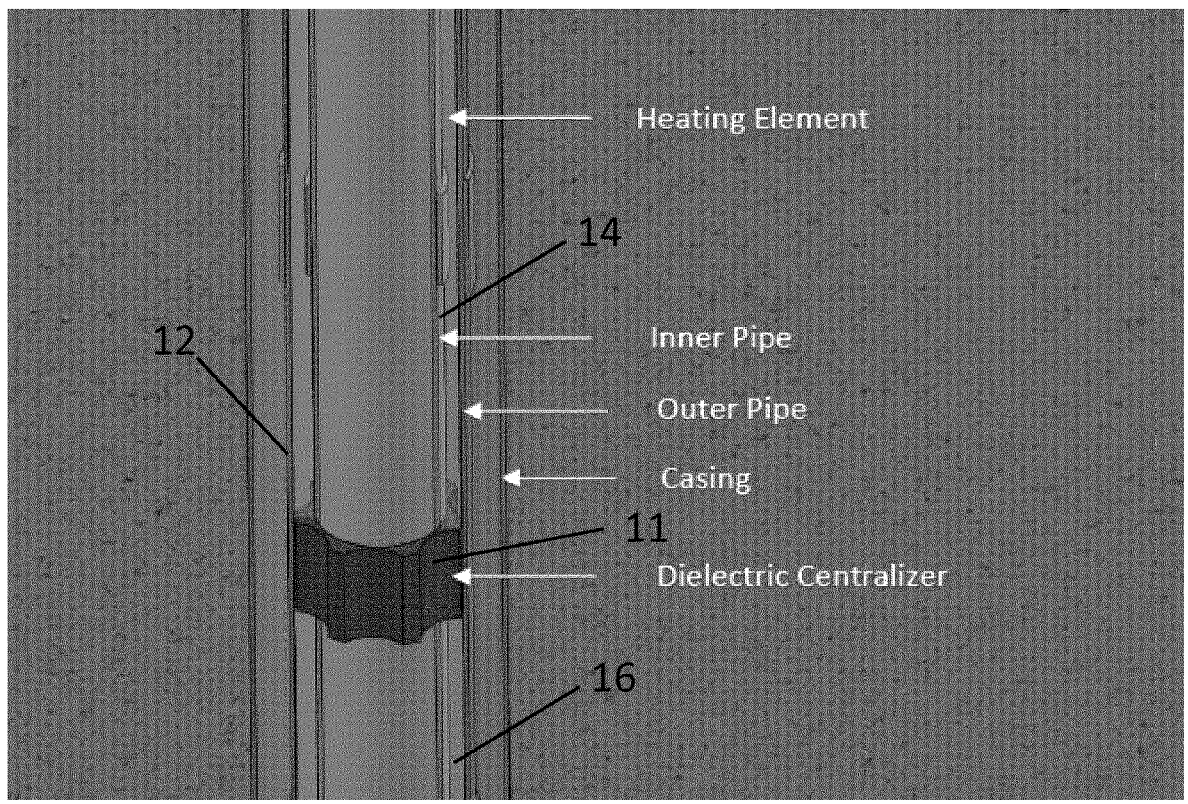
FIG. 22 depicts an example cross-sectional layout of Downhole Annular Heating proposed implementation in a well according to the present disclosure.

According to an embodiment of the disclosure, the layout of the system is illustrated in FIG. 20 and FIG. 21. As shown, the production/injection tubing (inner pipe) 14 is placed inside another pipe string (outer pipe) 12, and the annular space between them is occupied with a resistive material 16 that acts as the heating element of the system. The electric current supplied by a power source 18 from the surface flows through the metal wall of the pipes 12, 14, so that each pipe carries one terminal of the power. The inner and outer pipes 12, 14 are separated by dielectric centralizers 11 and will not be in contact at any point, allowing the current to only flow through the heating element 16 in the annular space.

The pipe-in-pipe layout was chosen (instead of using the casing as the outer pipe) to minimize heat losses to the formation, by creating another annular space between the outer pipe and the casing. Painting or insulating the outer pipe will reduce the heat loss, and thus the power input for active insulation applications. In applications not requiring heating of the entire length of the well, the outer pipe strings before the heating element level could be substituted with an electric cable to carry the other terminal of the power.

Figure 23:
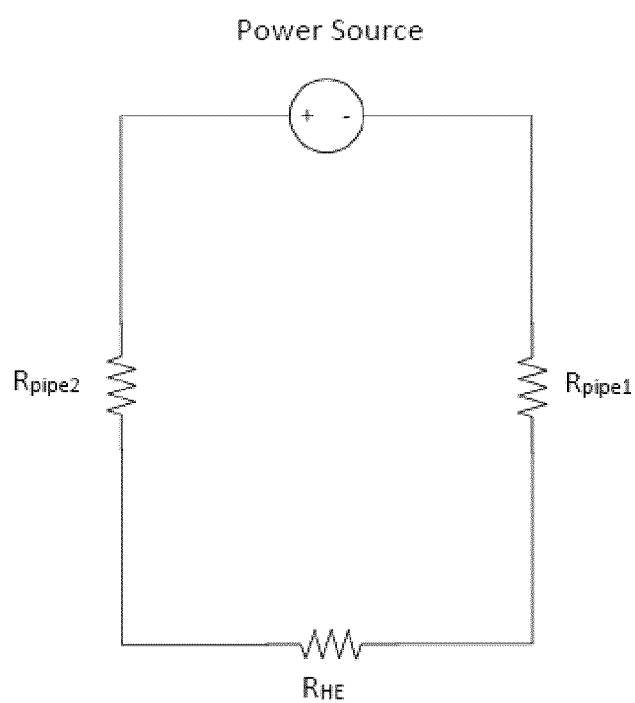
FIG. 23 depicts an example Downhole Annular Heating electric circuit schematic.

A simplified electric circuit diagram of the Downhole Annular Heating system is shown in FIG. 23. The power "consumed" in the inner and outer tubing's metal resistance (Rpipe1 and Rpipe2) depends on the type of power supplied, average temperature, depth of the well and the size and grade of tubing—as discussed below. The resistance of the heating element in the annular space (RHE) can be derived as below:

$$R_{HE} = \frac{\rho R^L TA}{A} \quad \text{Eqn. 1.1}$$

Integrating over the length of the annular space between the pipes:

$$R_{HE} = \int \frac{\rho R}{A} dL_{TA} \quad \text{Eqn. 1.2}$$

$$R_{HE} = \int \frac{\rho R}{2\pi r L} dr$$

$$R_{HE} = \frac{\rho R}{2\pi r L} \int_{r1}^{r2} \frac{1}{r} dr$$

$$R_{HE} = \frac{\rho R}{2\pi L} \ln \frac{r2}{r1}$$

Where:

| | | |
|---|---|---|
| $R_{HE}$ | Electric resistance of the heating element | [ohm] |
| $\rho_R$ | Resistivity of the heating element | [ohm · m] |
| A | Cross-sectional area of the annular space | [m2] |
| $L_{TA}$ | Thickness of the annular space | [m] |
| L | Length of the system | [m] |
| $r_1$ | Outer radius of the inner pipe | [m] |
| $r_2$ | Inner radius of the outer pipe | [m] |

From the equation derived above, the resistance depends on the electric resistivity of the heating element, the length of the system and the radius difference between the two pipes. It is therefore necessary to customize the resistivity of the heating element for each case/application, taking into consideration the required heating output, the supplied voltage and current, and the well's dimensions.

Both alternating current and direct current could be used. However, it is believed that the use of low to medium frequency alternating current (e.g. 30 Hz to 1 kHz) is most suitable for this system, although frequencies up to 200 kHz may also be used. Using alternating current in the DAH layout will cause the electric current to flow through the inner surface of the outer pipe and the outer surface of the inner side; as a result of skin and proximity effects which only accrue in AC. This can be helpful in some of the applications and might facilitate the use of well's casing as the outer pipe, in low temperature applications where heat loss is not a concern.

Skin effect is the main working mechanism for skin effect heating cables discussed in the literature review. Skin and proximity effects are currently used to heat pipelines in the Pipe in Pipe Direct Electric Heating, which have similar pipe-in-pipe layout such as DAH. Direct Electric Heating, however, depends solely on the resultant resistance of the pipes' metal itself to generate heat. The experiments conducted were done using DC power.

Skin effect refers to the tendency of alternating current to flow along the outer surface of the conductor, rather than through the entire cross sectional area. The phenomenon is caused by opposing eddy currents induced by the change in magnetic field in the metal of the conductor. The significance of skin effect is a function of power frequency, such that as frequency increases the skin depth decreases which reduces the effective cross-sectional area in which current flows and thus increasing the effective resistance. Current distribution for AC will be non-uniform, even at lower frequencies. The relationship between current penetration depth ($\delta$), frequency (F), electric resistivity ($\rho R$) and relative magnetic permeability ($\mu r$) is shown in Eqn. 1.3. On the other hand, Eqn. 1.4 approximates the current density (ID) at a distance of (y) meters from the surface toward the center, with respect to current density at the surface ($ID_0$) and penetration depth (S). The equations below also relate the skin effect to the diameter of a wire or a tube (more significant with larger diameters), and the electrical resistivity and relative magnetic permeability of the material.

$$\delta = 503 \sqrt{\frac{\rho_R}{\mu_r F}} \quad \text{Eqn. 1.3}$$

$$I_D = I_{D0} e^{-y/\delta} \quad \text{Eqn. 1.4}$$

Proximity effect occurs in conductors carrying alternating current and running in close proximity to each other. The magnetic fields of each of the conductors will interact with each other, resulting in a distortion in the current and power distributions. As depicted by Rudnev, V., Loveless, D., Cook, R., & Black, M. (2003), Handbook of Induction Heating, New York: Marcel Dekker, the current distribution (darker color indicates higher current density) in adjacent conductors carrying opposite and similar currents, and a single cable where the magnetic field of the conductor (arrows around the conductor) is not disturbed and the skin effect is the only contributor in the distribution of current. In the case of current flowing in the opposite direction, current density will be concentrated in the area facing the adjacent conductor. Using alternating current in the proposed double pipe layout will cause the proximity effect to concentrate the current in the outer surface of inner pipe and the inner surface of the outer pipe, causing further increase in the effective resistance of the tubing. The impact of the proximity effect depends on the distance between the conductors, since as the distance increases, the strength of the proximity effect decreases.

Power losses to the tubing's resistivity will depend on power type, the amount of current supplied from the surface, the operating temperature, as well as tubing's: size, wall thickness and carbon content. To demonstrate the expected tubing's resistance at different conditions, Eqn. 1.5 was used to construct FIG. 24 to FIG. 28. Eqn. 1.1 correlates the resistivity of carbon steel with its carbon content and surrounding temperature. After calculating the resistivity at the given conditions, the DC resistance of the tube's metals was calculated using Eqn. 1.1, based on the tube's size, wall thickness and length. Tubing sizes chosen for this study follow API standards, and their dimensions are shown in the figures in which they were used.

$$\rho_R = 0.0651 + 0.474 \times 10^{-3} T + 0.889 \times 10^{-6} T^2 + 0.122 C^{1/4} \qquad \text{Eqn. 1.5}$$

Where:

| | | |
|---|---|---|
| $\rho_R$ | Resistivity of the carbon steel | [$10^{-6}$ ohm · m] |
| T | Temperature | [° C.] |
| C | Carbon content | [wt. %] |

Figure 24:
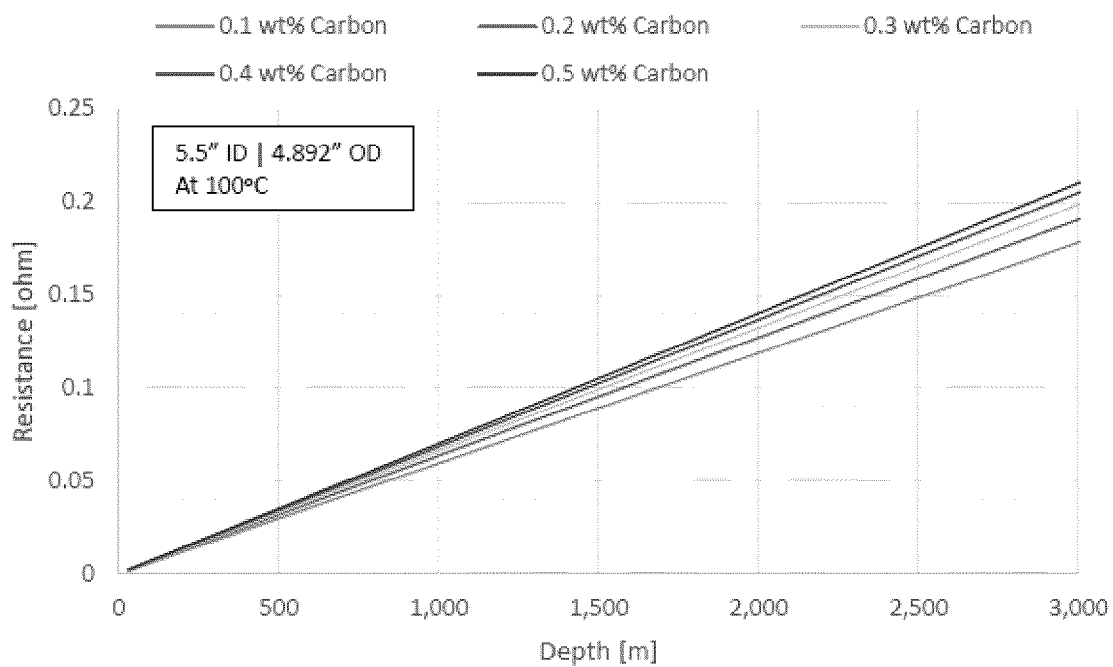
FIG. 24 depicts a graphical representation of tubing resistance expected at different length and carbon content for a 5.5" tubing.
Figure 25:
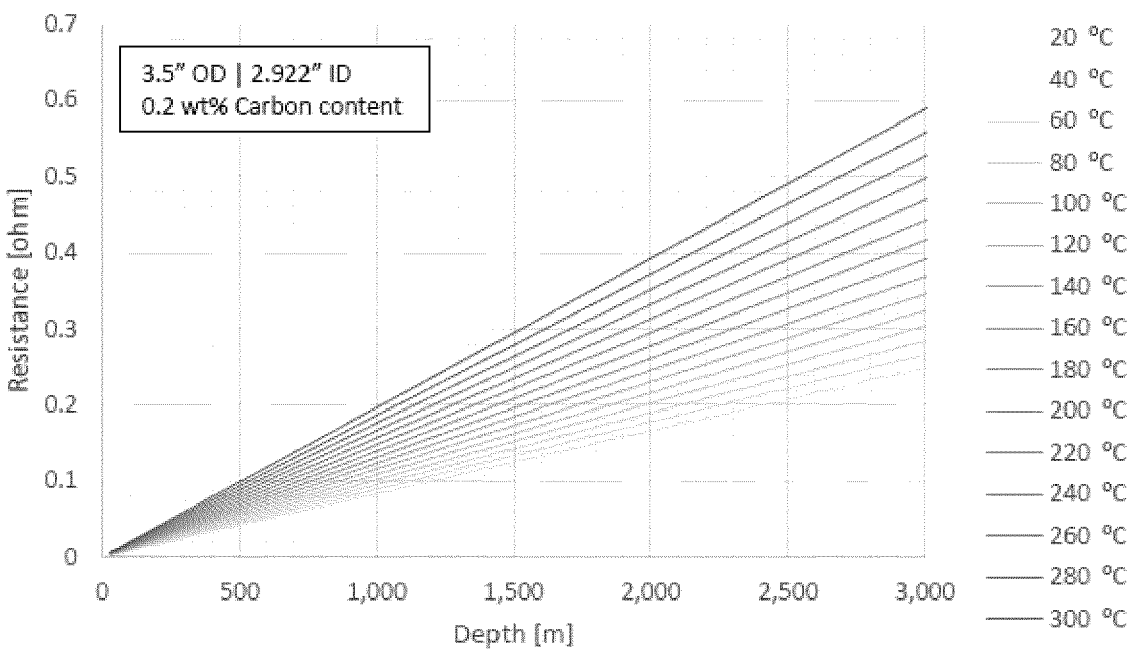
FIG. 25 depicts a graphical representation of tubing resistance expected at different depths at different temperatures for a 3.5" tubing.
Figure 26:
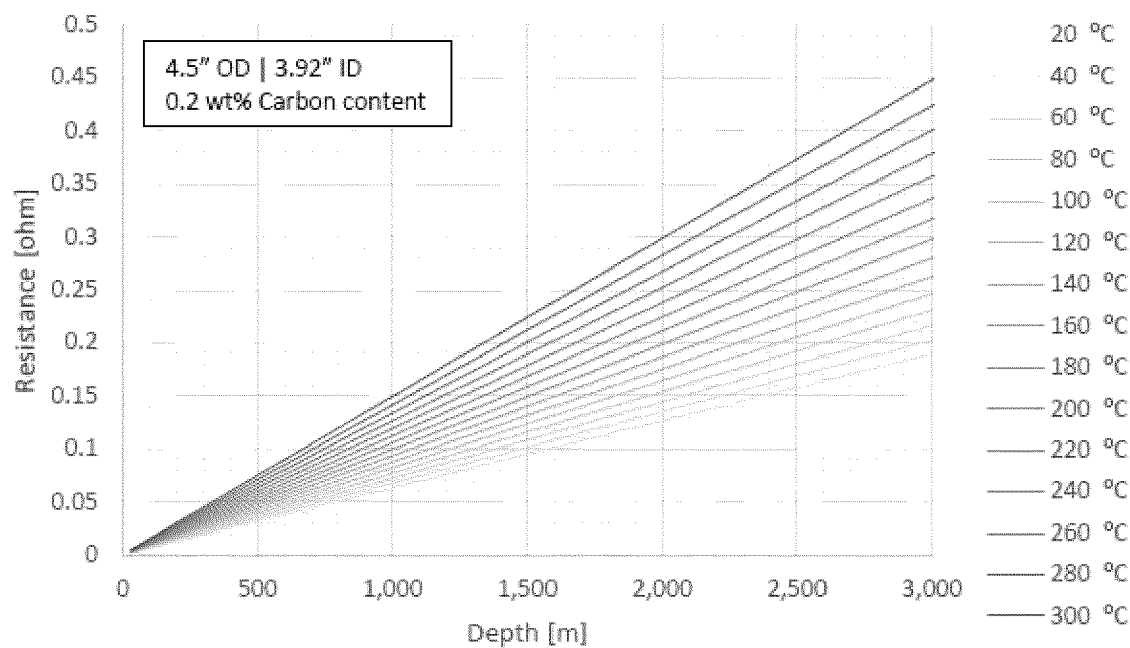
FIG. 26 depicts a graphical representation of tubing resistance expected at different depths at different temperatures for a 4.5" tubing.
Figure 27:
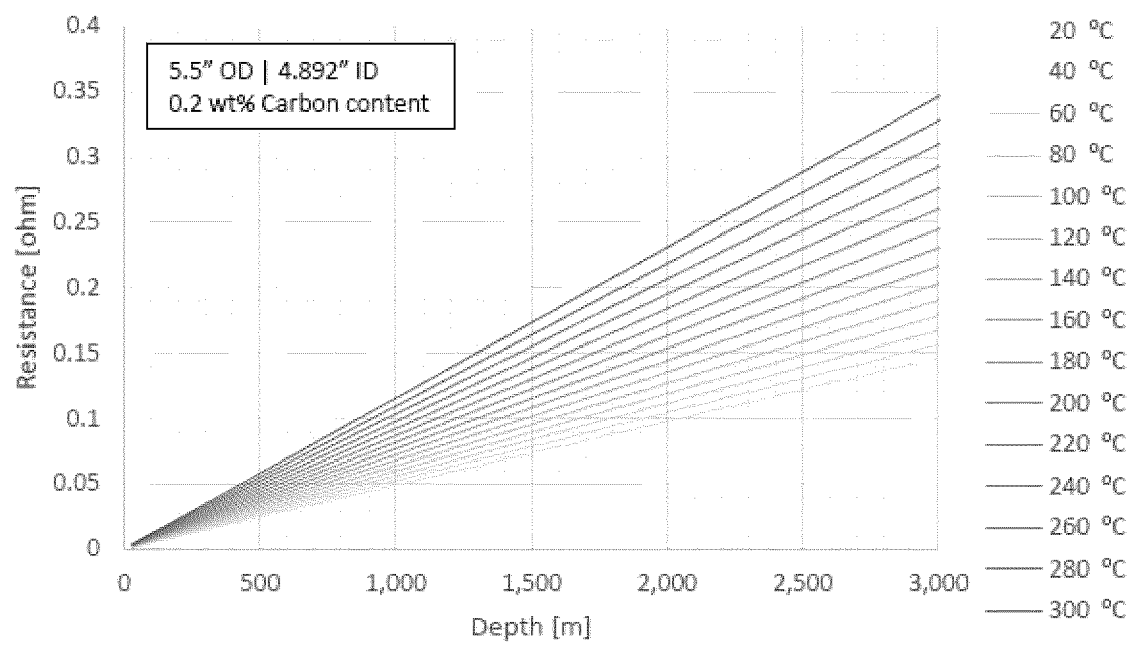
FIG. 27 depicts a graphical representation of tubing resistance expected at different depths at different temperatures for a 5.5" tubing.
Figure 28:
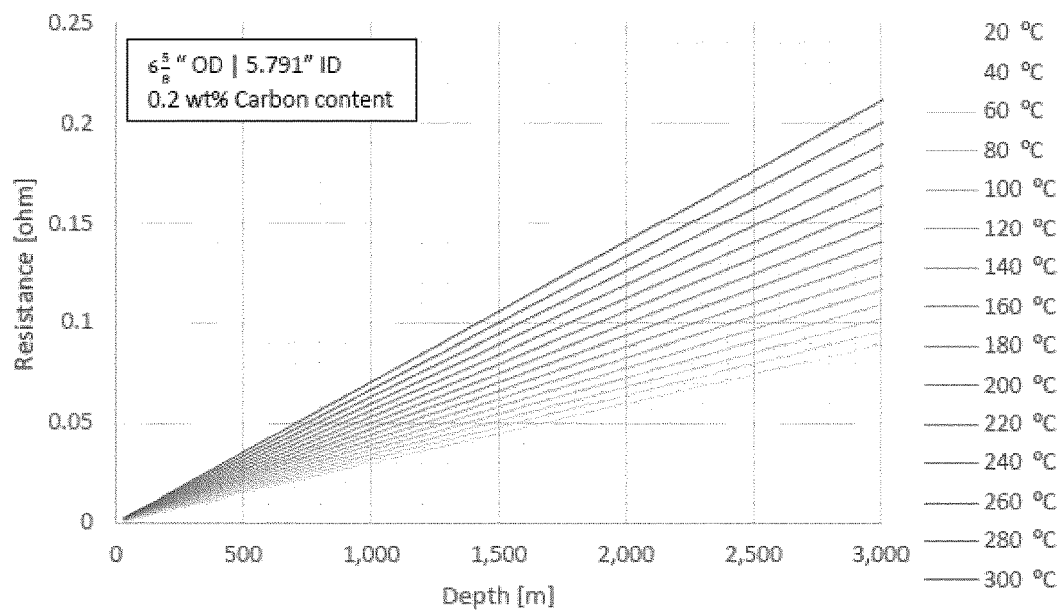
FIG. 28 depicts a graphical representation of tubing resistance expected at different depths at different temperatures for a 6.625" tubing.

Different carbon steel tubing grades have different carbon content, in general, API tubes are expected to have a carbon content between 0.15 to 0.39 wt. %. Changing carbon's weight percent in carbon steel tubing alloys is usually employed to control some of the mechanical properties. FIG. 24 demonstrate the effect of carbon content on the resistance of a 5.5" OD carbon steel tubing operating at 100° C. As can be seen from the figure, that lower carbon content yields lower resistivity and thus lower power losses to tubing metals.

FIG. 25 to FIG. 28 show the resistance of carbon steel tubes with 0.2 wt. % carbon content at different depth and operating temperatures. As suggested by Eqn. 1.1, the longer the tubing, the higher the resultant resistance; as current will flow through more material. Also, as tubing's size and thickness increases, the cross-sectional area of current flow increases and thus the resistance decreases. The figures show that carbon steel tubes have a positive temperature coefficient of resistance, such that as the temperature increases the resistance also increases.

It should be noted here that current density decreases across the length of the tubes facing the heating element, as current dissipates to the heating element and eventually approaches zero at the end of the tubes. For active insulation applications, where the heating element is occupying the whole annular space between the tubes, the power lost to tubing metal can be derived from Eqn. 1.6 as below:

$$P = I^2 R \qquad \text{Eqn. 1.6}$$

$$P = \int_0^1 x I^2 R \, dx$$

Where "P" is the power lost to tubing metal, "I" is the current, "R" is the resistance, and integrating with respect to "x" which is the percent of the length from the end of the system (0% at the bottom and 100% at the top).

$$P = I^2 R \frac{x^3}{3} \Big|_0^1 \qquad \text{Eqn. 1.7}$$

$$P = \frac{1}{3} I^2 R$$

Therefore, as seen from Eqn. 1.7, for active insulation applications the equivalent resistance of the tubing metal is one third that shown in FIG. 25 to FIG. 28.

Figure 80:
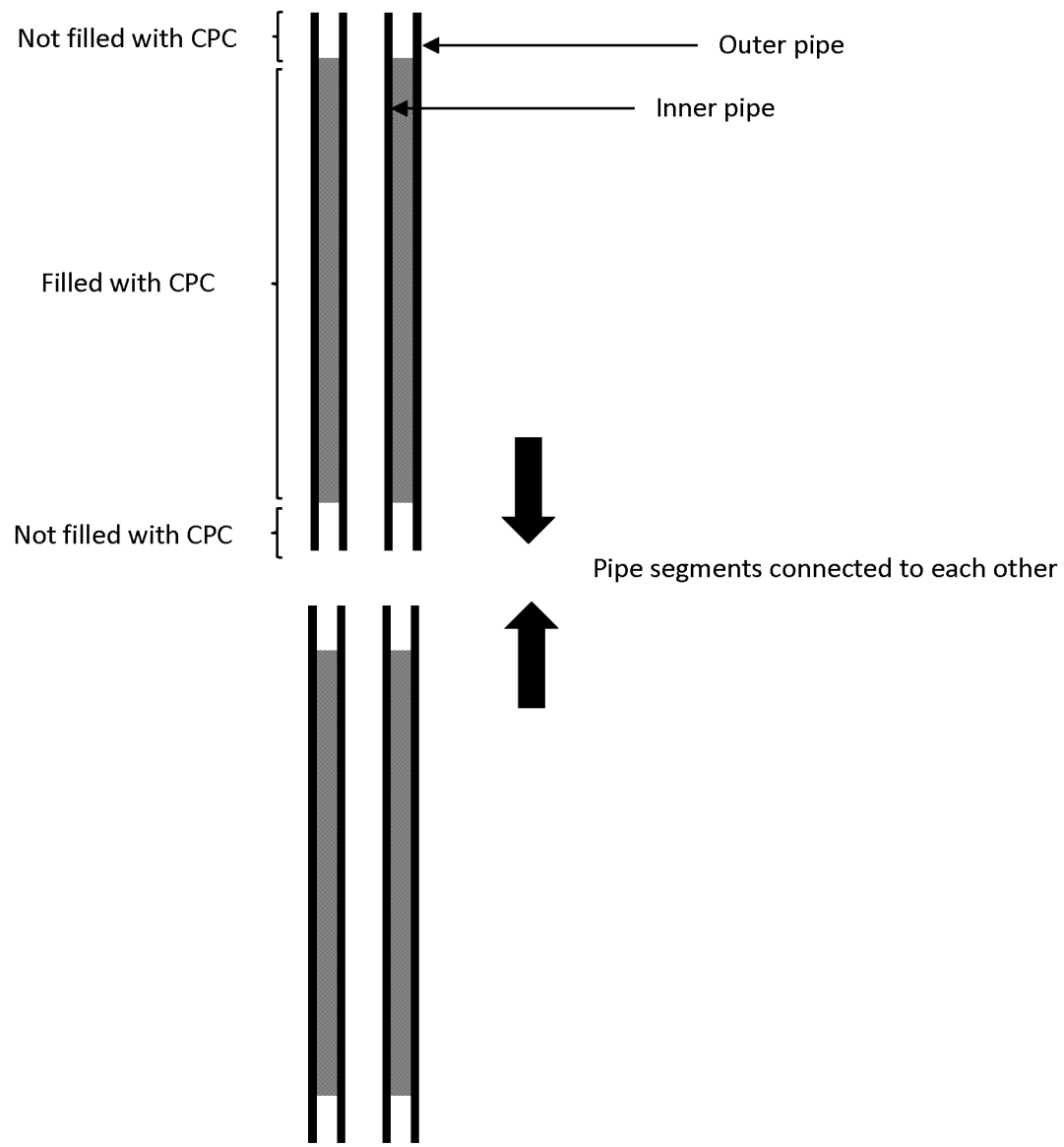
FIG. 80 depicts CPC provided along the length of an inner pipe and an outer pipe, except for portions at ends of the inner and outer pipes (to allow for threads and expansion of the CPC).
Figure 81:
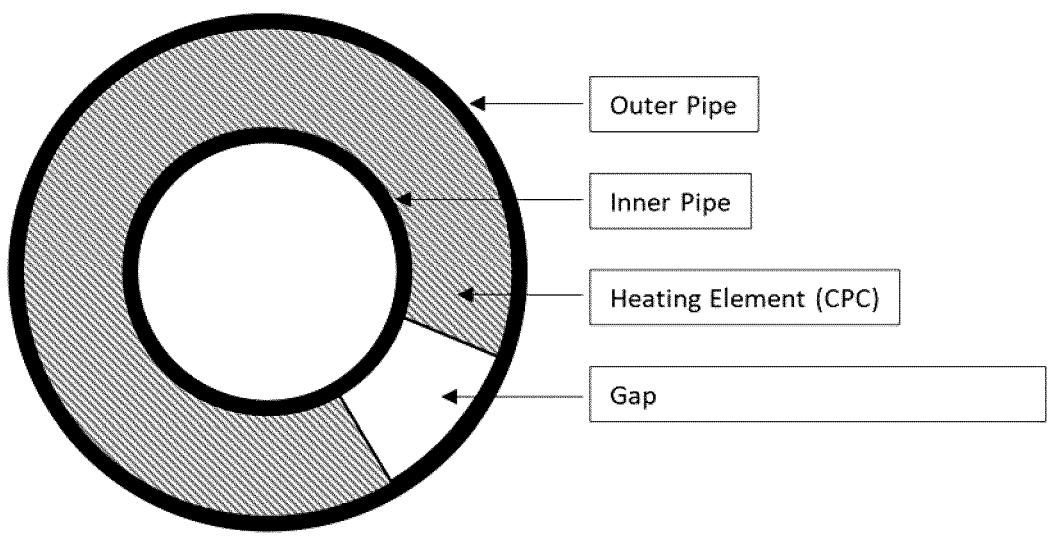
FIG. 81 depicts a resistive heating material occupying a segment of an annular volume.

The heating element in DAH is the material 16 placed in the annular space, between the inner and outer pipes 12, 14, for the purpose of generating heat using their electric resistivity. Practically, the heating element could be a solid polymer formed to take the shape of the annular space, the same way as a pipe's passive thermal insulation. Note that the use of solid conductive polymer composites between the inner and outer pipes could eliminate the need for centralizers between the pipes, since the CPC would effectively centralize concentrically the inner and outer pipes relative to one another. If solid CPC is used, a pre-fabricated pipe will generally have the CPC across the length of the pipe, except for areas at the end and/or the beginning of each pipe, to allow for threads and expansion of the polymer when heated (see FIG. 80).

However, in some embodiments, the heating material uses high-viscosity electrically conductive polymer composites (CPC), which can be injected from the surface to the annular space during or after the pipes's installation, or placed into a ready to use factory-made one-piece product (custom made concentric coiled tubing, for example). The use of CPCs in the proposed layout gives the system great advantage.

CPCs are fabricated by mixing dielectric polymers (referred to as the host polymer or the matrix) with conductive fillers. After a certain loading, the conductive fillers form a conductive network within the host polymer allowing the composite to conduct electricity. Other additives might be needed to enhance certain properties, such as stabilizing agents (and dispersants) to prevent flocculation and improve the stability of the conductive filler, ceramic powder to enhance the thermal conductivity, and colloidal fillers to increase the viscosity of the composite.

CPCs have a critical concentration of conductive fillers in which the resistivity of the composite decreases dramatically as a result of filler particles forming conductive networks. This concentration is referred to as the percolation threshold. According to the percolation theory, and as indicated in Yi, W., Wang, Y., Wang, G., & Tao, X. (2012), Investigation of carbon black/silicone elastomer/dimethylsilicone oil composites for flexible strain sensors, Polymer Testing, 31(5), 677-684 available at http://doi.org/10.1016/j.polymertesting.2012.03.006, the resistivity and filler concentration exhibits three regions. The region before the percolation is where the composite is considered electrically insulative due to the lack of contact between adjacent conductive particles. At the percolation region, the gaps between the conductive particles decreases allowing more electrons to pass, until the gaps become smaller than 10 nm, at which point electron tunneling become feasible and the composite is considered electrically conductive. In the region after the percolation zone, both tunneling and direct contact occurs, and the resistivity of the composite decrease slowly and eventually reaches a plateau. The curve referenced above illustrates particles spacing for (a) the insulating region, (b) percolation region and (c) the post percolation region. The same behavior of filler loading versus resistivity will be encountered in all CPCs, although the percolation threshold level and resistivity values will differ depending on the conductive filler's type, aspect ratio and size as well as the fabrication technique and the host polymer.

The resistivity of CPCs exhibits an increase with elevation in temperature, a behavior referred to as positive temperature coefficient of resistivity (PTC). Practically, however, based on the use of some self-regulating heating cables, for temperatures higher than the melting point of the matrix, the resistivity tends to decrease as temperature increases and thus adopts a negative temperature coefficient (NTC) of resistivity.

The tunneling model is the most accepted mechanism proposed to describe the PTC and NTC phenomena of conductive polymer composites. According to this mechanism, free electrons flow though small gaps between adjacent conductive particles. As the temperature increases, the polymer matrix expands, which increases the size of the gaps and hinders the flow of electrons through tunneling—thus increase the resistivity. When the temperature exceeds the melting point of the matrix, the conductive particles re-aggregate in the polymer melt and disconnected pathways are re-established which decreases the resistivity of the composite and causes the NTC behavior.

Using an ultra-high molecular weight host polymer would eliminate the NTC effect. Accordingly, an ultra-high molecular weight polyethylene (UHMWPE) was used as a matrix, instead of the commonly used high-density polyethylene (HDPE) for self-regulating heating cables, carbon black was used as the conductive filler, and the composite was prepared by hot compaction. The high viscosity of UHMWPE melt eliminated the NTC effect by hindering the movement of carbon black particles.

Several types of conductive fillers can be dispersed in host polymers to establish electric conductivity. This includes metallic-based fillers such as metallic powders, metal flakes, metal-coated fibers and metal nanowires, or carbon based fillers such as carbon black, carbon nanotubes and carbon fibers. Intrinsically Conductive Polymeric powders, such as polypyrrole, polyaniline and polythiophene, are also used as conductive fillers but are not as common. The mixing conditions of the composites play a major role in the dispersion and agglomeration of the fillers in polymer matrices.

Carbon black is a type of amorphous carbon with high surface area to volume ratio. It is produced from the incomplete combustion of heavy crudes and is considered the most commonly used conductive filler; due of its availability and low cost. Carbon nanotubes have superior electrical and thermal conductivity, but they are difficult to prepare and thus more expensive. Carbon fillers' size, type and, of course, loading percent in the host polymer affects the electrical properties of the composite. The percolation threshold of the composite decreases as the carbon black particle size decreases.

Common metallic powder fillers include silver, copper, aluminum and nickel. They are known for giving their composites electrical characteristics close to that of metals, as well as very good thermal conductivity. For this type of filler, the packing factor, defined as the maximum volume fraction of the composite occupied by solid filler particles, is a key parameter in identifying the electrical and thermal properties of the composite.

DAH ability to adopt its power output according to the surrounding conditions and injection/production rates, as well as its capability to provide high heating capacity and heat transfer coefficient, allows it to offer a safer and more powerful downhole heating performance for formation ignition, and hot water flooding. Further, its operating characteristics give it the potential to be implemented in new applications that would not have been possible using available methods. This includes converting the length of the tubing to a downhole heater so as to increase oil wells' productivity, or to act as active insulation to maintain the high temperature of injected steam or oil produced from thermal recovery methods and deep reservoirs.

The placement of the heating element between two concentric pipes allows the DAH to be seen, from the electrical perspective, as an infinite number of resistors connected in parallel. Similar to the working principle of self-regulating heating cables, using a heating element with positive temperature coefficient (PTC) in this configuration forces more current to less resistive cold regions and less current to regions that are already hot. This parallel layout gives the system immunity from burning out, and using a PTC heating element allows for more homogenous temperature across the heated length of conduit.

Figure 29:
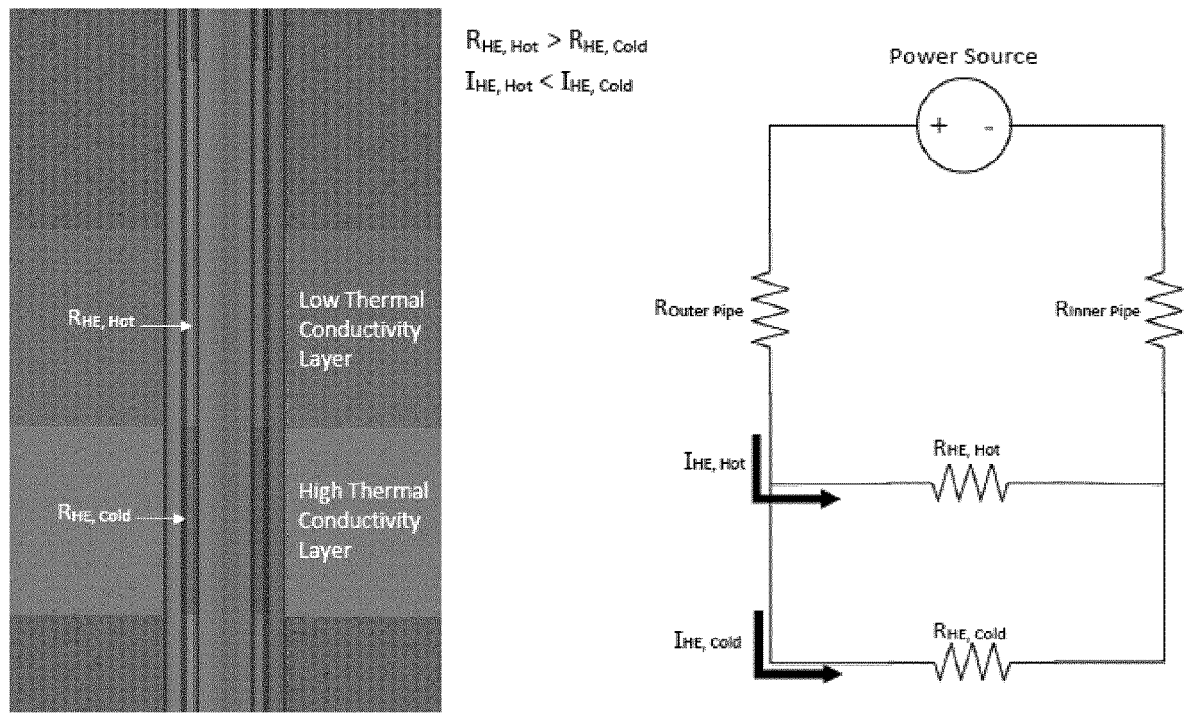
FIG. 29 depicts the influence of inhomogeneous formation on DAH electric circuit.
Figure 30:
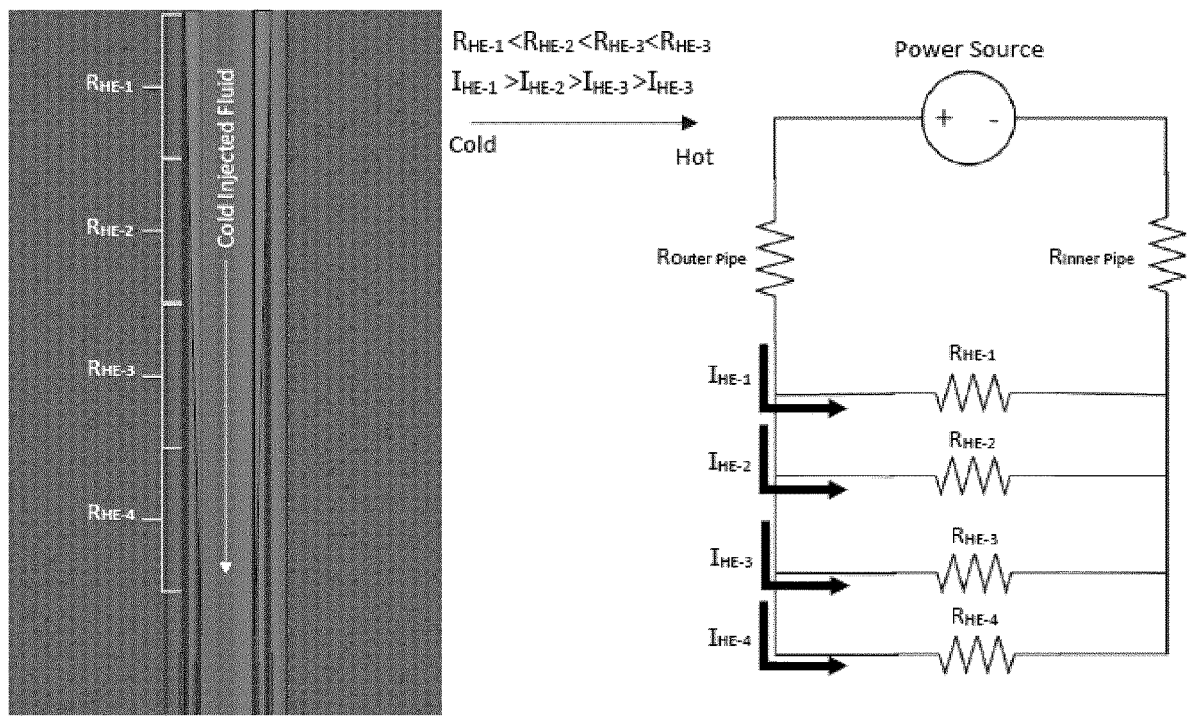
FIG. 30 depicts the influence of fluid injection on DAH electric circuit.
Figure 31:
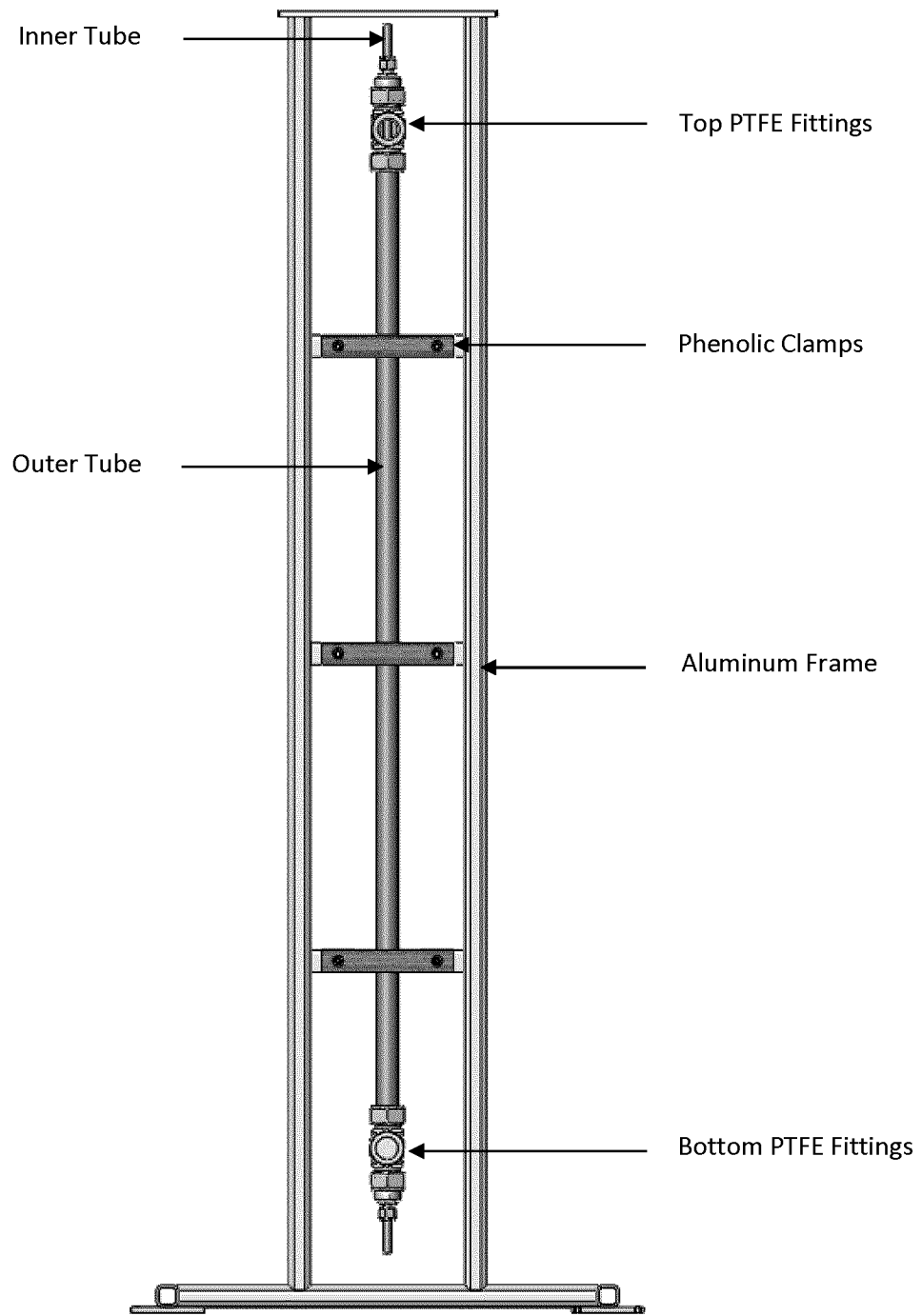
FIG. 31 depicts an illustration of an example embodiment design.
Figure 32:
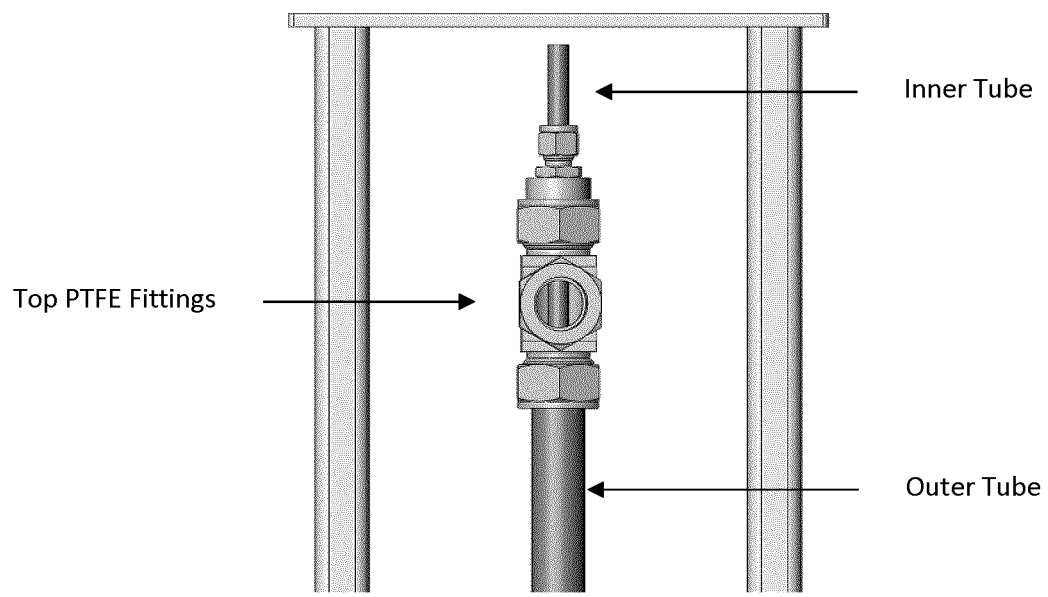
FIG. 32 depicts an illustration of an example embodiment design.
Figure 33:
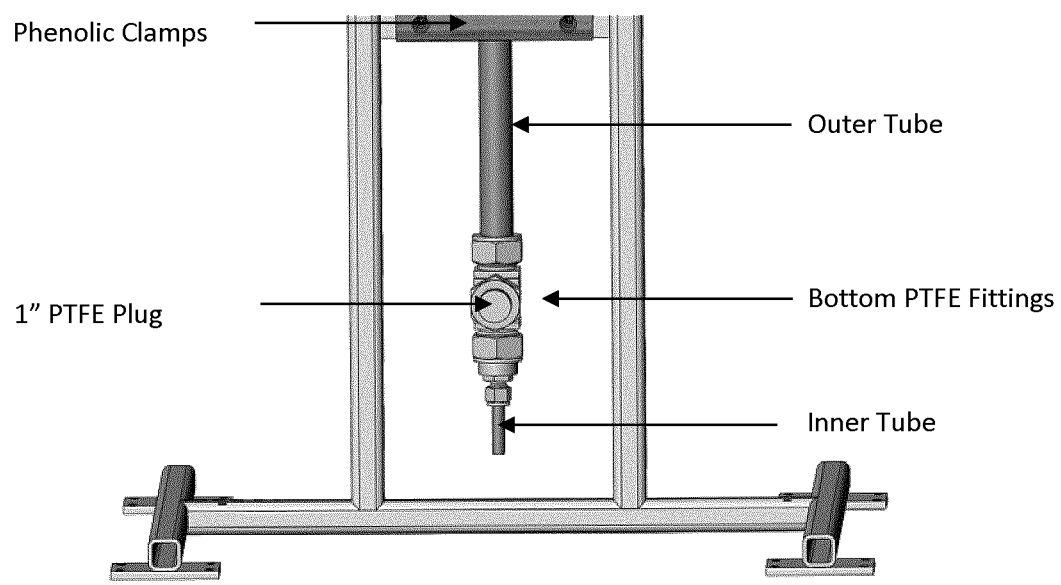
FIG. 33 depicts an illustration of an example embodiment design.
Figure 34:
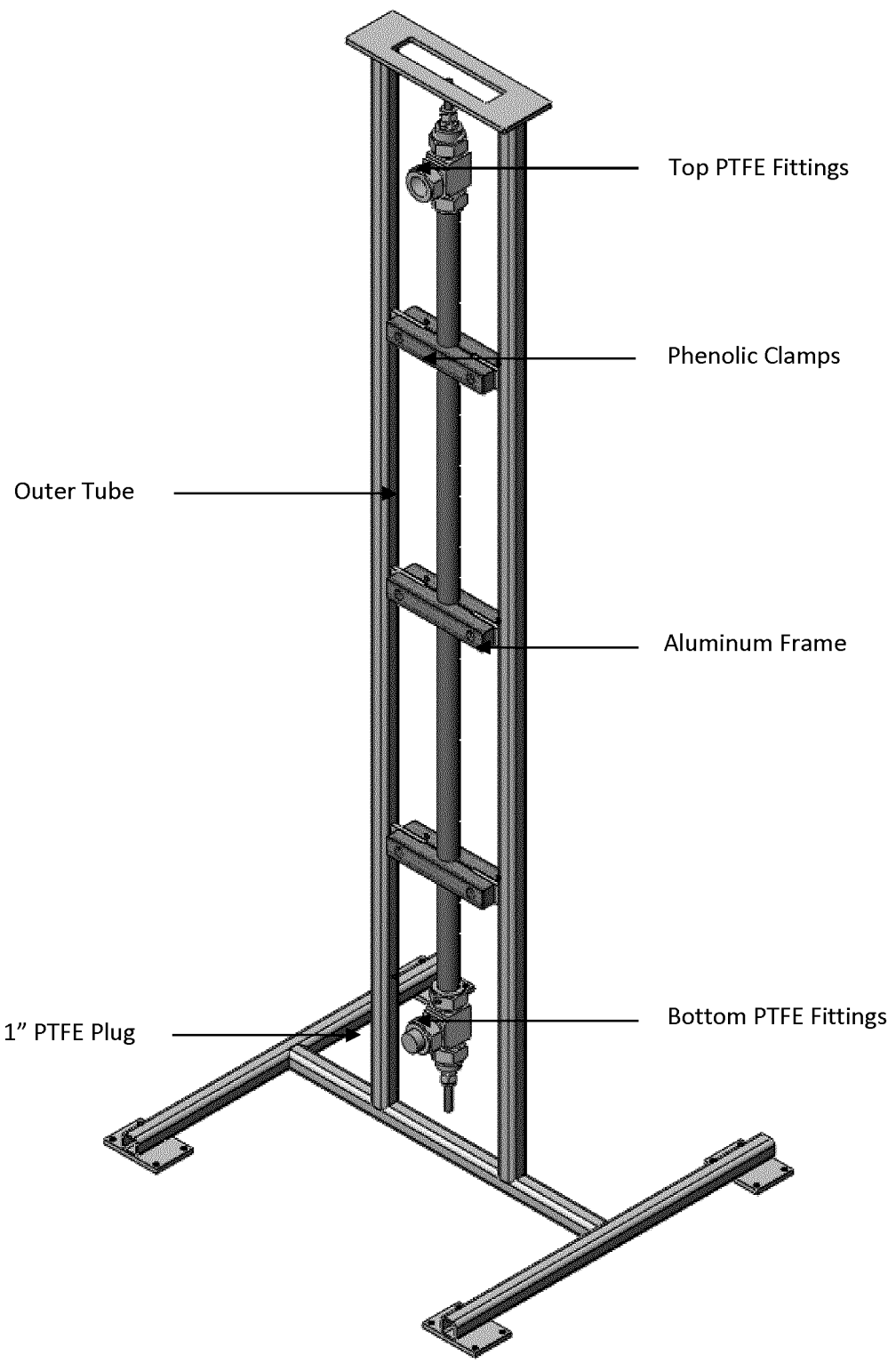
FIG. 34 depicts an illustration of an example embodiment design.

The temperature dependence of power distribution along the heater is useful for heating injected fluids as well as when applied in long heating circuits, to heat or maintain the temperature of flowing fluids. This is because it allows the system to account for the variations in the thermal characteristics of formation layers as well as the formation's temperature gradient and the temperature gradient caused by the injected fluids, as demonstrated in FIG. 29 and FIG. 30.

This is especially beneficial for air injection projects, as it could allow for a more uniform ignition when the heater is placed opposite the formation. When the formation is ignited, DAH could also be used to monitor the temperature elevation and confirm the ignition, knowing the behavior of the heating element's resistance with temperature. Its immunity from burning out would also make it an attractive option for hot waterflooding operations, as it would save the power lost resulting from injecting the heated water from the surface.

Although being constrained by the dielectric strength of the host polymer and the centralizer's materials, the dielectric strength of the available materials that could be used would potentially allow for the flow of a significant amount of power through the system. This is mainly due to the relatively large distance between the two current paths (the inner and outer tubes), compared to heating cables. The power that could be sent will mainly depend on the materials used and will be affected by the size of the annular space as well as the expected operating temperature. To illustrate the limitation induced by the centralizers, for a system using aluminum oxide ceramic centralizers with an annular space of 10 mm, and operating at 100° C., according to Table 11, the maximum voltage that can be applied would safely be more than 15 times that rated for the most advanced MI heating cables (the most powerful type of subsurface heating) discussed in the literature review. Using boron nitride based centralizers, for example, would potentially allow for even more voltage and thus power input. This gives DAH the ability to be applied for long circuits with high heating density.

Air has very good dielectric properties; however, the strength of these properties could be significantly lowered by its moisture content. To avoid undesired arcing, it is important to have dry air/gas in the annular space not occupied by the heating element.

centralizer's materials is expected to decrease as the temperature increases and as the centralizer's thickness increases (per the size of the annular space). The dielectric constant of aluminum oxide ceramic decreases with thickness and temperature.

TABLE 11

Potential commercial ceramic composites for centralizers.

| Product name | Manufacturer | Main Composition | Maximum Temperature [° C.] | Flexural Strength [MPa] | Compressive Strength [MPa] | Tensile Strength [MPa] | Young's Modulus [GPa] | Dielectric Strength [kV/mm] |
|---|---|---|---|---|---|---|---|---|
| A 1898 | CeramTec | 98% Aluminum Oxide | 1,700 | 400 | 4,000 | 240 | 360 | 25 |
| A 1999.7 | CeramTec | 99.2% Aluminum Oxide | 1,750 | 450 | 4,000 | 270 | 380 | >30 |
| Beryllia BeO | Goodfellow | Beryllium Oxide | 1,800-1,900 | — | 1,550-1,850 | — | 340-400 | 10-14 |
| Ruby | Goodfellow | Aluminum Oxide | 2,000 | — | 2,100 | — | 350-390 | 15-50 |
| Sapphire | Saphikon | Aluminum Oxide | — | 1,035 | 2,000 | — | 435 | 48 |
| UL-300 | Seagoe | Aluminum Oxide | 1,650 | 300 | >1,750 | — | — | 43 |
| Pyrolytic Boron Nitride | Sintec CVD | Boron Nitride | 2,500 | 80 | 100 | 40 | — | 200 |

Having the heating element around the inner pipe allows for employing the maximum surface area per length in the pipe for heat transfer. Compared to heating cables, this allows for superior power transfer per unit length for the same temperature difference, as heat transfer is a function of area of exposure. Also if designed properly, this would allow the heater's temperature to be close to that of the heated fluids, which would minimize the power lost from the outer pipes to the surroundings by convection.

When centralizers are used, they should preferably be attached to the inner pipe along the whole length of the system, to maintain the distance between the inner and outer pipes. Having a non-uniform separation between the inner and outer pipes will cause more current to flow through this region, which will cause the heating element in the affected regions to heat up more quickly. Using CPC with a positive temperature coefficient in the proposed parallel layout will eliminate the negative effect of this scenario, since the system will adapt ("fix" itself) by sending lower current density to this heated region. Centralizers in the regions not occupied by the heating element are also advantageous for eliminating the risk of arcing or having a short circuit resulting from the two pipes being in very close proximity or in contact at any point in the system.

The centralizers could be dielectric blades molded on the tubing, or solid body centralizers. A centralizer's material should have a good dielectric strength and be able to withstand continuous exposure of the expected operating temperature. Table 11 shows the mechanical and electrical properties of commercial ceramic composites that could be potential candidates. In applications were the voltage and excepted operating temperature is not very high, a material such as PTFE (Teflon) could be a good candidate, with a dielectric strength of 23.6 kV/mm and an operating temperature of 260° C. Generally, the dielectric strength of the Dielectric centralizers also may be used to separate the casing from current carrying tubing. Ceramic centralizers pad affixed to casings are currently used in cementing operations. Ceramic centralizers may also be used for passive insulation of steam injectors.

Using conductive polymer composites will dictate a maximum operating temperature that mainly depends on the host polymer (matrix) used. Two phenomena should be considered in this regard when selecting the host polymer used: first, the effect of temperature on the viscosity of the matrix, as it affects the temperature coefficient of the composite. Regardless of the polymer used, it can always be polymerized to higher molecular weight, in order to manipulate the viscosity to the one desired. The second consideration is the temperature where host polymers start to exhibit thermal decomposition or oxidation. It is important to choose the appropriate polymer to avoid problems in the operations.

The experiments conducted used olydimethylsiloxane (PDMS) as the host polymer and nano-carbon particles as the conductive filler. The PDMS used has an operating temperature of up to 180° C., covering most of the applications—except steam active insulation. Dimethyl-diphenylsiloxane is a polymer from the same family and sustains operating temperatures of up to 300° C., which is suitable for all possible applications.

Sample Embodiment

In one embodiment, the apparatus comprises two concentric tubes, with the dimensions presented below in Table 12. In this example, copper tubes were used and were attached to an aluminum frame with phenolic clamps, to electrically isolate the frame from the current flowing. Illustrations of the prototype are shown in FIGS. 31-34.

TABLE 12

Dimensions of copper tubes in example embodiment.

| | | Outer Tube | Inner Tube |
|---|---|---|---|
| OD | [inch] | 1 | 3/8 |
| Wall Thickness | [inch] | 0.083 | 0.035 |
| ID | [inch] | 0.834 | 0.305 |
| Length | [ft] | 4.5 | 5.5 |

PTFE fitting assemblies were used to attach the inner and outer tubes at the top and the bottom of the prototype, while keeping them electrically isolated from each other. The assembly comprised a 1" PTFE tee connected to a 1"-3/8" PTFE reducer using a 1.5" long 1" OD copper tube. The fittings were supplied from IPS Inc. and their dimensions are presented below in Table 13

TABLE 13

PTFE fittings dimensions.

| | | PTFE Tee | PTFE Reducer |
|---|---|---|---|
| Tubing OD | [inch] | 1 | 3/8 and 1 |
| A | [inch] | 2.9 | 1.7 |
| B | [inch] | 2.2 | 0.7 |

The inner and outer pipes were also separated in their annular space, using custom-made solid body PTFE centralizers that were machined to go around the inner pipe and fit the annular space. Similar to proposed field layouts, the purpose of the centralizers in this example embodiment is to maintain a fixed distance between the pipes to have a homogenous coaxial distribution of power around the inner tube and to prevent the pipes from touching. The outer surface of the inner pipe was electrically insulated using layers of dielectric tape in the section above the heating element level, to minimize the effect of its thermal expansion.

A DC regulated power supply was used as the main power source throughout the experiments. The power supply was manufactured by Circuit Specialists Inc. model CSI 5030S, with a maximum output of 50 V and 30 Amp. Its output wires were connected to the outer and inner tubes using metal clamps.

In this study, liquid composites were used as the heating element. The composites were injected from the lateral outlet in the bottom PTFE tee after removing the PTFE plug, shown in FIGS. 33-34. The volume of the composite injected had to account for 65 cc of volume lost in the bottom PTFE fitting assembly and other volume losses in the injection process, depending on the method. Depending on the viscosity of the injected fluid, a 10,000 psi lever grease gun or plastic syringes may be used to inject the composite in place. The composite was then electrically heated to high temperatures using its own resistivity, and left for few hours to cool. This was done to decrease the viscosity of the composite in order to facilitate the removal of air bubbles trapped in the composite and force it to fully occupy the intended volume in the annular space.

Figure 35:
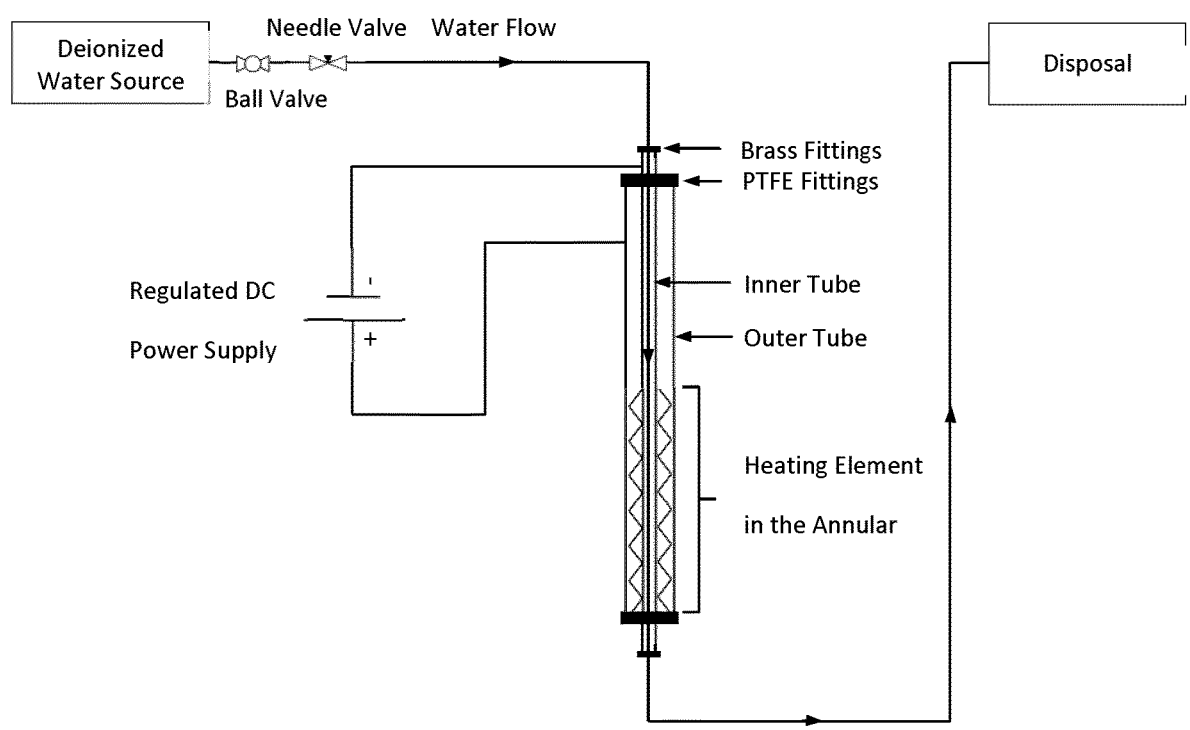
FIG. 35 depicts an illustration of an example embodiment design.

Deionized water was used to absorb the heat generated in the system in order to study the heat transfer performance. As seen in FIG. 35, a deionized water source was connected to the inlet of the inner pipe, at the top of the prototype, using a 3/8" plastic hose and Swagelok® brass fittings. The water then flows through the length of the inner pipe and out of the model through another 3/8" plastic hose to disposal. Water flow rate was set before every run using a graduated beaker and stopwatch. Readings of the same flow rate were recorded several times before starting the experiments and every 15-20 minutes during the run, to decrease the error in heat transfer calculations.

Water temperature was measured and manually recorded using type-K thermocouples and a handheld thermocouple meter by OMEGA Engineering Inc. model HH603A. The position of the thermocouples in terms of the flowing water in the example embodiment was changed in the runs, in an attempt to improve the accuracy of the readings.

In general, experiments were run continuously for 2 hours, and the example embodiment was then left to cool for at least two more hours before undergoing other run. Temperature readings were recorded every 10 minutes, and at higher frequencies before reaching the steady state condition.

In the example embodiment, a silicone based viscous composite was used as the heating element, properties of which are presented in FIG. 36. The composite is made of 80 wt. % polydimethylsiloxane (PDMS) with a viscosity of 350 cP and uses carbon black powder, with mean particle size of 20 nm, as the conductive filler. Carbon black comprises the remaining 20 wt. % of the composite. The high carbon black content in the composite is responsible for the elevation in viscosity (from 350 cP to 627,000 cP—at 25° C.) and low volume resistivity (117 ohm·cm). The composite doesn't contain stabilizers, dispersant or any other additives.

The original composite was modified in the additional experiments by adding colloidal silica amorphous powder (silicone dioxide) and additional polydimethylsiloxane (PDMS). The main reason for adding more PDMS to the original composite was to dilute its carbon black content in order to yield higher resistivity, thus allowing for more power generation in the example. This was also done to study the change in the electrical behavior that resulted from reducing the carbon black content, and increasing or decreasing the viscosity. Colloidal silica with average particle size of 200-300 nm and specific gravity of 2.2 was used a thickening additive to increase the viscosity.

Two different grades/products of polydimethylsiloxane were used to decrease carbon black content in the composite. The properties of the products used are listed in Table 14. Polydimethylsiloxane is a synthetic oil composed of organic methyl groups and inorganic siloxane bonds. The number of units is directly linked to the polymer's molecular weight and viscosity, which, as discussed herein, affects the percolation curve in CPCs.

TABLE 14

Properties of the PDMS used

| Product Name | PSF-60,000 cSt | Heat-Away 640-T Thinner |
|---|---|---|
| Manufacturer | Clearco Products Co., Inc. | Aremco Products Co. Inc. |
| Dynamic Viscosity [cSt] | 60,000 | 50 |
| Kinematic Viscosity [cP] | 58,560 | 48.5 |
| Specific Gravity | 0.976 | 0.97 |
| Molecular Weight | $9 \times 10^4$ | $1.5 \times 10^4$ |
| Thermal Expansion [cc/cc · ° C.] | 0.00096 | — |

The original composite is rated by the manufacturer for an operating temperature between −50 and 200° C. The PDMS in the composite will most likely be affected by high temperatures depending on whether the atmosphere is air or inert gas. At temperatures higher than 170-180° C. in air, oxidation will start to break the carbon-silicone bonds which increases composites's viscosity by intermolecular cross-linking. In inert gases, the high temperature will cause thermal decomposition which decreases the viscosity.

A small apparatus was built to observe the changes in the resistivity and electrical behavior of different composites with respect to changes in their composition and surrounding temperature. The apparatus built is shown in FIG. 37. As illustrated, it is made of two parallel 1.6 mm thick copper plates linked with four ¼" (6.35 mm) threaded plastic rods and hex nuts. The composites are to be placed in a ½" (12.7 mm) ID transparent acrylic pipe between the copper plates. There is no direct contact between the copper plates except through the composite, which allows for the measurement of the composite's resistivity. The length of the acrylic pipe between the copper plates was changed depending on the viscosity of the composite, as using shorter pipe for viscous composites minimizes the amount of trapped bubbles resulting from composite placement.

The first experimental setup using the resistivity apparatuses was intended to simply measure the resistivity of the composites. A multimeter was connected to the copper plates to measure the resistance of the samples filling the pipe in the resistivity apparatus. The resistivity "$\rho_R$" was calculated using Eqn. 1.8

$$\left(R = \frac{\rho_R L}{A}\right)$$

where "R" is the resistance from the multimeter, "L" is the length between the copper plates and "A" is the internal cross-sectional area of acrylic pipe.

The resistance of the composite took time to settle to a stable value after putting it in place, a behavior that is also observed in solid composites with carbon black fillers. Some of the resistivity values calculated could overestimate the true resistivity of the composite, as they didn't account for the effect of trapped bubbles from the mixing or the placement of the sample. The values obtained using this procedure were used to investigate the change in resistivity with respect to carbon black concentration in the composite.

Figure 38:
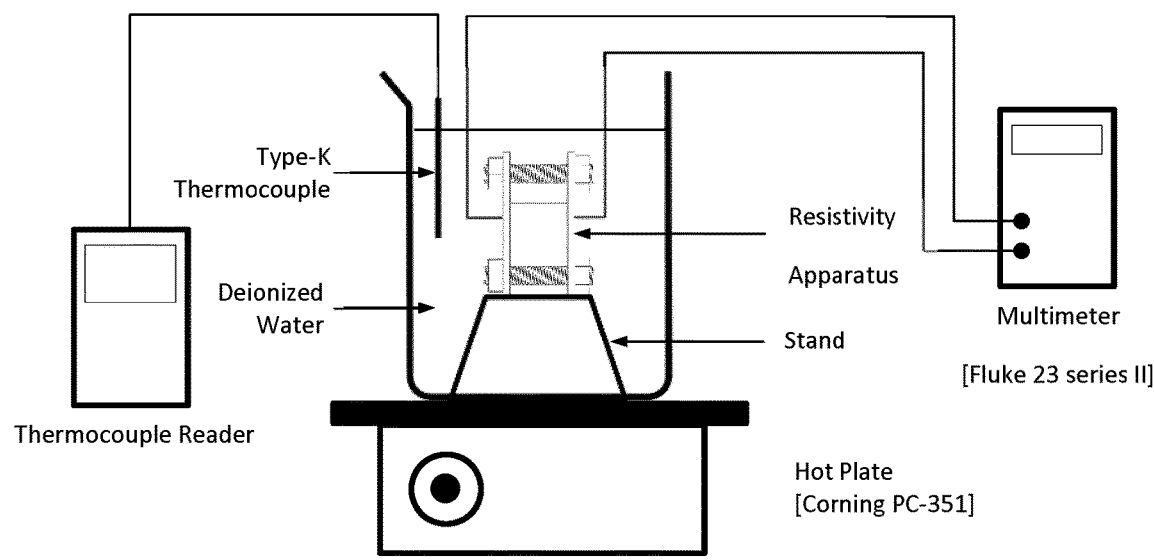
FIG. 38 depicts an experimental set up to determine the effect of temperature on resistivity.

The experimental setup shown in FIG. 38 was used to observe the effect of temperature on the resistivity of selected composites. The aim was to study and highlight the potential of positive temperature coefficient in viscous liquid CPCs to be used in the proposed layout. As seen in FIG. 38, the example apparatus with a 1 cm long plastic pipe was connected to a multimeter and submerged in a heating bath of 900 ml deionized water in a Pyrex beaker. A hot plate was used as the heating source. A type-K thermocouple was placed at the same level as the apparatus in the beaker, to measure the elevation in water temperature.

The first run in a newly placed sample was intended to reduce the composite's viscosity in order to release trapped air bubbles. The apparatus was heated and then left to cool for at least one hour. In the main run, the bath was heated at a very low rate to allow the composite to have a temperature close to that of the heating bath. Each run usually took 2 or more hours and was stopped when the temperature reached 90+° C. The values of resistance and water temperature were manually recorded every 2° C.-4° C. elevation in bath temperature.

The example embodiment was used to study the performance of the system with different heating elements and flow rates. This section presents the results of two cases, each using a different heating element. The cases and experiments are presented in the same chronological order as conducted, to showcase the development of the project.

Experimental Case-1: Low Viscosity Composite

The original composite, with properties listed in FIG. 36, was mixed with a low viscosity thinner, to decrease its carbon black content and thus increase its electric resistivity.

Figure 39:
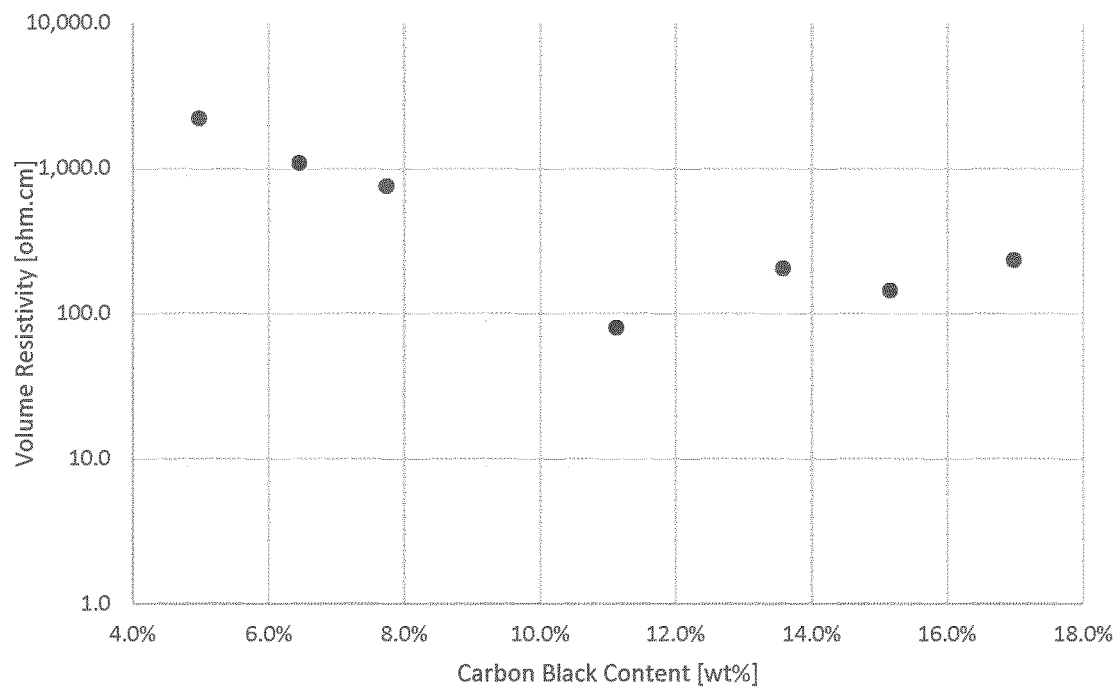
FIG. 39 depicts a graphical representation of composite's resistivity with carbon black content.

The resistivity apparatus described above was used with three and four cm long pipes to help determine the weight percent of the thinner (50 cSt) that should be added to the original composite and yield an appropriate volume resistivity to be used in the prototype. Small sample composites (35 g) with different composition percentages were mixed manually in a dry 50 ml beaker for around 10 minutes for each sample. The samples were then poured in the pipe of the apparatus, and its resistance values were recorded. The weight of the original composite used, and the volume of added silicone (0.97 g/cc), were also recorded to calculate the carbon black weight percent (wt. %) corresponding to each resistivity reading. FIG. 39 presents the results obtained.

The plateau in FIG. 39 observed above 10 wt. % carbon black is an indication that the composites are in the post percolation zone, discussed above. Below this carbon black content, the curve appeared to have entered the percolation zone as resistivity values started to increase at higher rates with decreasing carbon black contents.

Based on the results in FIG. 39, it was decided to create a composite with 6.4 wt. % carbon black. This was done by manually mixing a 165.1 g of the original composite with a 360 cc (349.2 g) of low viscosity PDMS. A sample of the mixture was taken to check the resultant resistivity using the apparatus, and a resistivity of 1,009 ohm·cm was obtained.

Figure 40:
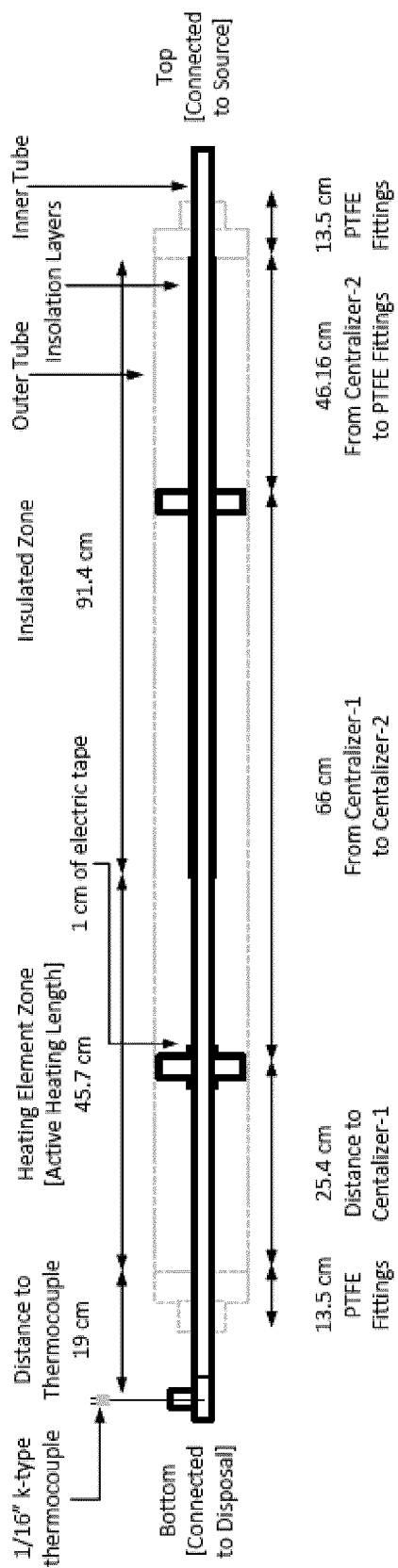
FIG. 40 depicts a cross-sectional schematic of Experimental Case-1

The prepared composite, serving as the heating element, was placed in the prototype to occupy a length of 1.5 ft (45.7 cm) in the annular space between the tubes. As shown in FIG. 40, the inner pipe after that point was insulated to account for composite's thermal expansion. The insulation was composed of several layers of two electric tapes: 3M™ Temflex™ vinyl (rated for maximum operating temperature of 80° C.) and 3M™ glass cloth (rated for maximum operating temperature of 232° C.). Because of its texture, the glass cloth electric tape was not enough to insulate the inner tube from liquid materials, such as the composite in use, so additional layer of vinyl tape was used above it.

Two PTFE centralizers were used in this case and positioned as shown in the cross-section layout in FIG. 40. The top centralizer was approximately 1.7 cm long, 2.3 mm thick and had 3-blades. The top centralizer was designed to be clamped over the insulation layer in the inner tube. The bottom centralizer was 2 cm long, 2.4 mm thick. The bottom centralizer had 4-blades and was hold in place with short electric tapes (1 cm in length) above and below it, to act as stop collars.

Figure 41:
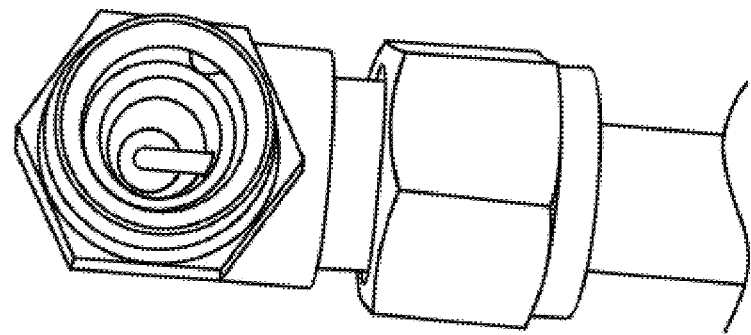
FIG. 41 depicts a thermocouple placed through a brass tee perpendicular to water flow.

Water temperature was measured using a ¹⁄₁₆" type-K thermocouples and a handheld OMEGA thermocouple meter. Water inlet temperature was measured at the source, at the beginning of the experiment and outlet temperature was recorded right at the end of the inner pipe. The thermocouples were placed in the flow of the water using fitting assemblies comprising of brass unions and tee. The fitting assembly was attached to the end of the inner tube by another union and a very short plastic tube. The thermocouple was then placed in the middle of the flow through the lateral outlet of the brass tee, as shown in FIG. 41. The plastic tube, between the brass tee and inner tube, was used to isolate the thermocouple from the voltage flowing through the prototype.

The first run was conducted by adjusting the water flow to 9.5 ml/sec and setting up the power source to supply 28.5 V (fixed volt power). This initially produced a power of 421.8 W in the heating element, however, it was not long before a significant negative temperature coefficient of resistance was observed. The resistance of the composite dropped considerably with the increase in temperature, which caused the power input to increase to 621.3 W in five minutes (47.3% increase). After 6 minutes, the volt was regulated from the source down to 22.5 V, as the current supplied was approaching the maximum level of the power source (30 Amp).

The experiment was aborted after 14 minutes, as the temperature of the prototype surged to a point the bottom PTFE tee ferrules started to melt. Water final temperature and power transferred to the water were recorded and are presented in FIGS. 42 and 43 respectively. During this run, an average of 458.9 W was transferred to the water (1,004 W/m of active heating length), with recorded initial water temperature being 22.5° C. and assuming water specific heat of 4.18 kJ/kg·° C.

The negative temperature coefficient (NTC) was a direct consequence of the high mobility of carbon black conductive particles in the composite used. This behavior was not observed when samples were tested using the resistivity apparatus and was activated by the increase in temperature due to the further decrease in matrix viscosity and, more importantly, the development of convection currents within the composite; which allowed for a more rapid interaction between the conductive particles. In other words, the increase in temperature facilitated the movement of the suspended carbon black particles and allowed them to continuously establish new electric networks, which decreased the overall resistivity and caused the NTC behavior observed.

Experimental Case-2: High Viscosity Composite

Based on the results in Experimental Case-1, a high viscosity composite was prepared by diluting the carbon black content in the original MG-Chemicals composite, this time using the viscous PSF-60,000 cSt PDMS, with properties listed in Table 14. Colloidal Silica 406™ was used to increase solid particles content in the composite, which would further increase its viscosity.

Composition Used

The resistivity apparatus, with a 1 cm long acrylic pipe, was used to help determine the weight percent of PSF-60,000 cSt PDMS that should be added to a given amount of the original composite and produce a suitable volume resistivity. The example apparatus was also used to investigate the effect of colloidal silica on the resultant resistance.

Figure 44:
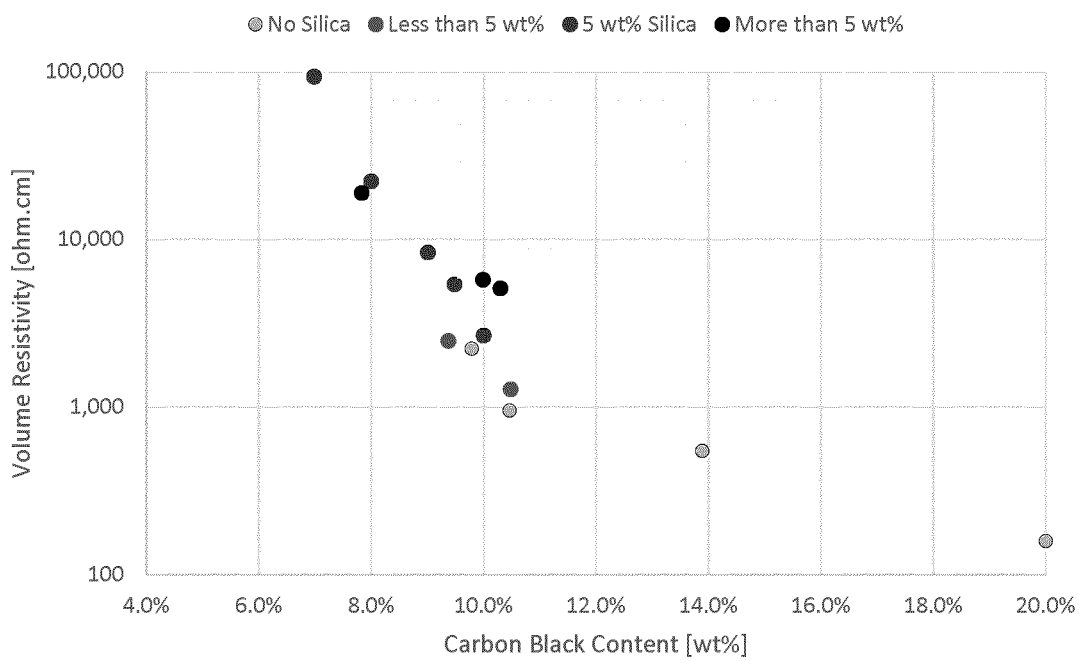
FIG. 44 depicts high viscosity composite's resistivity with varying carbon black content.

Sample composites with different compositions of the above mentioned components were prepared by mixing them with a drill in a dry beaker for at least 10 minutes. For each sample tested, the weight of the original composite, the added PDMS and colloidal silica were recorded, and the resultant resistivity values are presented in FIG. 44.

Figure 65:
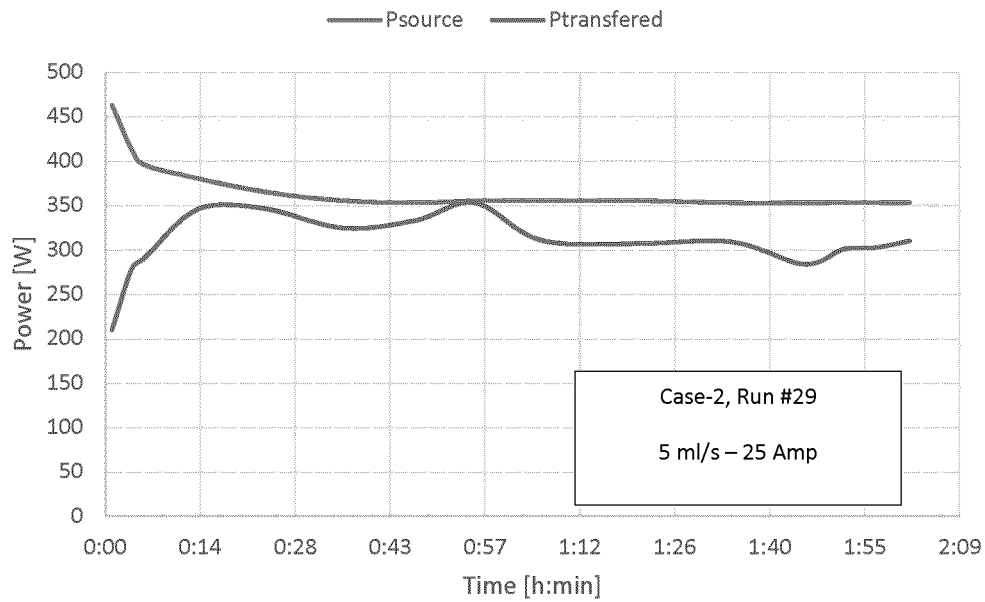
FIG. 65 depicts a graphical representation of Case-2, Run #29 power supplied (Psource) and power transferred to the water (Ptransfered) versus time.
Figure 66:
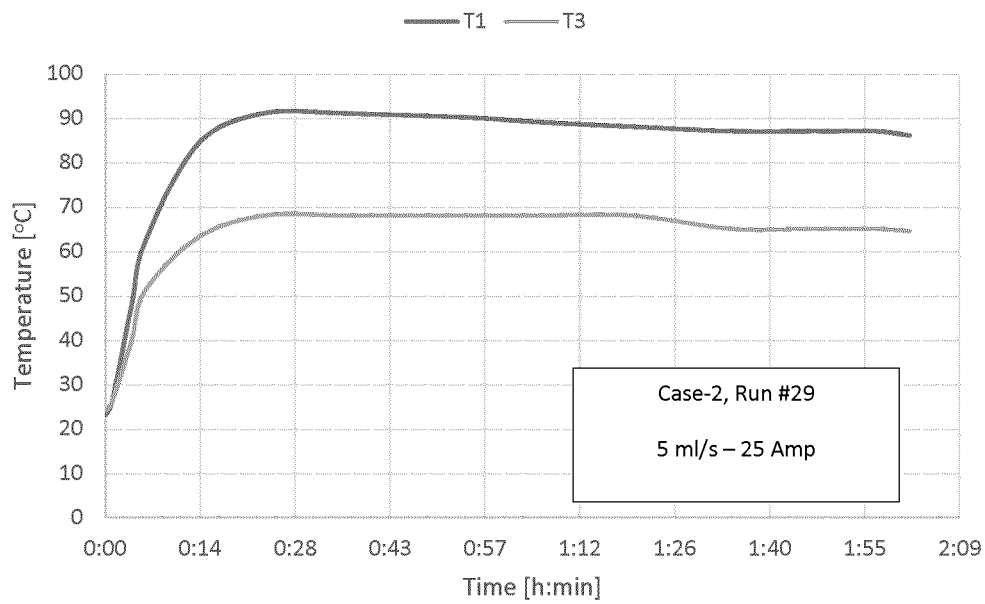
FIG. 66 depicts a graphical representation of Case-2, Run #29 outer pipe temperature at 38.1 cm (1.25 ft, T1) and 91.5 cm (3 ft, T3) from PTFE fittings versus time.
Figure 67:
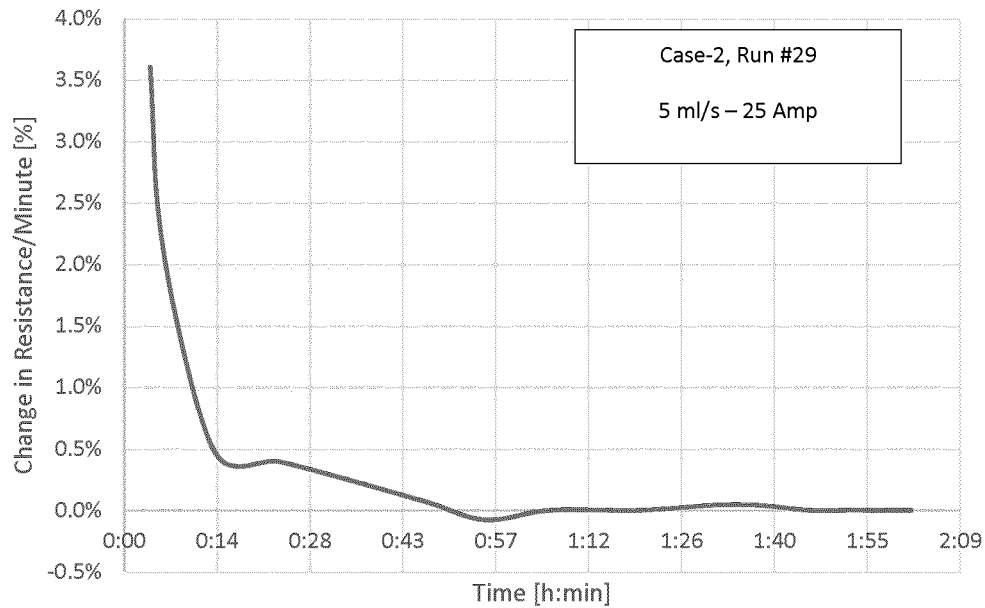
FIG. 67 depicts a graphical representation of Case-2, Run #29 change in model's resistance per minute versus time.

FIG. 65 shows that samples with different silica compositions follow the same overall trend as determined for the carbon black only. The resistivity increased steadily with decreasing carbon black content in the region between 20 wt. % to around 10.5 wt. %. Below 10.5 wt. %, the composites are believed to have entered the percolation zone as resistivity started to increase at a much higher rate. It was also observed that silica wt. % affected resistivity values to an extent; generally, more silica content yielded higher volume resistivity. This could be a consequence of the much higher viscosity of composites with greater silica content, as that would potentially allow for more trapped air from the preparation of these samples. It should also be noted that the ratio between the added PSF-60,000 cSt PDMS to the PDMS used in the original composite would also affect the resistivity readings, due to the difference in the molecular weight of the two particles and the influence of that in the distribution of the conductive filler in the matrix.

For the experiments in this case, a composite with a 10.5 wt. % carbon black and 5 wt. % colloidal silica was prepared. This was done by mixing 330.75 g of the original composite with 267.75 g of PSF-60,000 cSt PDMS and 31.5 g of colloidal silica. The components were initially mixed with a drill, however, the relatively higher quantities of the prepared composite necessitated the use of a 10 quart heavy duty industrial mixer for an additional 1 hour, in order to produce a more homogenous blend. A sample of the resultant mixture was taken to measure its resistivity and a value of 3,434 ohm·cm was obtained.

Layout

Figure 45:
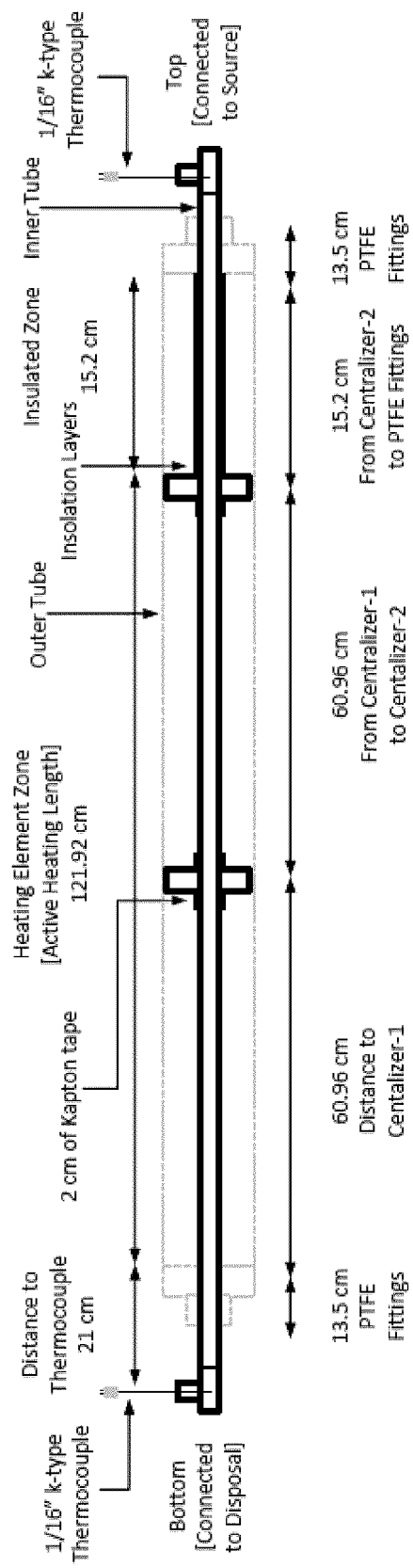
FIG. 45 depicts a cross sectional schematic of Experimental Case-2.
Figure 46:
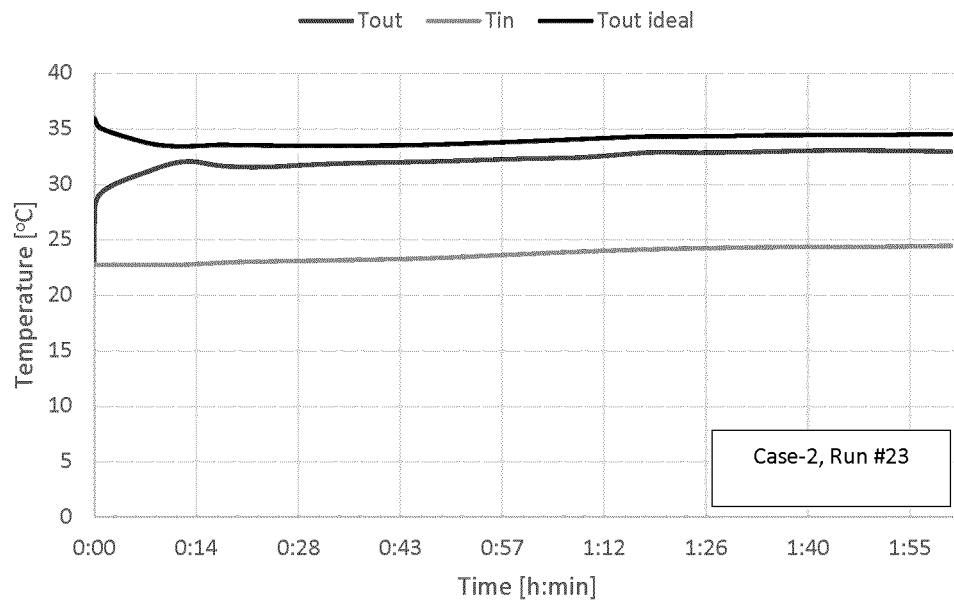
FIG. 46 depicts Case-2, Run #23 water inlet temperature (Tin), recorded outlet temperature (Tout) and calculated ideal final temperature (Tout ideal) versus time.
Figure 47:
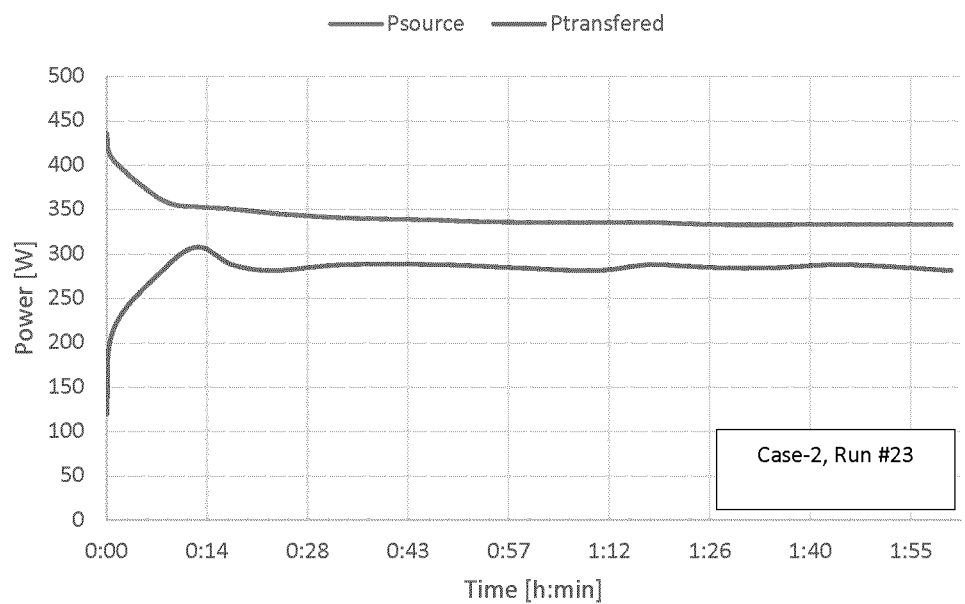
FIG. 47 depicts a graphical representation of Case-2, Run #23 power supplied (Psource) and power transferred to the water (Ptransfered) versus time.
Figure 48:
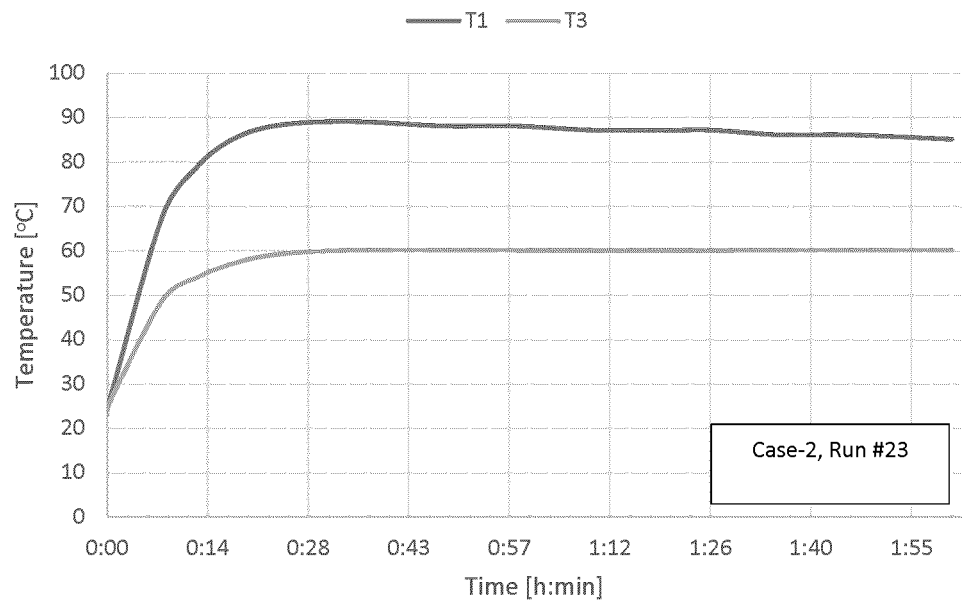
FIG. 48 depicts a graphical representation of Case-2, Run #23 outer pipe temperature at 30.5 cm (1 ft, T1) and 91.5 cm (3 ft, T3) from PTFE fittings versus time.
Figure 49:
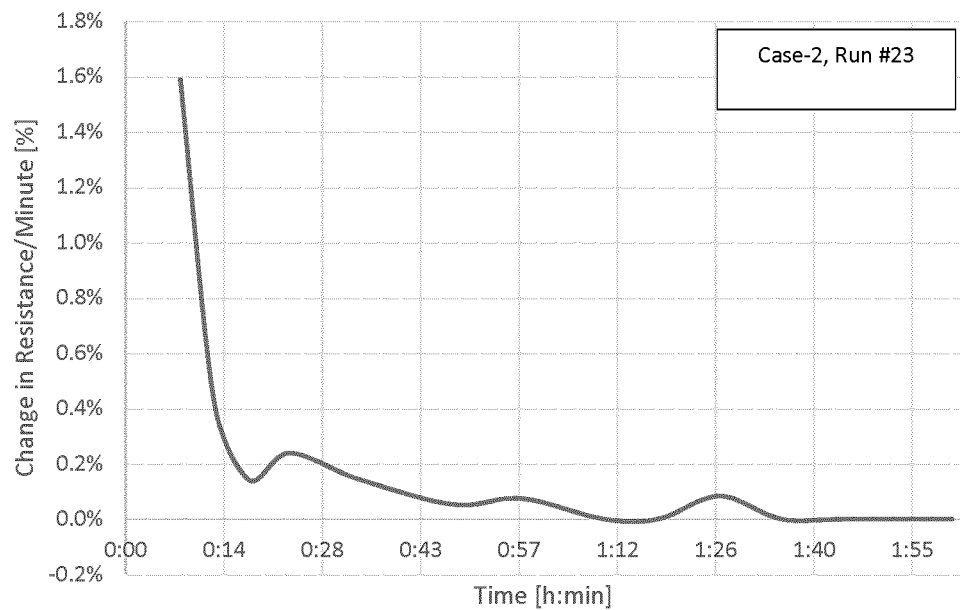
FIG. 49 depicts a graphical representation of Case-2, Run #23 change in model's resistance per minute versus time.
Figure 50:
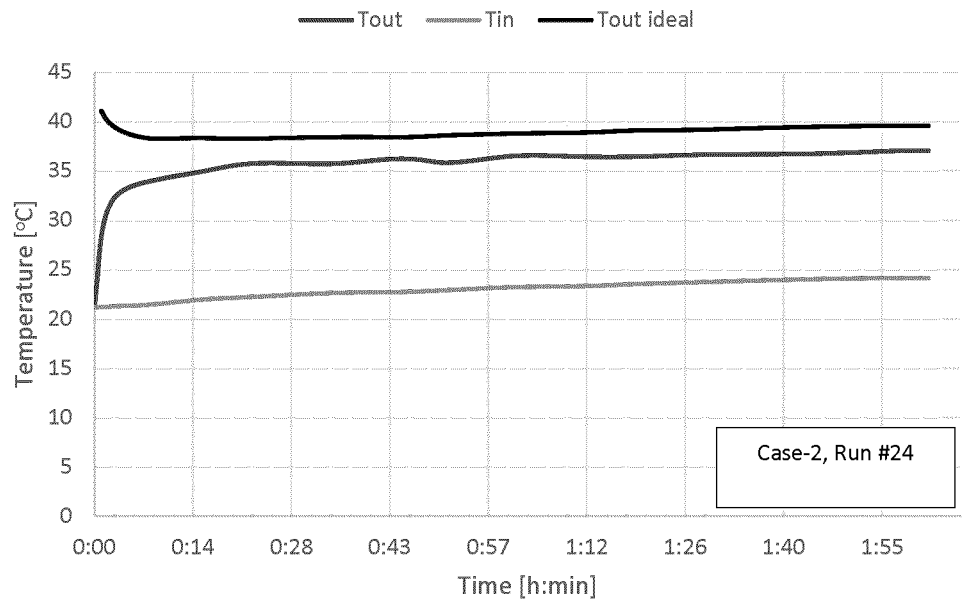
FIG. 50 depicts a graphical representation of Case-2, Run #24 water inlet temperature (Tin), recorded outlet temperature (Tout) and calculated ideal final temperature (Tout ideal) versus time.
Figure 51:
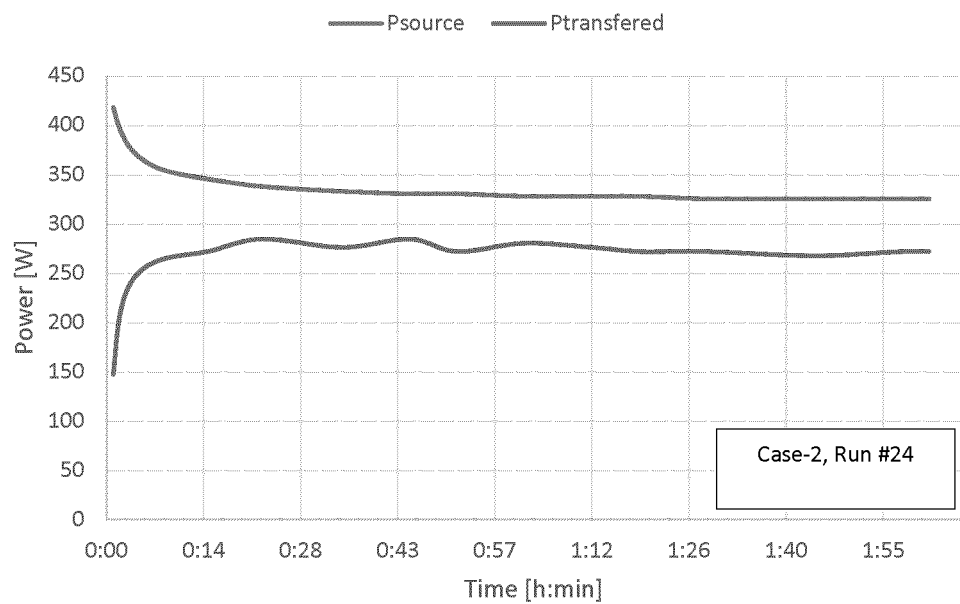
FIG. 51 depicts a graphical representation of Case-2, Run #24 power supplied (Psource) and power transferred to the water (Ptransfered) versus time.
Figure 52:
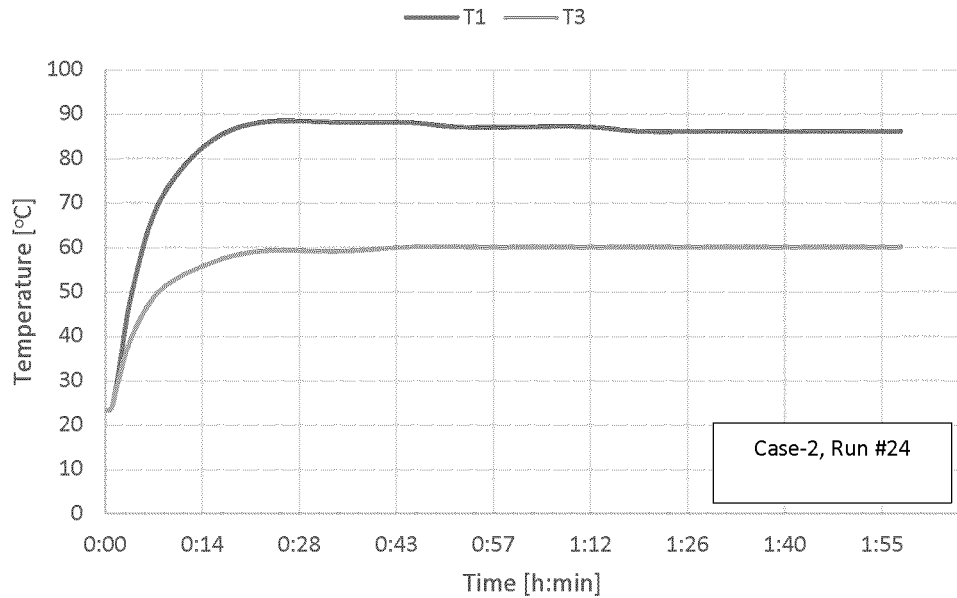
FIG. 52 depicts a graphical representation of Case-2 Run #24 outer pipe temperature at 30.5 cm (1 ft, T1) and 91.5 cm (3 ft, T3) from PTFE fittings versus time.
Figure 53:
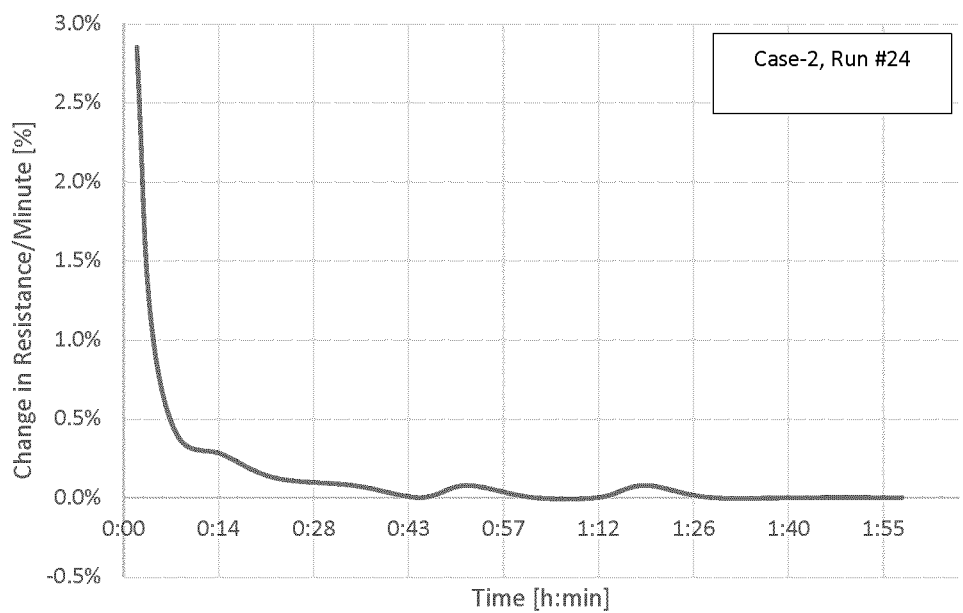
FIG. 53 depicts a graphical representation of Case-2, Run #24 change in model's resistance per minute versus time.

The layout used in Experimental Case-2 runs is shown in FIG. 45. The heating element was placed over a length of 4 ft between the prototype's tubes. After that length, the outer surface of the inner tube was insulated using 2 layers of Kapton adhesive tape, rated for a maximum operating temperature of 258° C.

Two identical 4-blade PTFE centralizers were placed after 2 and 4 ft from the bottom of the outer tube in the prototype's annular space. The centralizers were 1 cm long, 1.3 mm thick and were held in place with 2 cm long Kapton layers above and below each of them, which acted as stop collars.

Similar to experimental case-1, water temperatures were recorded manually using type-K thermocouples and a hand-held OMEGA thermocouple meter. The same brass fitting used in experimental case-1 were again used to place a 1/16" thermocouple in the middle of the flow and measure the water outlet temperature. Unlike case-1, however, water initial temperatures were also measured and recorded during the runs using another 1/16" type-K thermocouple placed at the top of the prototype, just before the beginning of the inner pipe, in a brass fittings assembly similar to the one at the bottom of the prototype and shown in FIG. 41.

Two bi-metal dial thermometers were clipped on the outer pipe to monitor the change in its temperature with time. The thermometers were placed 30.5 cm and 91.5 cm (1 and 3 ft) from the bottom PTFE fittings. They had a temperature range of 0 to 120° C., and were clipped on the pipe with 60 mm springs.

Results

As described above, the composite in place was first heated for half an hour with an average power of 277 W. At the end of the heating step, the model's outer tube temperature was recorded to be 133° C. (using thermocouple). The composite was then left to cool for 4 hours before the main runs with water.

FIG. 46 through FIG. 53 present the results obtained from two runs, where water flowed at rates of 7.9 and 5.0 ml/s. The power supply for all runs was set up at a fixed current of 25 Amps, and the voltage supplied was observed to decrease gradually until finally reaching a steady state with flow rate and surrounding conditions.

Changing Thermocouples Placement

Figure 54:
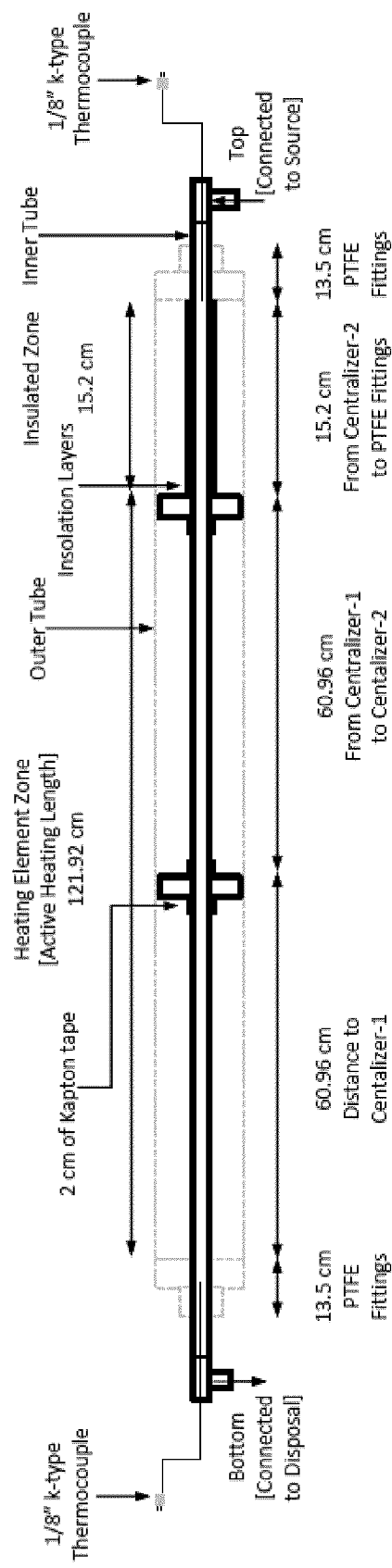
FIG. 54 depicts a modified cross-sectional schematic of prototype's tubes of Experimental Case-2.

As an attempt to increase the accuracy of recorded water inlet and outlet temperatures, new fittings assemblies were used to change the placement of the thermocouples in order to minimize the "distance to thermocouple" showed in FIG. 45. The modified layout is shown in FIG. 54.

Figure 42:
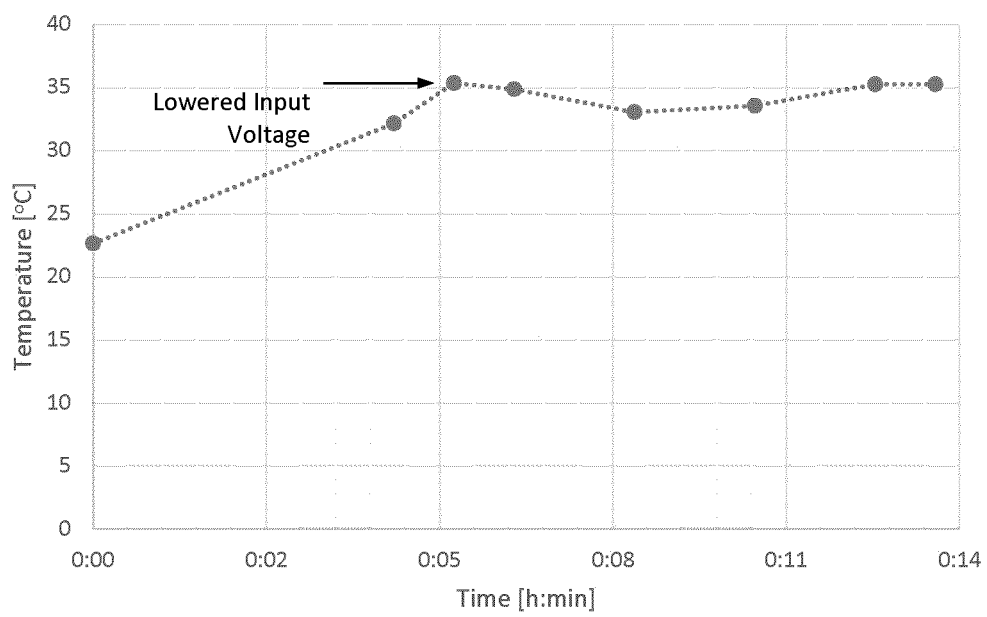
FIG. 42 depicts Experimental Case-1 water outlet temperature versus time.
Figure 43:
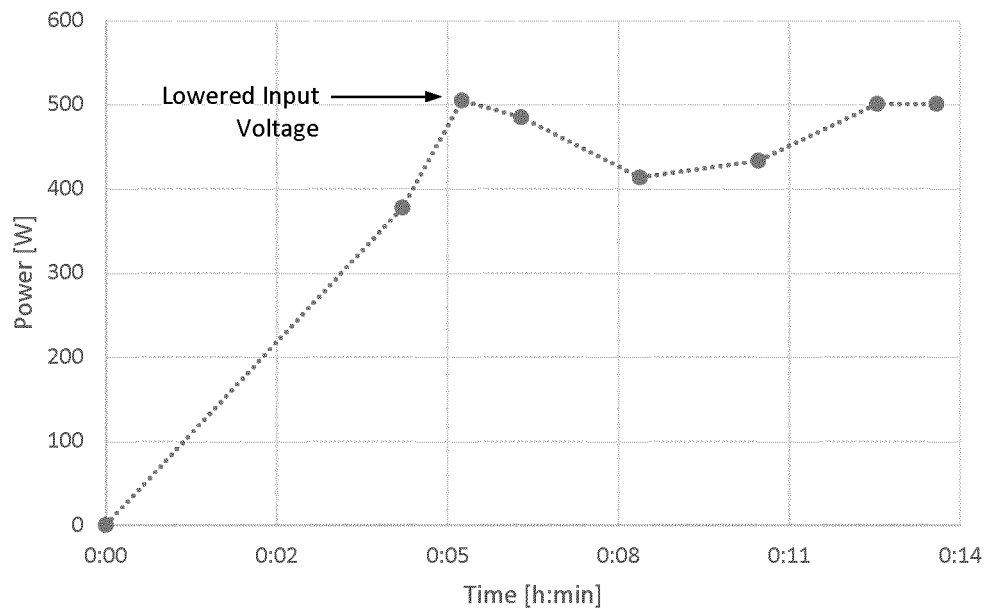
FIG. 43 depicts Experimental Case-1 power transferred to water versus time.
Figure 55:
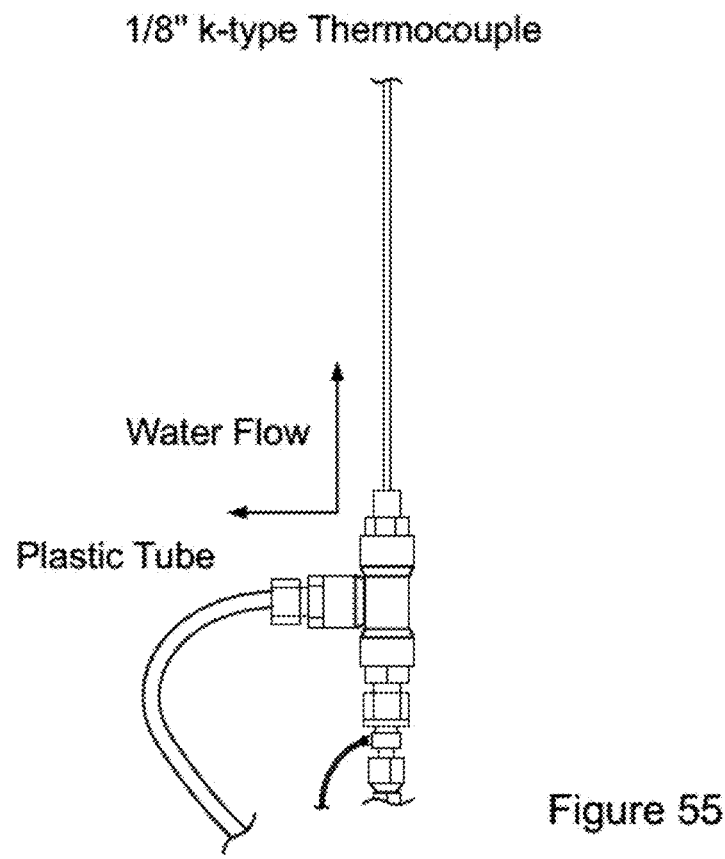
FIG. 55 depicts a thermocouple placed through a plastic tee, union and adapter fittings.
Figure 56:
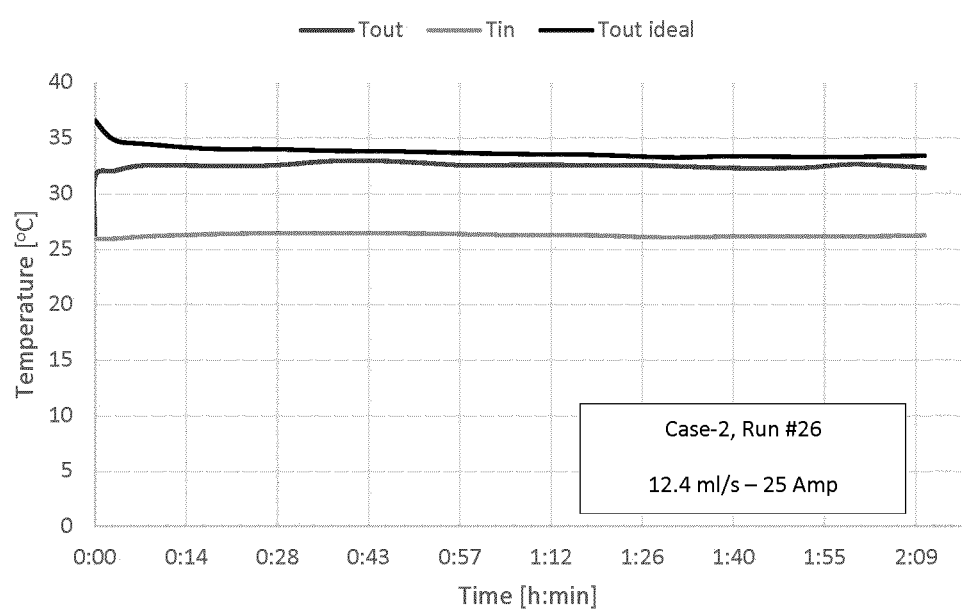
FIG. 56 depicts a graphical representation of Case-2, Run #26 water inlet temperature (Tin), recorded outlet temperature (Tout) and calculated ideal final temperature (Tout ideal) versus time.
Figure 57:
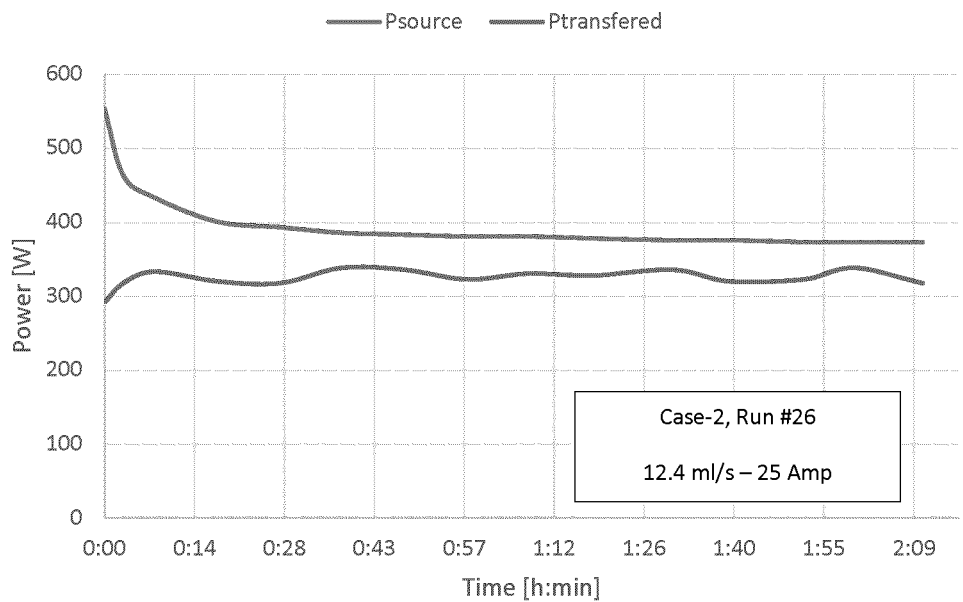
FIG. 57 depicts a graphical representation of Case-2, Run #26 power supplied (Psource) and power transferred to the water (Ptransfered) versus time.
Figure 58:
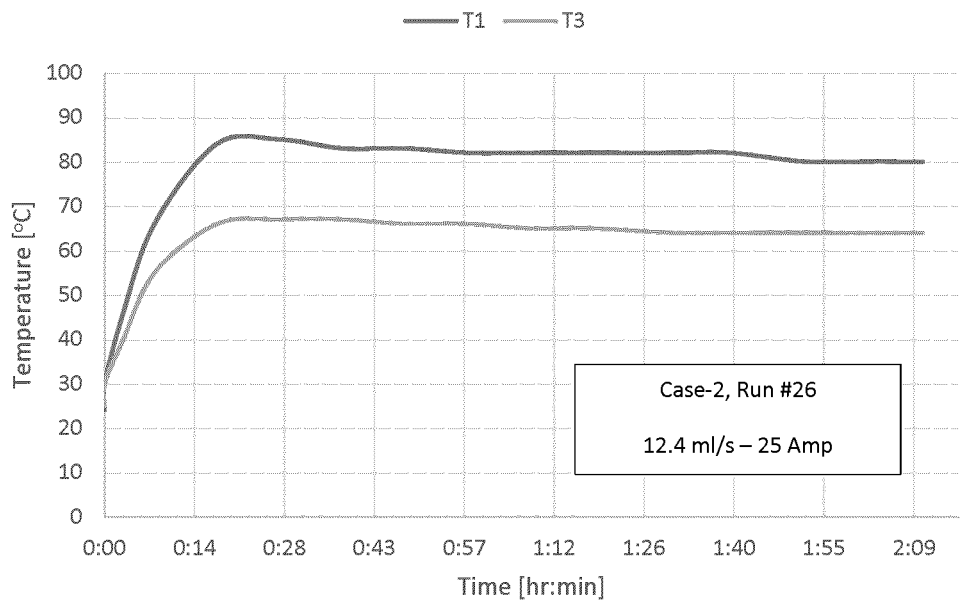
FIG. 58 depicts a graphical representation of Case-2, Run #26 outer pipe temperature at 38.1 cm (1.25 ft, T1) and 91.5 cm (3 ft, T3) from PTFE fittings versus time.
Figure 59:
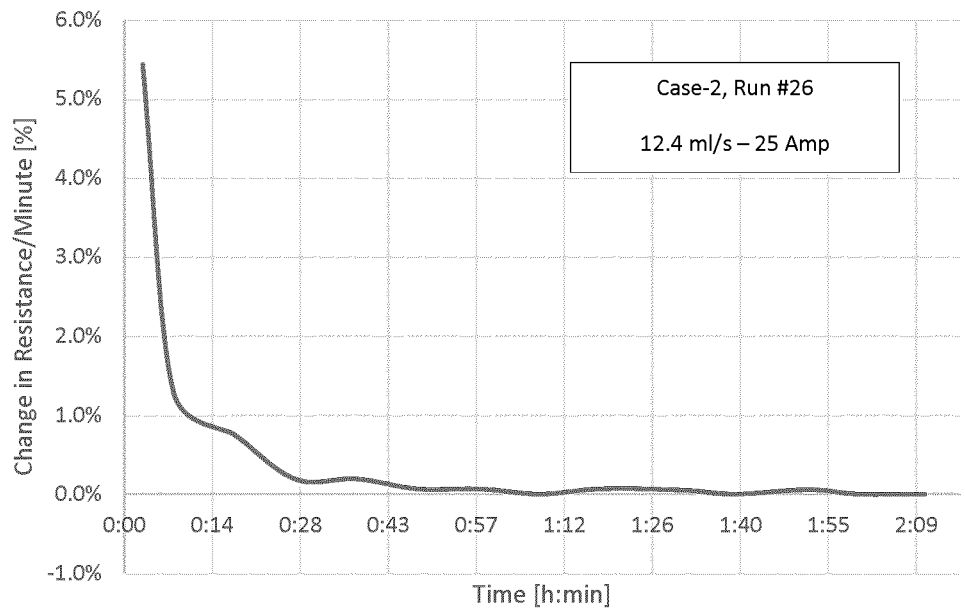
FIG. 59 depicts a graphical representation of Case-2, Run #26 change in model's resistance per minute versus time
Figure 60:
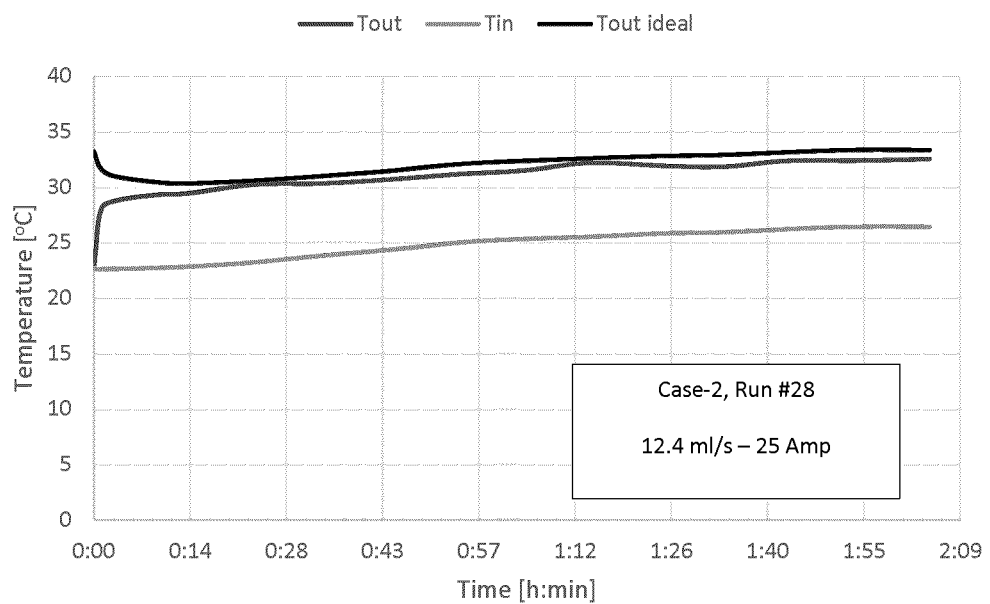
FIG. 60 depicts a graphical representation of Case-2, Run #28 water inlet temperature (Tin), recorded outlet temperature (Tout) and calculated ideal final temperature (Tout ideal) versus time.
Figure 61:
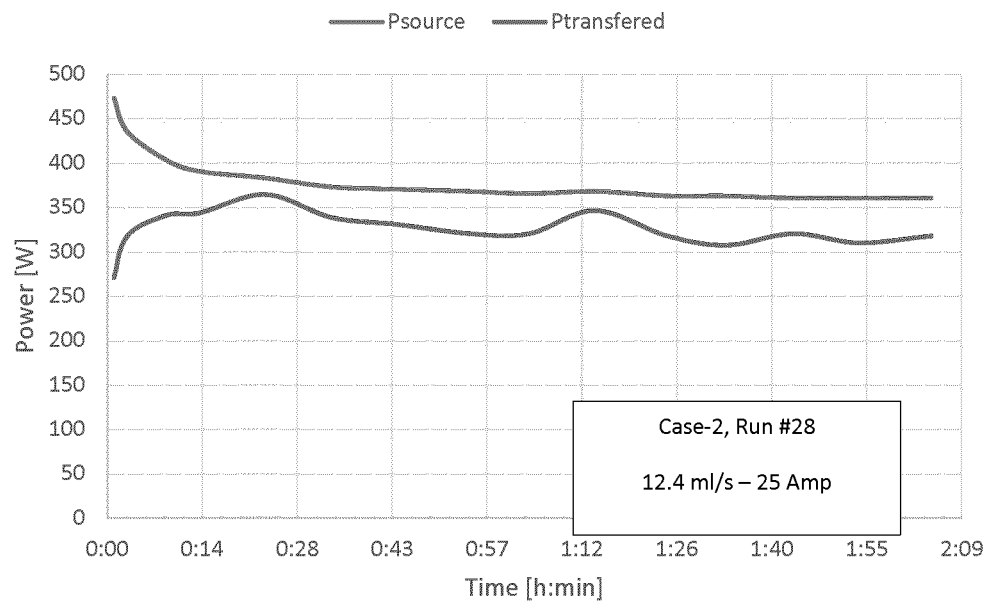
FIG. 61 depicts a graphical representation of Case-2, Run #28 power supplied (Psource) and power transferred to the water (Ptransfered) versus time.
Figure 62:
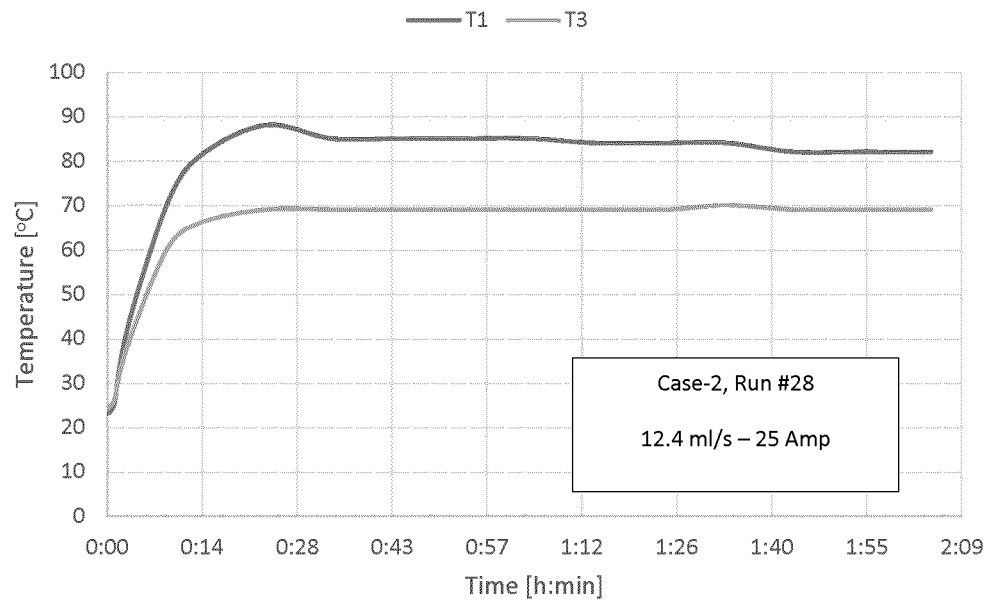
FIG. 62 depicts a graphical representation of Case-2, Run #28 outer pipe temperature at 38.1 cm (1.25 ft, T1) and 91.5 cm (3 ft, T3) from PTFE fittings versus time.
Figure 63:
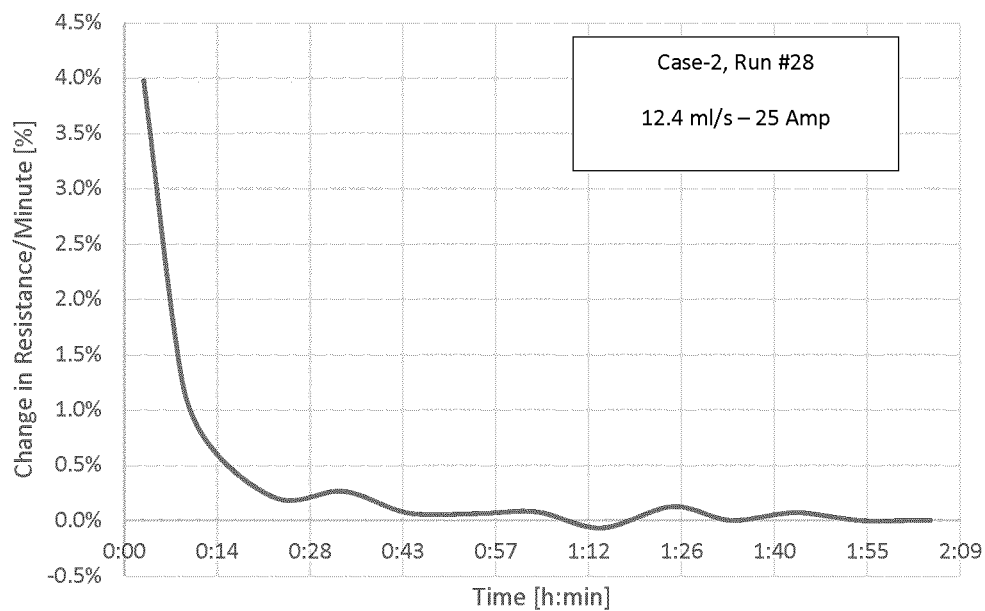
FIG. 63 depicts a graphical representation of Case-2, Run #28 change in model's resistance per minute versus time.
Figure 64:
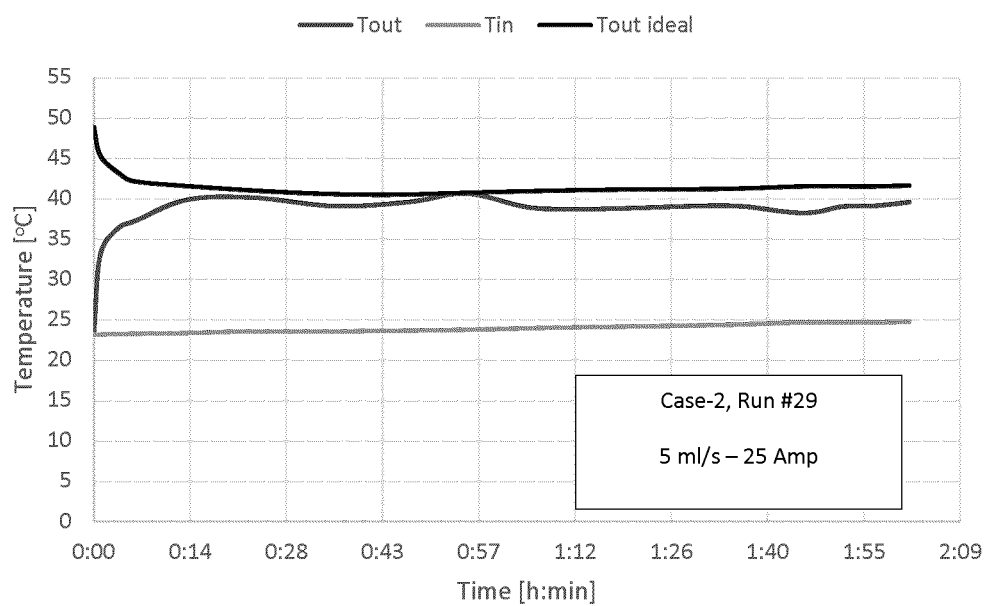
FIG. 64 depicts a graphical representation of Case-2, Run #29 water inlet temperature (Tin), recorded outlet temperature (Tout) and calculated ideal final temperature (Tout ideal) versus time

The new assemblies, shown in FIG. 55, were connected to both ends of the inner tube, instead of the brass fittings assembly shown in FIG. 42. The new assembly consisted of a 1/8" K-type thermocouple placed through a plastic tee from its bottom outlet, in addition to brass and aluminum unions and adapters to connect the assembly to the inner pipe and the plastic tubes (to disposal or from the source). The thermocouples were placed so that their tip is in the middle of the flow and positioned to take the temperature right after the PTFE fitting assemblies, as shown in FIG. 54. New 1/8" thermocouples were used instead of the 1/16" used before, to make sure that the thermocouple doesn't bend and touch the inner surface of the inner tube during the runs.

The new thermocouple assembly was used in Experimental Run #26 where water flowed at a rate of 12.4 ml/s. The results obtained are presented below in FIG. 56 to FIG. 59.

Adding Top Nozzle

To further maximize the percentage of power transferred to the flowing water, a nozzle was inserted at the top of the inner tube in order to induce turbulence in the flow. The nozzle was introduced at the top thermocouple assembly in the same layout shown in FIG. 54, and was created by drilling a 7/40" (4.445 mm) hole through a 3/8" PTFE solid rod. The rod was then placed between the top plastic tee and the inner pipe (in FIG. 55 assembly). The top 1/8" thermocouple was put in place through the nozzle; thus decreasing the cross-sectional area of water flow in the nozzle to only 0.0118 inch2 (7.6 mm2). This increased the velocity of the water flowing in the nozzle to 163.1 cm/s for a flow rate of 12.4 ml/s, and 65.8 cm/s for a flow rate of 5.0 ml/s. The turbulence created will have a more significant effect at higher flow rates, and its influence will gradually decrease as water flows away from the nozzle.

Figure 68:
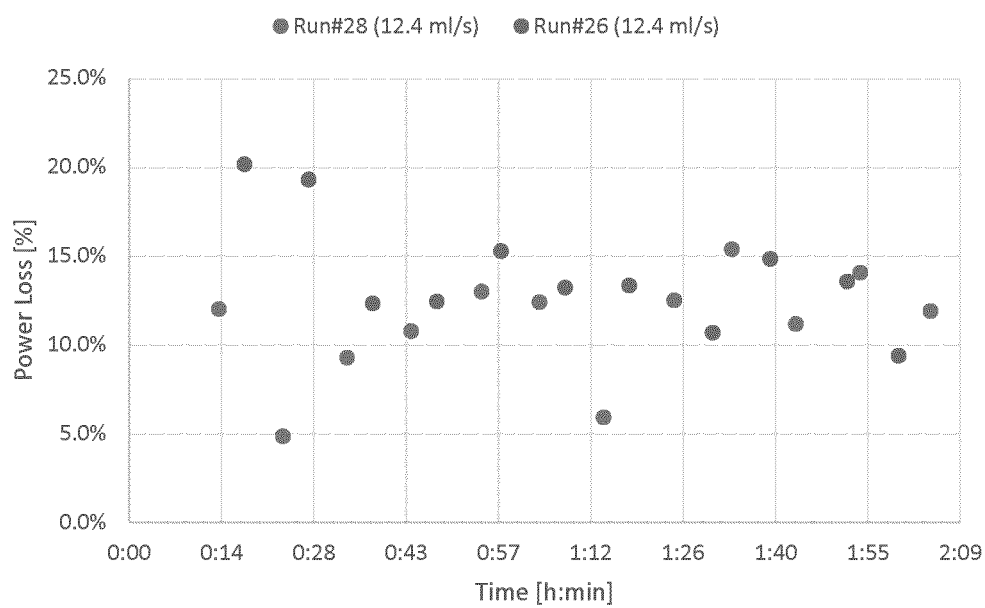
FIG. 68 depicts a graphical representation of the effect of introducing the top nozzle in power loss percentage.
Figure 69:
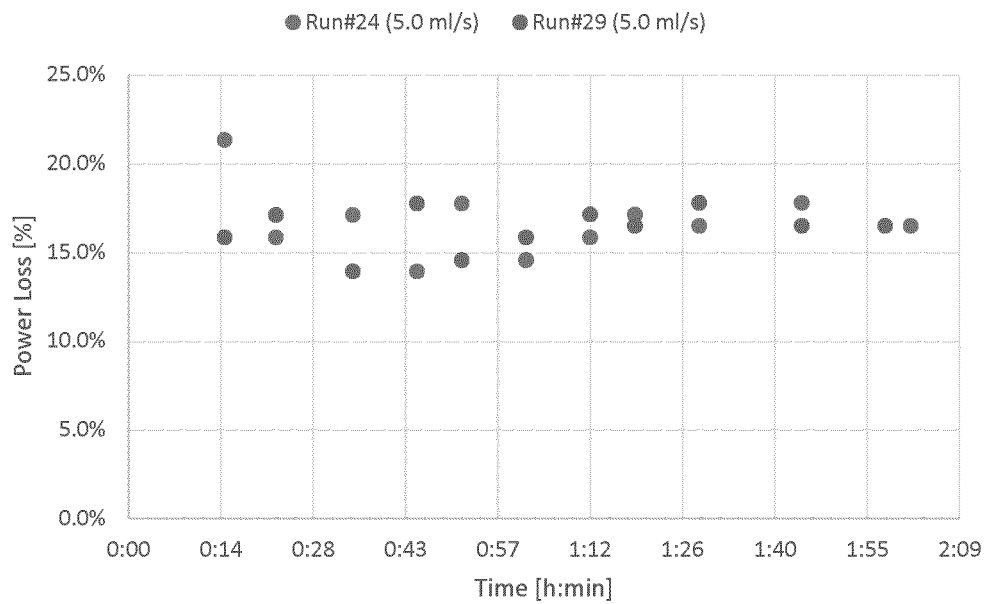
FIG. 69 depicts a graphical representation of the effect of the new thermocouple assembly and top nozzle in power loss percentage.

Experimental Run #26 (12.4 ml/s) was repeated, with the nozzle in place, in Experimental Run #28, and the results are presented in FIGS. 60-63. Experimental Run #24 (5.0 ml/s) was also repeated in Experimental Run #29 and the results are presented in FIG. 64 through FIG. 67. The effect of introducing the top nozzle in the new thermocouple assembly is shown in FIG. 68 and FIG. 69. The effect of different flow rates is shown in FIG. 91.

Discussion

It is clear from the figures presenting the prototype's change in resistance that the heating element used for Experimental Case-2 runs showed a NTC behavior. The viscosity of the composite was not low enough to develop convection currents, thus the decrease in resistance was not as significant as in Experimental Case-1 and the resistivity of the composite eventually stabilized when the system reached a steady state condition. Further study on the resistivity behavior of the composite used was conducted and presented herein. The steady state condition is usually reached after 30-40 minutes from the start of the experiment after which the power input stabilizes, as well as the temperatures of the outer pipe and water output.

Figure 71:
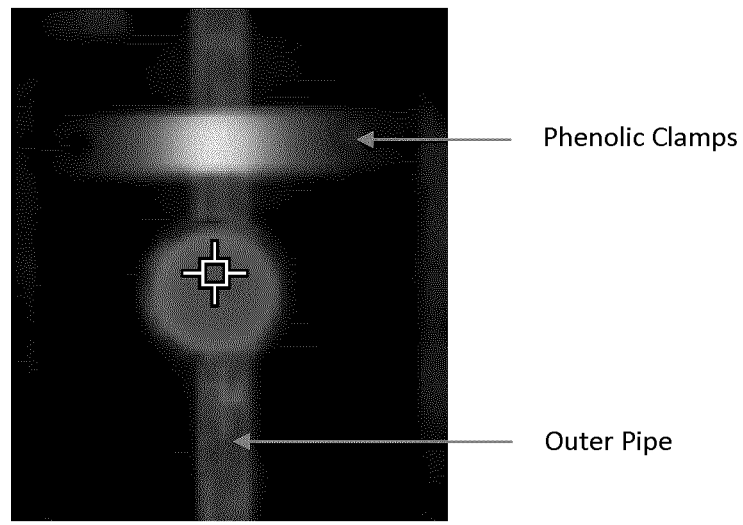
FIG. 71 depicts thermal image of prototype's outer pipe during one of the runs.

The temperature of the outer pipes was observed to be nonuniform, as seen the figures showing outer pipe temperatures (T1 and T3). This is mainly due to the cooling effect of the injection water, which allowed the temperature of the upper part of the pipe to be lower than the bottom part. Despite the NTC behavior of the composite used, no further increase in the temperature of the bottom section of the outer pipe was observed, after reaching steady state, as current was distributed depending on the resistivity of each zone. Zones of the outer pipe that were covered by the bottom PTFE ferrules and phenolic clamps had higher temperatures due to lower heat losses. FIG. 71 shows an infrared image of the outer pipe during one of the runs, where The average temperature of water at the exit was generally close to the ideal output temperature calculated based on the flow rate and the current and voltage values displayed in the power supply. The difference between the two values can be attributed to the heat loss to the surrounding, in addition to errors in measuring water temperatures and flow rates, which are discussed below. According to FIGS. 68-69 changing the placement of the thermocouples and introducing the top nozzle didn't bring about a noticeable change in the power loss percentage.

Figure 70:
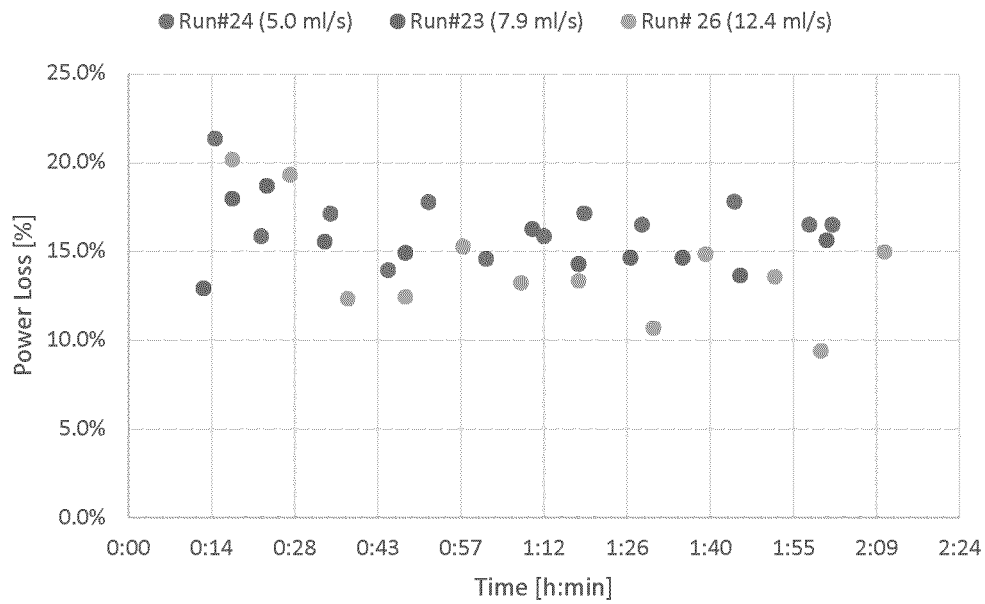
FIG. 70 depicts a graphical representation of the effect of the flow rates on the power loss percentage.

On the other hand, different flow rates seemed to have an effect on the power loss percentage; as, according to FIG. 70, higher flow rates seemed to have less power losses. This could be an indication that heat loss to surrounding is the major factor responsible for the power losses exhibited in Experimental Case-2 runs. Lower flow rates caused the outer pipe to have a higher temperature which consequently leads to more heat loss to the surrounding. This can be seen when comparing the temperature profile of the outer pipes at a flow rate of 12.4 ml/s, shown in FIG. 58, and a flow rate of 5.0 ml/s, shown in FIG. 52.

Power transferred to the water was calculated using Eqn. 1.9. The specific heat of water "$C_p$" used in the equation was approximated using Eqn. 1.10, where "$T_{avg}$" is the average temperature of the water flowing through the inner pipe, which was calculated for every run. The electric power input was calculated based on the current "I" and voltage "V" values displayed on the power supply using Eqn. 1.11 and water density was assumed to be 1 g/cc.

$$Q = \dot{m} C_p \Delta T \quad \text{Eqn. 1.9}$$

$$C_p = 5631.3 - 9.2262 T_k + 1.4622 \times 10^{-2} T_k^2 \quad \text{Eqn. 1.10}$$

$$P = IV \quad \text{Eqn. 1.11}$$

Where:

| | | |
|---|---|---|
| $P_w$ | Electric power | [W] |
| Q | Power transferred | [W] |
| $\dot{m}$ | Mass flow rate | [g/s] |
| $C_P$ | Specific heat of water | [J/kg · K] |
| $\Delta T$ | Difference between initial and final water temperatures | [° C.] |
| $T_k$ | Average water temperature | [K] |
| I | Current | [Amp] |
| V | Voltage | [V] |

Effect of Temperature on Composites' Resistivity

The setup used above was used to study the temperature coefficient of resistance of four different composites to highlight the effect of composition on the behavior of their resistivity with elevation in temperature. The study was performed on carbon conductive grease and included the addition of carbon black and colloidal silica.

The results of each run are presented in two types of graphs to show the change in apparatus resistance with temperature, and the percentage of resistance increase/decrease per degree Celsius as a function of temperature. The rates of resistance change are plotted so that positive values represent a PTC behavior and negative values represent NTC behavior. The intersection of the rate of resistance change plot with the x-axis in these graphs represents the temperature where the composite started to show a negative temperature coefficient of resistance.

Temperature elevation will affect the composites' resistivity through two physical phenomena, the first one is the expansion of host polymer's particles which increases the resistivity of the composite as explained above, and the second one is the reduction in composites' viscosity which allows the movement of the suspended carbon black particles and causes a reduction in composites' resistivity.

Figure 72:
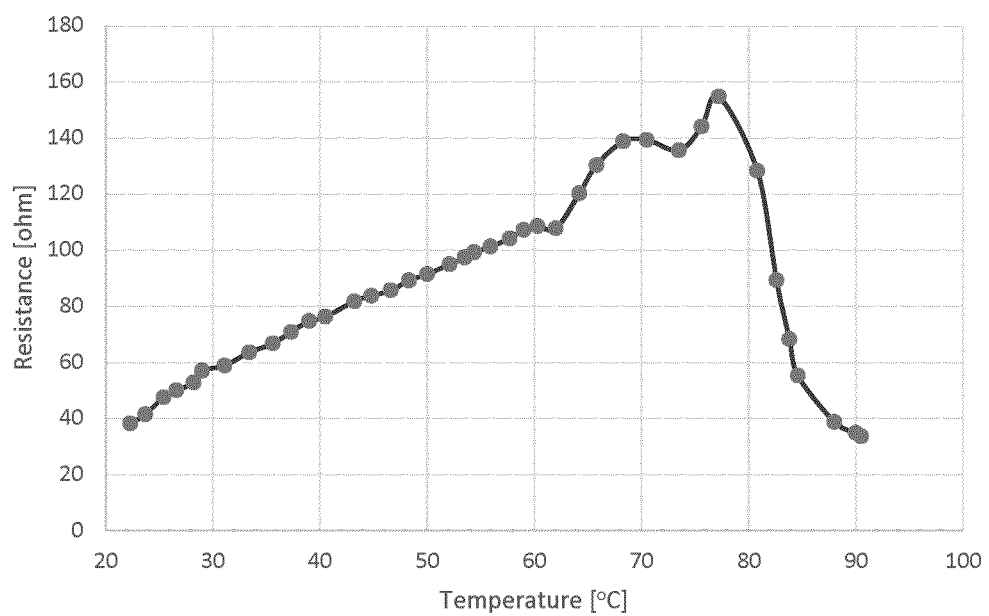
FIG. 72 depicts a graphical representation of a composite's resistance versus temperature.
Figure 73:
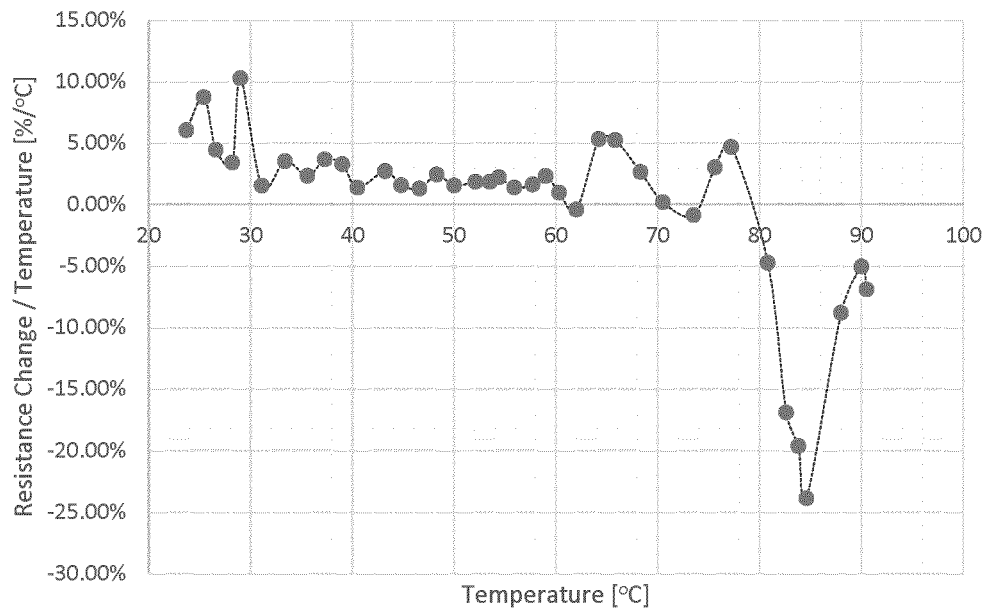
FIG. 73 depicts a graphical representation of a composite's resistance change percentage/C versus temperature.
Figure 74:
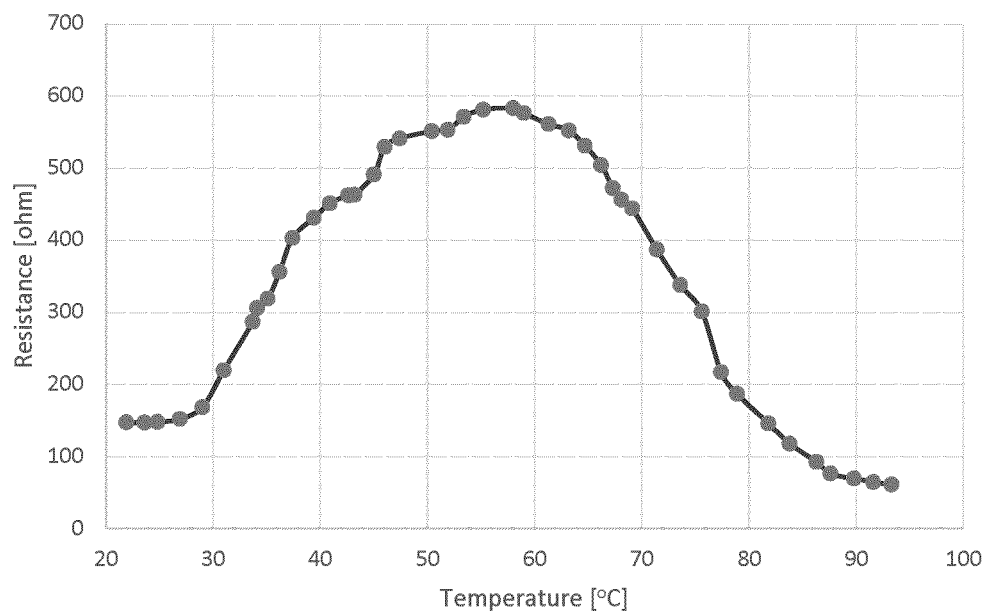
FIG. 74 depicts a graphical representation of a composite's resistance versus temperature.

The first run was conducted on the original composite. The composite's properties are listed in FIG. 36 and as mentioned above, the composition is made of 20 wt. % carbon black particles and 80 wt. % silicone oil (PDMS) with a viscosity of 350 cP at 25° C. Average heating rate of water bath for this run was 0.5° C./minute. As seen in FIG. 72 and FIG. 73, the composite initially exhibited a positive temperature coefficient where its original resistivity increased 306.58% inside the apparatus. The PTC behavior was observed between the temperatures of 22.4° C. to 77.2° C. at an average resistance change of 2.88%/° C. The resistance then started to decrease at a higher rate (12.3%/° C.) and eventually reaching a lower value than the original resistance at 90.5° C.

Figure 76:
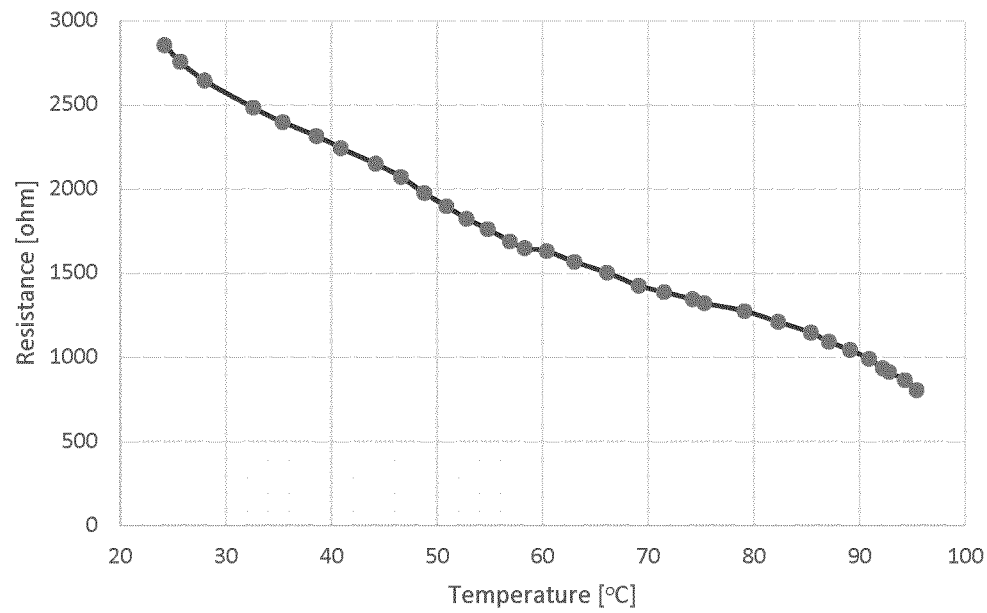
FIG. 76 depicts a graphical representation of a composite's resistance versus temperature.
Figure 77:
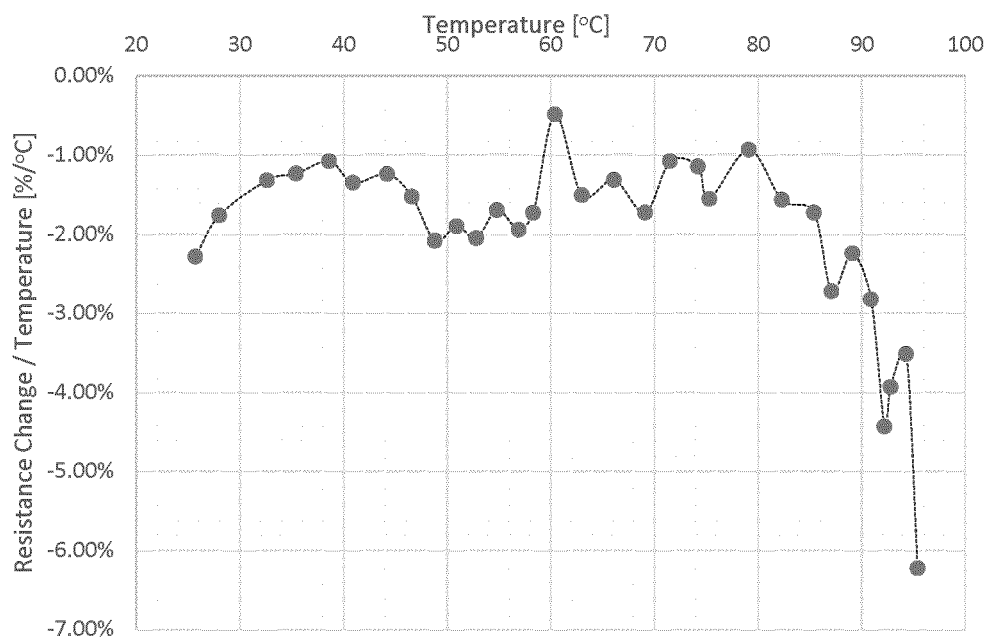
FIG. 77 depicts a graphical representation of a composite's resistance change percentage/C versus temperature.

Another product was tested. This composite has a viscosity of 630,000 cP and a density of 1.03 g/cc at 25° C. (compared to 627,000 cP and 1.1 g/cc for the original composite). This composite is composed of 12 wt. % carbon black, 82 wt. % synthetic oil (silicone free), 2% Zinc naphthenate and 0.3% amorphous fumed silica. The average heating rate of the water bath for this run was 0.78° C./minute. FIGS. 76-77 show that the composite has a PTC behavior up to 58° C., in this period the resistance increased 297.54% from the original resistance at an average rate of 4.62%/° C. The composite's resistance then started to decrease at a similar rate of 5.71%/° C., reaching a lower value than original resistivity at 81° C.

The viscosity of these composites was elevated by its colloidal particles content, rather than its matrix particle size. This may explain the relatively short PTC region of these composites. The difference in the electric behavior of these composites include the temperature range of their PTC region, as well as the sudden drop in resistance change percentage of the first composite, shown in FIG. 73, compared to the steady linear-like decline in the second composition, shown in FIG. 75, can be attributed to the difference in their compositions—especially the higher colloidal particles content in the first.

The resistivity of the prepared composite used in Experimental Case-2 was tested and the results are shown in FIGS. 76-77. As mentioned above, it was diluted from MG-Chemicals 846 composite so that is has a total of 10.5 wt. % carbon black, 5 wt. % colloidal silica, and 84.5 wt. % silicone. The original silicone from MG-Chemicals sample with 350 cP comprised 42 wt. % of the composite, while the added silicone with 58,560 cP had 42.5 wt. %. The run was conducted at an average heating rate of 0.52° C./min. Unlike products reviewed earlier, this composite only showed a negative temperature coefficient behavior throughout the tested temperature range and the resistivity declined steadily to 71.87% of the original resistance at the rates showed in FIG. 77. FIG. 77 shows that the percentage of resistance decreased at higher rates starting from 87° C., due to the further decrease in composite's viscosity.

Figure 78:
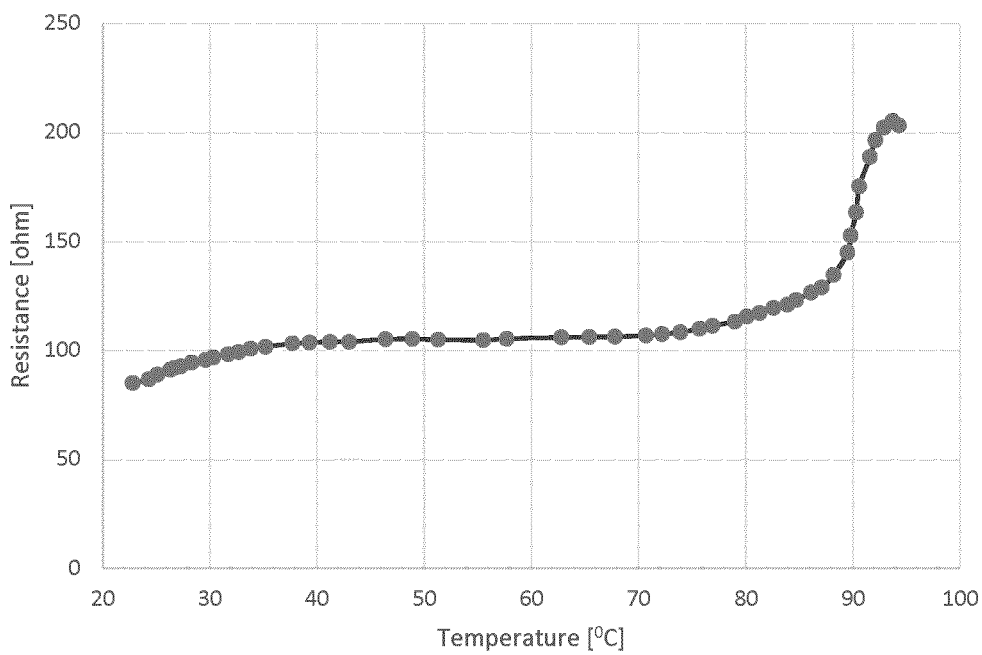
FIG. 78 depicts a graphical representation of a zero silica content composite's resistance versus temperature.
Figure 79:
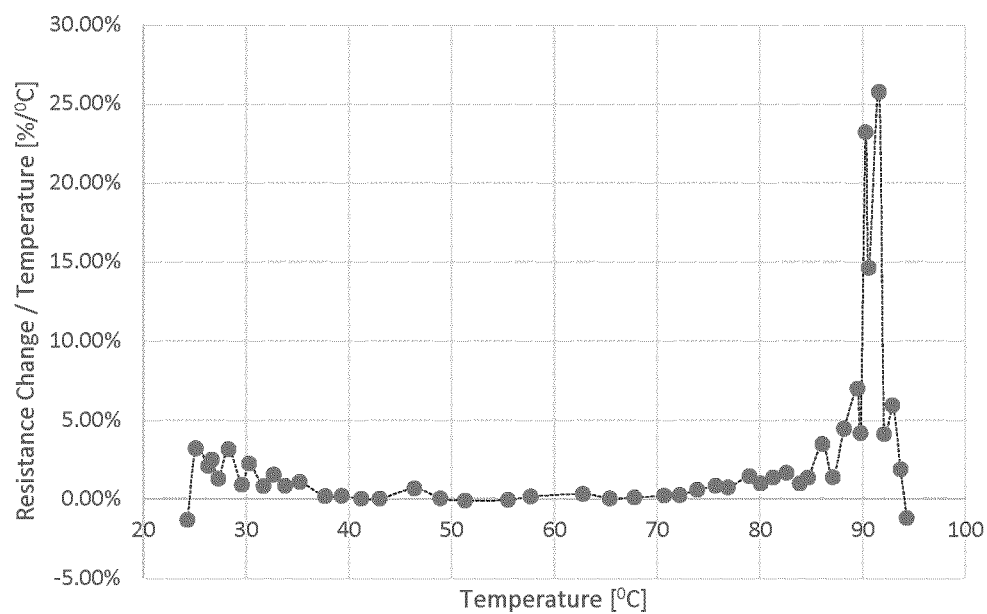
FIG. 79 depicts a graphical representation of a zero silica content composite's resistance change percentage/C versus temperature.

Another sample was prepared and tested to investigate the absence of a positive temperature coefficient region in Experimental Case-2 composite runs. The new sample was also diluted from MG-Chemicals composite 846 so that it had a 15 wt. % carbon black, 85 wt. % silicone oil and no silica content. The composite had 60 wt. % silicone oil from the 350 cP original PDMS in the MG-Chemicals 846 composite and 25 wt. % of the added silicone oil with a 58,560 cP kinematic viscosity. The composite was heated for three heating cycles to get all the air bubbles out, and the main run was heated at a rate of 0.65° C./minute. As shown in FIGS. 78-79, the composite showed a positive temperature coefficient behavior across the tested temperature range. Resistance values were observed to have a plateau starting from 31° C. to around 72° C., this was followed by a relatively significant increase in resistance that was continued to a temperature of 93.7° C.

Figure 75:
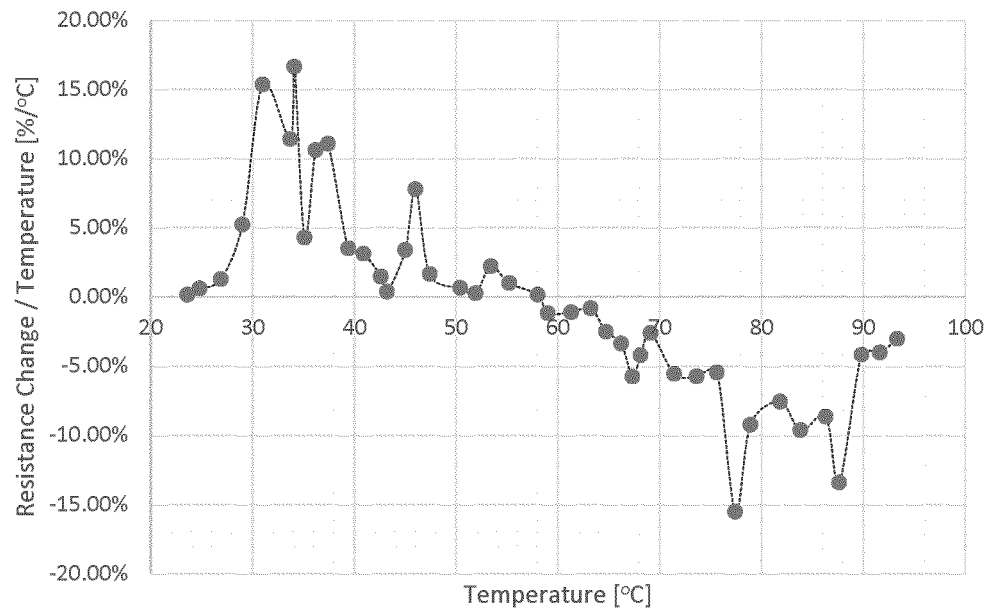
FIG. 75 depicts a graphical representation of a composite's resistance change percentage/C versus temperature.

The results of this run indicated that the addition of colloidal silica in Case-2 composite might have been responsible for its NTC behavior. The colloidal silica particles itself is most likely not directly responsible, as it was present in small quantities in MG-Chemicals composite 8481, which exhibited a PTC of resistance as seen in FIGS. 75-76. It is believed, however, that the agglomeration of colloidal silica particles before mixing was the main cause of the NTC witnessed. The colloidal silica used was observed to have formed visible agglomerates in the packing container due to humidity, which caused its average size to be much higher (should have an average particle size of 200-300 nm). The visible agglomerates were broken manually before mixing, however, this was probably not enough to break smaller microscopic agglomerations. The NTC behavior was potentially caused by the settling of these agglomerates as the matrix's viscosity decreased with elevation in temperature.

While the above description provides examples of the embodiments, it will be appreciated that some features and/or functions of the described embodiments are susceptible to modification without departing from the principles of operation of the described embodiments. Accordingly, what has been described above has been intended to be illustrated non-limiting and it will be understood by persons skilled in the art that other variants and modifications may be made without departing from the scope of the invention as defined in the claims appended hereto. Furthermore, any feature of any of the embodiments described herein may be suitably combined with any other feature of any of the other embodiments described herein.

The invention claimed is:

1. A system comprising:
    an outer conduit;
    an inner conduit positioned within the outer conduit such that an annular space is defined between the outer conduit and the inner conduit;
    a resistive heating material occupying at least a portion of an annular volume within the annular space and having a positive temperature coefficient of resistance; and
    an annular dielectric element provided within the annular space,
    wherein the annular dielectric element comprises a centralizer configured to space the inner conduit concentrically relative to the outer conduit, and
    wherein the annular dielectric element further comprises a gap to allow for expansion of the resistive heating element, and
    wherein the resistive heating material is self-regulating.

2. The system of claim 1, wherein the resistive heating material extends from the inner conduit to the outer conduit.

3. The system of claim 1, further comprising an electrical power source configured to apply a voltage between at least two of the outer conduit, the inner conduit, and the resistive heating material so as to increase a temperature of the resistive heating material.

4. The system of claim 3, wherein the electrical power source is configured to output a DC signal or an AC signal with a frequency up to 200 KHz.

5. The system of claim 1, wherein the dielectric element further comprises a ceramic.

6. The system of claim 5, wherein the ceramic comprises one or more of aluminium oxide, boron nitride, and beryllium oxide.

7. The system of claim 1, further comprising a downhole casing within which is positioned the outer conduit.

8. The system of claim 1, wherein the resistive heating material is a solid.

9. The system of claim 1, wherein the resistive heating material is a liquid having a viscosity of greater than 1,000 Pa·s.

10. The system of claim 1, wherein the resistive heating material comprises a conductive polymer composite.

11. The system of claim 10, wherein the conductive polymer composite comprises a dielectric polymer and a conductive filler.

12. The system of claim 11, wherein the conductive filler comprises one or more of carbon black, carbon nanotubes, carbon black nanoparticles, and carbon fibers.

13. The system of claim 11, wherein the conductive filler comprises one or more of a metallic powder, metal flakes, metal-coated fibers, and metal nanowires.

14. The system of claim 11, wherein the conductive filler comprises one or more of silver, copper, aluminum, and nickel.

15. The system of claim 10, wherein the conductive polymer composite comprises one or more of: a stabilizing agent; a curing agent; and an oxidizer.

16. The system of claim 1, wherein the outer conduit comprises insulation for reducing heat loss.

17. The system of claim 1, wherein the outer conduit and the inner conduit are positioned within a wellbore.

18. The system of claim 1, wherein the resistive heating material prevents fluid flow from a first end of the inner conduit and the outer conduit to a second end of the inner conduit and the outer conduit.

19. The system of claim 1, wherein the inner conduit and the outer conduit comprise threaded ends, and wherein the resistive heating material extends a length of the inner and outer conduits, from one threaded end of the inner and outer conduits to the other threaded end of the inner and outer conduits.

20. The system of claim 1, wherein the annular dielectric element is a first annular dielectric element, wherein the system further comprises a second annular dielectric elements, and wherein the first and second annular dielectric elements are provided at respective ends of the annular space, and wherein the resistive heating material extends along the inner and outer conduits, from the first annular dielectric element to the second annular dielectric element.

21. The system of claim 1, wherein a thickness of the annular space is from: about 1.2 cm to about 10.2 cm.

22. The system of claim 1, wherein the gap comprises an air gap.

23. A method of heating a conduit, comprising:
positioning an inner conduit within an outer conduit such that an annular space is defined between the inner conduit and the outer conduit;
providing a resistive heating material within the annular space such that the resistive heating material occupies at least a portion of an annular volume within the annular space, wherein the resistive heating material has a positive temperature coefficient of resistance and is self-regulating;
providing an annular dielectric element within the annular space, wherein the annular dielectric element comprises a centralizer configured to space the inner conduit concentrically relative to the outer conduit, and wherein the annular dielectric element further comprises a gap for allowing expansion of the resistive heating element; and
applying a voltage between at least two of the outer conduit, the inner conduit, and the resistive heating material so as to increase a temperature of the resistive heating material.

24. The method of claim 23, wherein providing the resistive heating material comprises injecting the resistive heating material within the annular space and allowing the injected resistive heating material to cure.

25. The method of claim 23, further comprising, prior to positioning the inner conduit within the outer conduit, molding the resistive heating material to one of the inner conduit and the outer conduit.

26. The method of claim 23, further comprising flowing a fluid within the inner conduit.

27. The method of claim 26, wherein the fluid comprises one or more of oil, brine, natural gas, and water.

28. The method of claim 26, wherein the fluid comprises water, and wherein the temperature of the resistive heating material is increased so as to convert the injected-water to steam.

29. The method of claim 23, further comprising controlling the applied voltage so as to control a temperature of a fluid within the inner conduit.

30. A system comprising:
an outer conduit;
an inner conduit positioned within the outer conduit such that an annular space is defined between the outer conduit and the inner conduit;
a resistive heating material provided within the annular space and comprising a conductive polymer composite, wherein the resistive heating material has a positive temperature coefficient of resistance; and
an annular dielectric element provided within the annular space,
wherein the annular dielectric element comprises a centralizer configured to space the inner conduit concentrically relative to the outer conduit, and
wherein the annular dielectric element further comprises a gap for allowing expansion of the resistive heating element.

31. A system comprising:
an outer conduit;
an inner conduit positioned within the outer conduit such that an annular space is defined between the outer conduit and the inner conduit;
a resistive heating material occupying at least a portion of an annular volume within the annular space and having a positive temperature coefficient of resistance; and
an annular dielectric element provided within the annular space,
wherein the annular dielectric element comprises a centralizer configured to space the inner conduit concentrically relative to the outer conduit, and wherein the annular dielectric element further comprises a gap to allow for expansion of the resistive heating element, and wherein the resistive heating material is a solid.

32. A system comprising:

an outer conduit;

an inner conduit positioned within the outer conduit such that an annular space is defined between the outer conduit and the inner conduit;

a resistive heating material occupying at least a portion of an annular volume within the annular space and having a positive temperature coefficient of resistance; and an annular dielectric element provided within the annular space, wherein the annular dielectric element comprises a centralizer configured to space the inner conduit concentrically relative to the outer conduit, and wherein the annular dielectric element further comprises a gap to allow for expansion of the resistive heating element, and wherein the resistive heating material is a liquid having a viscosity of greater than 1,000 Pa·s.

33. A system comprising:

an outer conduit;

an inner conduit positioned within the outer conduit such that an annular space is defined between the outer conduit and the inner conduit;

a resistive heating material occupying at least a portion of an annular volume within the annular space and having a positive temperature coefficient of resistance; and an annular dielectric element provided within the annular space, wherein the annular dielectric element comprises a centralizer configured to space the inner conduit concentrically relative to the outer conduit, and wherein the annular dielectric element further comprises a gap to allow for expansion of the resistive heating element, and wherein the inner conduit and the outer conduit comprise threaded ends, and wherein the resistive heating material extends a length of the inner and outer conduits, from one threaded end of the inner and outer conduits to the other threaded end of the inner and outer conduits.

* * * * *